United States Patent
Shinohara et al.

(10) Patent No.: US 9,417,462 B2
(45) Date of Patent: Aug. 16, 2016

(54) PROGRESSIVE POWER LENS DESIGN METHOD AND PROGRESSIVE POWER LENS DESIGN APPARATUS

(75) Inventors: Toshihide Shinohara, Chino (JP); Takateru Mori, Nagano-Ken (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 1077 days.

(21) Appl. No.: 13/441,438

(22) Filed: Apr. 6, 2012

(65) Prior Publication Data

US 2012/0259596 A1 Oct. 11, 2012

(30) Foreign Application Priority Data

Apr. 7, 2011 (JP) .................................. 2011-085166

(51) Int. Cl.
*G02C 7/02* (2006.01)
*G02C 7/06* (2006.01)

(52) U.S. Cl.
CPC ................ *G02C 7/024* (2013.01); *G02C 7/027* (2013.01); *G02C 7/061* (2013.01); *G02C 7/065* (2013.01)

(58) Field of Classification Search
CPC ........ G02C 7/061; G02C 7/065; G02C 7/068; G02C 7/024; G02C 7/027; G02C 7/063; G02C 7/066; G02C 7/028
See application file for complete search history.

(56) References Cited

U.S. PATENT DOCUMENTS

| | | | |
|---|---|---|---|
| 4,062,629 A * | 12/1977 | Winthrop | 351/159.42 |
| 5,861,935 A | 1/1999 | Morris et al. | |
| 5,920,372 A | 7/1999 | Guilino et al. | |
| 5,926,250 A | 7/1999 | Mukaiyama et al. | |
| 6,019,470 A | 2/2000 | Mukaiyama et al. | |
| 6,074,062 A | 6/2000 | Morris et al. | |
| 6,935,744 B2 | 8/2005 | Kitani et al. | |
| 7,210,779 B2 | 5/2007 | Esser et al. | |
| 7,241,010 B2 | 7/2007 | Kitani et al. | |
| 2006/0007392 A1 | 1/2006 | Esser et al. | |
| 2006/0092375 A1 * | 5/2006 | Menezes et al. | 351/168 |
| 2007/0182923 A1 | 8/2007 | Kitani et al. | |

(Continued)

FOREIGN PATENT DOCUMENTS

| | | |
|---|---|---|
| EP | 1691232 A1 | 8/2006 |
| EP | 1835328 A2 | 9/2007 |
| EP | 2237100 A1 | 10/2010 |
| JP | 63115129 A | 5/1988 |
| JP | 2003344813 A | 12/2003 |
| JP | 2004004436 A | 1/2004 |
| JP | 2006506662 A | 2/2006 |
| WO | 9719382 A1 | 5/1997 |

(Continued)

OTHER PUBLICATIONS

Extended European search report dated Aug. 13, 2012 issued in corresponding European application 12163122.0.

*Primary Examiner* — Jordan Schwartz
(74) *Attorney, Agent, or Firm* — DLA Piper LLP (US)

(57) ABSTRACT

A method of designing a progressive power lens with less image sway includes preferentially selecting a spectacle specification including a first condition if an average prescription power of a distance portion is equal to or greater than +3.0 D, and preferentially selecting a spectacle specification including a second condition if the average prescription power is equal to or smaller than −3.0 D. At least a surface power OHPf in a horizontal direction of a distance portion on an object-side surface is greater than a surface power OVPf in a vertical direction, or a surface power OHPn in a horizontal direction of a near portion is greater than a surface power OVPn in a vertical direction. The first condition includes a condition that the OVPf is greater than the OVPn, and the second condition includes a condition that the OVPf is smaller than the OVPn.

10 Claims, 53 Drawing Sheets

(56) References Cited

U.S. PATENT DOCUMENTS

2009/0109396 A1*  4/2009  Kitani et al. .................. 351/169
2010/0201941 A1*  8/2010  Gupta et al. .................. 351/169
2010/0245763 A1   9/2010  Shinohara et al.

FOREIGN PATENT DOCUMENTS

| WO | 9719383 A1 | 5/1997 |
| WO | 2004044643 A1 | 5/2004 |
| WO | 2012115258 A1 | 8/2012 |

* cited by examiner

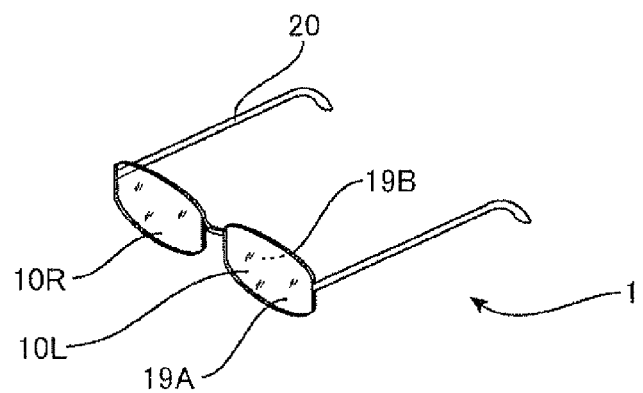
FIG. 1
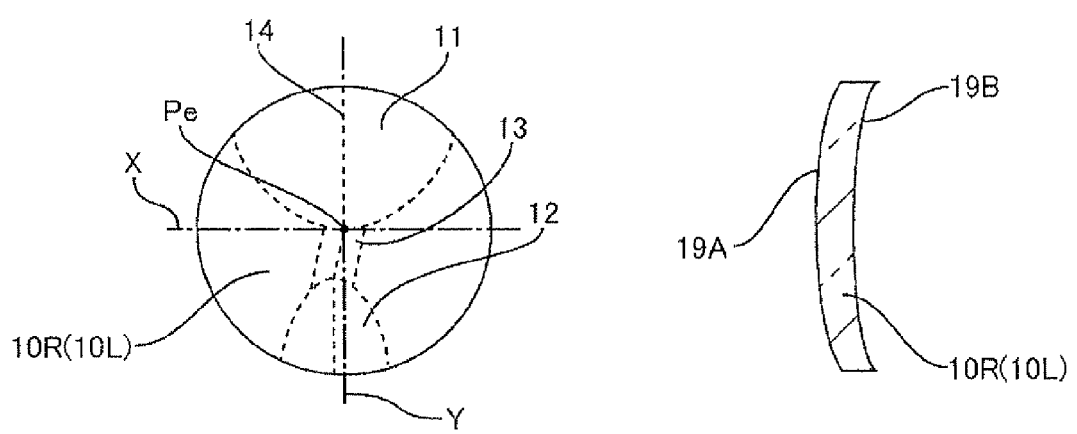
FIG. 2A
FIG. 2B

PROGRESSIVE POWER LENS DESIGN METHOD AND PROGRESSIVE POWER LENS DESIGN APPARATUS

This application claims priority to Japanese Patent Application No. 2011-085166, filed Apr. 7, 2011, the entirety of which is hereby incorporated by reference.

BACKGROUND

1. Technical Field

The present invention relates to a method of designing a progressive power lens.

2. Related Art

WO97/19382 describes a progressive multifocal lens that is used as a spectacle lens suitable for correction of presbyopia or the like. In this progressive multifocal lens, a progressive surface attached to the object-side surface is provided on the eyeball-side surface. Accordingly, since the object-side surface can be a spherical surface with a constant base curve, it becomes possible to suppress the variations in magnification due to a shape factor, to reduce the difference in magnification between a distance portion and a near portion, and to suppress the variations in magnification of a progressive portion. Therefore, it is possible to reduce image sway or distortion due to the difference in magnification, thereby providing a progressive multifocal lens that obtains a comfortable field of view. In the progressive multifocal lens described in WO97/19382, it becomes possible to combine the progressive surface and the toric surface for astigmatism correction on the eyeball-side surface using a combination expression, thereby reducing the image sway or distortion even in a progressive multifocal lens for astigmatism correction.

WO97/19383 describes a multifocal spectacle lens that has visual field portions being different in power, such as a distance portion and a near portion. In this multifocal spectacle lens, the difference between the average surface power of the distance portion and the average surface power of the near portion on the object-side surface is set to be numerically smaller than a predetermined addition power, and the average surface power of the distance portion and the average surface power of the near portion on the eyeball-side surface are adjusted, thereby providing a multifocal spectacle lens with the predetermined addition power. It becomes possible to adjust the average surface power of the object-side surface such that the difference in magnification between the distance portion and the near portion is reduced, and to reduce the difference in the average surface power of the object-side surface. Therefore, it is possible to provide a multifocal lens that has less sway or distortion of images due to the difference in magnification, and obtains a comfortable field of view with improved astigmatism, a wide range of distinct vision, less image sway, and the like.

JP-A-2003-344813 describes a double-sided aspheric progressive power lens that reduces the difference in magnification of images between a distance portion and a near portion, allows satisfactory vision correction with reference to a prescription value, and provides an effective wide field of view with less distortion when wearing. For that purpose, in JP-A-2003-344813, when the surface power in the horizontal direction and the surface power in the vertical direction at a distance power measurement position F1 in a first refractive surface on the object-side surface are respectively DHf and DVf, and the surface power in the horizontal direction and the surface power in the vertical direction at a near power measurement position N1 in the first refractive surface are respectively DHn and DVn, the relational expressions DHf+DHn<DVf+DVn and DHn<DVn are satisfied. The surface astigmatism components at the positions F1 and N1 on the first refractive surface are balanced with a second refractive surface on the eyeball-side surface, and the distance power and the addition power based on a prescription value are given with the combination of the first and second refractive surfaces.

JP-A-2004-004436 describes a progressive power lens that can reduce image distortion or blurring inherent in the progressive power lens and can improve wearability. For that purpose, in JP-A-2004-004436, a double-sided progressive lens with both the object-side surface and the eyeball-side surface being progressive surfaces is prepared, the surface addition power of the object-side surface is made negative, and the shape of the progressive surface is designed such that the average surface power distribution of the object-side surface and the eyeball-side surface are made similar.

JP-A-63-115129 describes a progressive multifocal lens which has a segment where power incrementally changes (continuously increases) from above to below substantially near the center of the lens in the horizontal direction. In this progressive multifocal lens, the area S of a region where astigmatism is equal to or smaller than 0.5 diopter is sorted into three regions A, B, and C of an upper portion from a distance eye-point of the lens, a portion from the distance eye-point to a near power measurement point, and a lower portion from the near power measurement point. If the suffix p is attached when the average power of the distance power of the lens is equal to or greater than +1.00 diopter, the suffix a is attached when the distance power is equal to or smaller than −1.00 diopter, and Sp=Ap+Bp+Cp and Sa=Aa+Ba+Ca are established, when the addition power of each lens is identical, the progressive multifocal lens has the astigmatism distribution of Ap>Aa and Cp<Ca or Bp+Cp<Ba+Ca.

JP-T-2006-506662 describes a double-sided progressive spectacle lens in which a progressive effect is distributed over the front surface and the rear surface of the progressive spectacle lens, and the ratio Q is explained by $Q=\text{Add}_{vfl}/\text{Add}_{Gesamt}$. $\text{Add}_{vfl}$ represents an increase in surface power along a principal line on the front surface between a distance region and a near region, $\text{Add}_{Gesamt}$ represents an increase in total power along the principal line between the distance region and the near region, and the ratio Q increases with expansion of a distance region effect F: $dQ(F)/dF \geq 0$.

There is a need for a progressive power lens for spectacles with less image sway or difference in magnification.

SUMMARY

An aspect of the invention is directed to a method of designing a progressive power lens for spectacles that has a distance portion and a near portion of different average prescription powers. The progressive power lens includes a surface power OHPf in a horizontal direction and a surface power OVPf in a vertical direction of the distance portion on an object-side surface along a principal meridian or a vertical reference line passing through a fitting point, and a surface power OHPn in a horizontal direction and a surface power OVPn in a vertical direction of the near portion on the object-side surface along the principal meridian or the vertical reference line. The object-side surface includes at least one of elements of a toric surface with the surface power OHPf greater than the surface power OVPf and elements of a toric surface with the surface power OHPn greater than the surface power OVPn, and the eyeball-side surface along the principal meridian or the vertical reference line includes elements that cancel shifts in the surface power by the elements of the toric surface on the object-side surface. The method includes the following steps.

1. preferentially selecting a spectacle specification including a first condition if the average prescription power of the distance portion is plus and the absolute value thereof is at least 3.0 D 2. preferentially selecting a spectacle specification including a second condition if the average prescription power of the distance portion is minus and the absolute value thereof is at least 3.0 D When a spherical power of prescription is Sph and an astigmatism power is Cyl, the average prescription power is a value obtained by adding half of the astigmatism power to the spherical power. That is, the average prescription power becomes (Sph+Cyl/2).

The first condition includes a condition that the surface power OVPf is greater than the surface power OVPn, that is, the condition of Expression (1), and the second condition includes a condition that the surface power OVPf is smaller than the surface power OVPn, that is, the condition of Expression (2). The unit D is dioptre.

$$OVPf > OVPn \quad (1)$$

$$OVPf < OVPn \quad (2)$$

The progressive power lens to be designed includes elements of toric surfaces (also called toroidal surfaces) along the principal meridian or the vertical reference line passing through the fitting point (both may called a principal meridian) on both the object-side surface and the eyeball-side surface. The elements of the toric surfaces on both the object-side surface and the eyeball-side surface have the curvature in the horizontal direction greater than the curvature in the vertical direction, that is, the radius of curvature in the vertical direction greater than the radius of curvature in the horizontal direction. The shifts in the surface power by the elements of the toric surfaces are cancelled by the elements of the toric surfaces of both the object-side surface and the eyeball-side surface. Therefore, the elements of the toric surfaces are not intended for astigmatism correction, and are effective for suppressing the sway of images having passed through a spectacle lens involved in the movement of the eyes (line of sight).

The usual movement of the line of sight (eyes) when sway occurs in the images obtained through the spectacle lens is caused by the movement of the eyeballs (line of sight) with respect to the head by vestibulo-ocular reflex compensating for the movement of the head. In regard to the movement range of the line of sight, in general, the horizontal direction is wider than the vertical direction due to vestibulo-ocular reflex. Accordingly, the elements of a toric surface with a surface power in a horizontal direction greater than a surface power in a vertical direction are introduced to the object-side surface and the eyeball-side surface, such that, when the line of sight moves in the horizontal direction, it is possible to suppress variation in the angle at which the line of sight passes through a spectacle lens (the entrance angle and the exit angle of the line of sight with respect to the surface of the spectacle lens). For example, it is possible to reduce aberrations of the images obtained through the spectacle lens with the movement of the line of sight. Therefore, it is possible to provide a spectacle lens with less sway of images obtained through the spectacle lens.

In the method according to the aspect of the invention, the specification of the progressive power lens which includes the elements of the toric surfaces on the eyeball-side surface and the object-side surface changes depending on whether the prescription for the eyes of the user (wearer) is a far-sight system or a near-sight system, thereby designing and manufacturing a progressive power lens which provides a comfortable field of view to the user.

When the prescription for the eyes of the user is a far-sight system, in Step 1, a progressive power lens is designed using a spectacle specification which includes a first condition including a condition that the surface power OVPf is greater than the surface power OVPn. That is, a progressive power lens which includes elements of a toric surface is designed using a spectacle specification where the surface power in the vertical direction progressively decreases from the intermediate portion which progressively connects the distance portion and the near portion toward the near portion on the principal meridian of the object-side surface.

In the prescription of the far-sight system, the addition power is added to the distance portion having a plus average prescription power. For this reason, the power of the near portion becomes power which further increases to the plus side. Accordingly, a large distortion aberration from the intermediate portion to the near portion is likely to occur, and image sway when wearing is likely to increase. Therefore, a so-called regressive specification where the surface power in the vertical direction progressively decreases from the intermediate portion toward the near portion is added to the elements of the toric surface, thereby providing a progressive power lens having less image sway or the like.

When the prescription for the eyes of the user is a near-sight system, in Step 2, a progressive power lens is designed using a spectacle specification which includes a second condition including a condition that the surface power OVPf is smaller than the surface power OVPn. That is, a progressive power lens which includes elements of a toric surface is designed using a spectacle specification where the surface power in the vertical direction progressively increases from the intermediate portion toward the near portion on the principal meridian of the object-side surface.

In the prescription of the near-sight system, the addition power is added to the distance portion having a minus average prescription power. For this reason, the power of the near portion is shifted in the plus direction. In many cases, the power of the near portion is minus and a small power. Accordingly, a distortion aberration becomes smaller in the near portion than in the distance portion, image sway when wearing becomes small, and image sway is perceived with difficulty. In the prescription of the far-sight system, image magnification is greater than 1, and an image is viewed on a magnified scale, thereby obtaining satisfactory vision. Meanwhile, in the prescription of the near-sight system, image magnification is smaller than 1, and an image is viewed on a reduced scale. For this reason, vision is obtained with difficulty. Accordingly, a so-called object-side progressive specification where the surface power in the vertical direction progressively increases from the intermediate portion toward the near portion is added to the elements of the toric surface, thereby increasing image magnification. Therefore, it is possible to provide a progressive power lens which has less image sway or the like and easily obtains good vision.

In the method according to the aspect of the invention, the characteristics of the progressive power lens which will be applied depending on whether the distance prescription power is a far-sight system or a near-sight system are taken into consideration, and the structure of the object-side surface changes by the distance prescription power, thereby providing a progressive power lens which has less image sway, is suitable for vision correction, and obtains a more comfortable sense of wearing.

Preferably, the method further includes the following step.

3. preferentially selecting a spectacle specification including a third condition if the average prescription power of the distance portion is in a range of −2.0 D to 1.0 D. The third condition includes a condition that the surface power OVPf is equal to the surface power OVPn and the surface power OHPf is equal to the surface power OHPn, that is, the condition of Expression (3).

$$OVPf=OVPn$$

$$OHPf=OHPn \quad (3)$$

When the prescription power of the distance portion is close to emmetropia, a spectacle specification which includes elements of a simple toric surface (toroidal surface) with the surface power in the horizontal direction along the principal meridian on the object-side surface greater than the surface power in the vertical direction is preferentially selected, thereby designing and manufacturing a progressive power lens with improvement in both image sway suppression effect and vision improvement effect by an image enlargement effect in a balanced manner.

Preferably, the progressive power lens includes a surface power IHPf in the horizontal direction and a surface power IVPf in the vertical direction of the distance portion on the eyeball-side surface along the principal meridian or the vertical reference line, and a surface power IHPn in the horizontal direction and a surface power IVPn in the vertical direction of the near portion on the eyeball-side surface along the principal meridian or the vertical reference line. The first condition and the second condition may include the following condition (4).

$$IHPf>IVPf$$

$$IHPn>IVPn$$

$$IHPf>IHPn \quad (4)$$

IHPf, IVPf, IHPn, and IVPn represent absolute values.

The eyeball-side surface basically includes the elements of the toric surface which cancel shifts in the power by the elements of the toric surface on the object-side surface, and the progressive elements on the eyeball-side surface with a small difference in image magnification, thereby designing and manufacturing a progressive power lens which obtains a more comfortable field of view.

Preferably, the spectacle specification satisfies the first condition or the second condition in a range of at least ±10 mm with the principal meridian or the vertical reference line sandwiched therebetween. In regard to the visual characteristics of a person when the progressive power lens is used, the use frequency on the principal meridian is very high, and image sway is found when a visual operation is carried out near the principal meridian. Therefore, if a shift in the intensity direction of the surface power in the horizontal direction is within at least ±10 mm in the horizontal direction with the principal meridian as a center, it is possible to sufficiently obtain an image sway reduction effect.

Preferably, the method further includes evaluating image sway of a progressive power lens designed on the basis of the preferentially selected spectacle specification. The evaluation of image sway may include the following steps.

a. in regard to the evaluation of the image sway, a virtual plane having a rectangular pattern with a central vertical grid line passing through the geometric center of the rectangular pattern, left and right vertical grid lines horizontally symmetrical to the central vertical grid line, a central horizontal grid line passing through the geometric center of the rectangular pattern, and upper and lower horizontal grid lines symmetrical to the central horizontal grid line is set through the progressive power lens such that the geometric center is aligned with a point of fixation.

b. geometric misalignment when the images of the rectangular patterns which appear when the spectacle lens moves left and right by a first horizontal angle along with a head within a range in which the line of sight does not move from the geometric center or when the spectacle lens moves up and down by a first vertical angle along with the head within a range in which the line of sight does not move from the geometric center are superimposed such that the geometric centers are aligned with each other is obtained as a sway indicator.

Another aspect of the invention is directed to a method of designing a progressive power lens. The method includes selecting a spectacle specification including a first condition, selecting a spectacle specification including a second condition, selecting a spectacle specification including a third condition, and evaluating image sway of a progressive power lens designed on the basis of the selected spectacle specification. With the use of a sway index, from among progressive power lenses which include elements of a toric surface including the above-described three conditions, it is possible to design and manufacture a progressive power lens which has less image sway and is most suitable for the user.

Still another aspect of the invention is directed to a method of manufacturing a progressive power lens. The method includes manufacturing a progressive power lens designed by the above-described method of designing a progressive power lens.

Yet another aspect of the invention is directed to an apparatus for designing a progressive power lens for spectacles that has a distance portion and a near portion of different average prescription powers. The apparatus includes a first unit which, if the average prescription power of the distance portion is plus and the value thereof is at least 3.0 D, preferentially selects a spectacle specification including a first condition, and a second unit which, if the average prescription power of the distance portion is minus and the absolute value thereof is at least 3.0 D, preferentially selects a spectacle specification including a second condition. It is possible to design a progressive power lens which is suitable for the user and has elements of a toric surface (toroidal surface) with the power in the horizontal direction on the object-side surface greater than the power in the vertical direction.

Preferably, the apparatus further includes a third unit which, if the average prescription power of the distance portion is in a range of −2.0 D to 1.0 D, preferentially selects a spectacle specification including a third condition.

Still yet another aspect of the invention is directed to an apparatus for designing a progressive power lens. The apparatus includes a unit which assumes an object-side surface and an eyeball-side surface of the progressive power lens having the distance portion and the near portion on the basis of a spectacle specification, and an evaluation unit which evaluates sway of the progressive power lens having the assumed object-side surface and eyeball-side surface. The unit which assumes the surfaces includes a first unit which selects a spectacle specification including a first condition, a second unit which selects a spectacle specification including a second condition, and a third unit which selects a spectacle specification including a third condition. The evaluation unit includes a unit which sets a virtual plane having a rectangular pattern with a central vertical grid line passing through the geometric center of the rectangular pattern, left and right vertical grid lines horizontally symmetrical to the central vertical grid line, a central horizontal grid line passing through the geometric center of the rectangular pattern, and upper and lower horizontal grid lines vertically symmetrical to the central horizontal grid line through the progressive power lens having the assumed object-side surface and eyeball-side surface such that the geometric center is aligned with a point of fixation, and a unit which obtains, as a sway indicator, geometric misalignment when the images of the rectangular patterns which appear when the spectacle lens moves left and right by a first horizontal angle along with a head within a range in which the line of sight does not move from the geometric center or when the spectacle lens moves up and down by a first vertical angle along with the head within a range in which the line of sight does not move from the geometric center are superimposed such that the geometric centers are aligned with each other.

BRIEF DESCRIPTION OF THE DRAWINGS

The invention will be described with reference to the accompanying drawings, wherein like numbers reference like elements.

FIG. 1 is a perspective view showing an example of spectacles.

FIG. 2A is a plan view schematically showing one lens of a progressive power lens, and FIG. 2B is a sectional view of the progressive power lens.

DESCRIPTION OF EXEMPLARY EMBODIMENTS

Figure 3A:
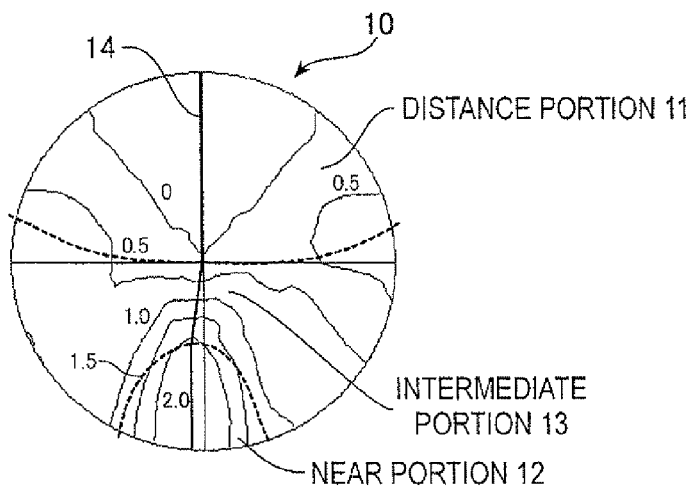
FIG. 3A is a diagram showing an equivalent spherical power distribution of a progressive power lens.

FIG. 1 is a perspective view showing an example of spectacles. FIG. 2A is a plan view schematically showing one lens of a progressive power lens according to an embodiment of the invention. FIG. 2B is a sectional view schematically showing one lens of the progressive power lens.

In this example, when viewed from a user side (a wearer side), the left side is referred to as left, and the right side is referred to as right. Spectacles 1 have a pair of left and right spectacle lenses 10L and 10R for left and right eyes, and a frame 20 in which the lenses 10L and 10R are mounted. The spectacle lenses 10L and 10R are progressive power lenses. The lenses 10L and 10R are meniscus lenses whose basic shape is convex toward the object side. Therefore, each of the lenses 10L and 10R has an object-side surface (a convex surface or an outer surface) 19A and an eyeball-side (user-side) surface (a concave surface or an inner surface) 19B.

FIG. 2A shows the right-eye lens 10R. The lens 10R includes a distance portion 11 which is an upper visual field portion for seeing an object at a long distance (distance vision) and a near portion 12 which is a lower visual field portion for seeing an object at a short distance of power different from the distance portion 11 (near vision). The lens 10R also includes an intermediate portion (a portion of an intermediate vision, a progressive portion, or a progressive zone) 13 which connects the distance portion 11 and the near portion 12 such that the power continuously changes. The lens 10R includes a principal meridian 14 which connects the position on the lens as the center of the field of view in a distance vision, an intermediate vision, or a near vision. When the spectacle lens 10R with the outer circumference based on the frame is fitted into the frame, usually, a fitting point Pe as a reference point on the lens through which the line of sight in a distant horizontal front vision (primary position) passes is substantially located at the lower end of the distance portion 11. In the following description, the fitting point Pe is referred to as the coordinate origin of the lens, the coordinate in the horizontal direction is referred to as an X coordinate, and the coordinate in the vertical direction is referred to as a Y coordinate. The principal meridian 14 substantially extends vertically from the distance portion 11 toward the near portion 12, and is bent toward the nose when having reached the fitting point Pe with respect to the Y coordinate.

Although the following description will be provided focusing on the right-eye spectacle lens 10R as a spectacle lens, a spectacle lens or a lens may be the left-eye spectacle lens 10L. The left-eye spectacle lens 10L is horizontally symmetrical to the right-eye spectacle lens 10R, except for a difference in the spectacle specification due to a difference in prescription between the left and right eyes. In the following description, the right-eye and left-eye spectacle lenses 10R and 10L are commonly called a spectacle lens (or lens) 10.

Of the optical performance of the progressive power lens 10, the width of the field of view can be known by an astigmatism distribution map or an equivalent spherical power distribution map. From among the performance of the progressive power lens 10, sway which is found when the head with the progressive power lens 10 moves is important. Even when the astigmatism distribution or the equivalent spherical power distribution is substantially the same, in regard to sway, a difference may occur. In the following description, first, a sway evaluation method will be described. The comparison result of an embodiment of the invention and the related art using the evaluation method is shown.

1. Sway Evaluation Method

Figure 3B:
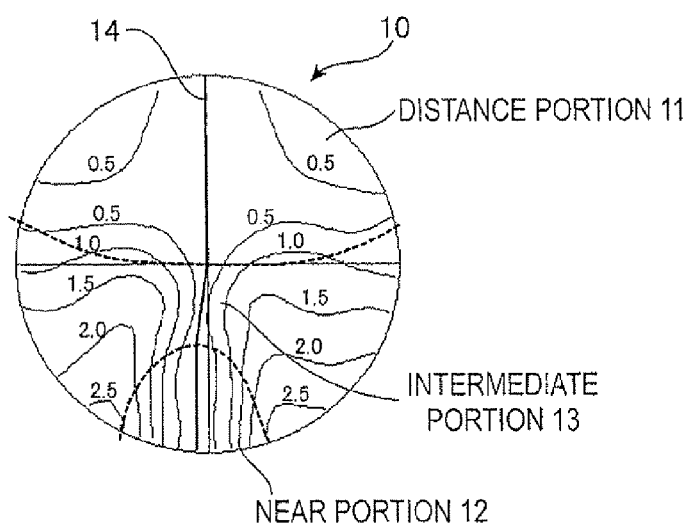
FIG. 3B is a diagram showing an astigmatism distribution of a progressive power lens.
Figure 3C:
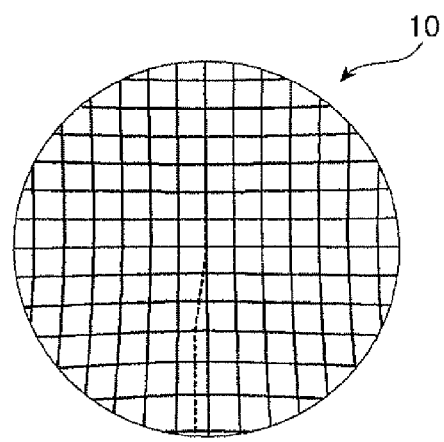
FIG. 3C is a diagram showing the state of distortion when a square grid is viewed.

FIG. 3A shows an equivalent spherical power distribution (the unit is dioptre (D)) of a typical progressive power lens 10, FIG. 3B shows an astigmatism distribution (the unit is dioptre (D)), and FIG. 3C shows the state of distortion when a square grid is viewed through the lens 10. In the progressive power lens 10, predetermined power is added along the principal meridian 14. Accordingly, with the addition of power, large astigmatism is generated laterally to the intermediate region (intermediate portion or progressive portion) 13. In this portion, an object appears blurred. In regard to the equivalent spherical power distribution, power increases by a predetermined amount in the near portion 12, and sequentially decreases toward the intermediate portion 13 and the distance portion 11. In the progressive power lens 10, the power (distance portion power, Sph) of the distance portion 11 is 0.00 D (dioptre), and the addition power (ADD) is 2.00 D.

Image magnification increases in the near portion 12 with a high power compared to the distance portion 11 due to the difference depending on the position on the progressive power lens 10, the square grid image appears distorted laterally to the near portion 12 from the intermediate portion 13. This causes image sway when the head moves.

Figure 4:
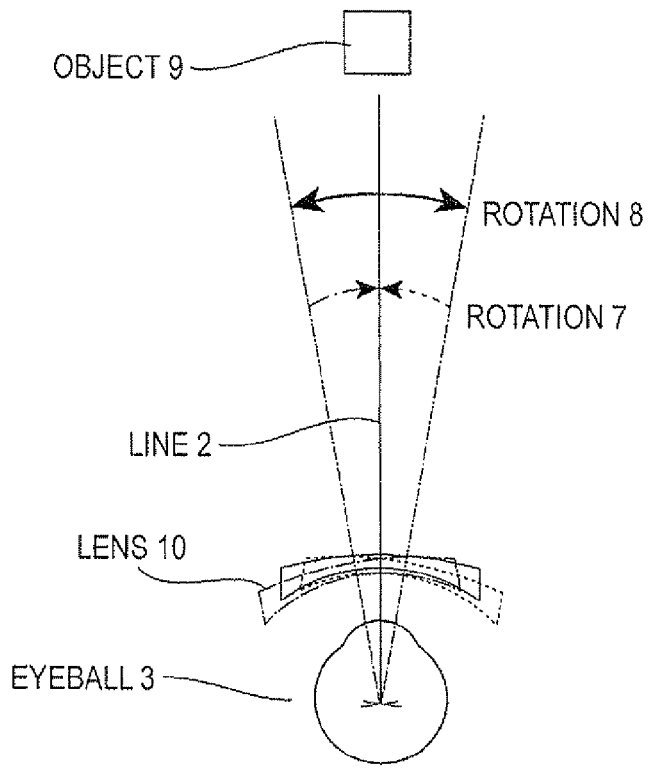
FIG. 4 is a diagram showing vestibulo-ocular reflex.

FIG. 4 shows the outline of vestibulo-ocular reflex. When a person sees an object, if the head moves, the range of view also moves. At this time, an image on the retina also moves. If there is the movement (the rotation of the eye) 7 of the eyeball 3 to cancel the movement (the rotation of the face or the rotation of the head) 8 of the head, the line of sight 2 is stable, and the retinal image does not move. A reflex eye movement which has a function of stabilizing the retinal image is called a compensatory eye movement. One compensatory eye movement is vestibulo-ocular reflex, reflex is stimulated by the rotation of the head. It is thought that a neural mechanism of vestibulo-ocular reflex by horizontal rotation is revealed to some extent, a horizontal semicircular canal detects the rotation 8 of the head, the inputs therefrom provide inhibitiveness and excitability to an extraocular muscle, and the eyeball 3 moves.

When the head rotates, if the eyeball rotates by vestibulo-ocular reflex, the retinal image does not move, and as indicated by a broken line and a one-dot-chain line of FIG. 4, the spectacle lens 10 rotates in connection with the rotation of the head. For this reason, the line of sight 2 which passes through the spectacle lens 10 relatively moves on the spectacle lens 10 by vestibulo-ocular reflex. Accordingly, if there is a difference in the imaging performance of the spectacle lens 10 in the movement range of the eyeball 3 by vestibulo-ocular reflex, that is, the range through which the line of sight 2 passes by vestibulo-ocular reflex, the retinal image may sway.

Figure 5:
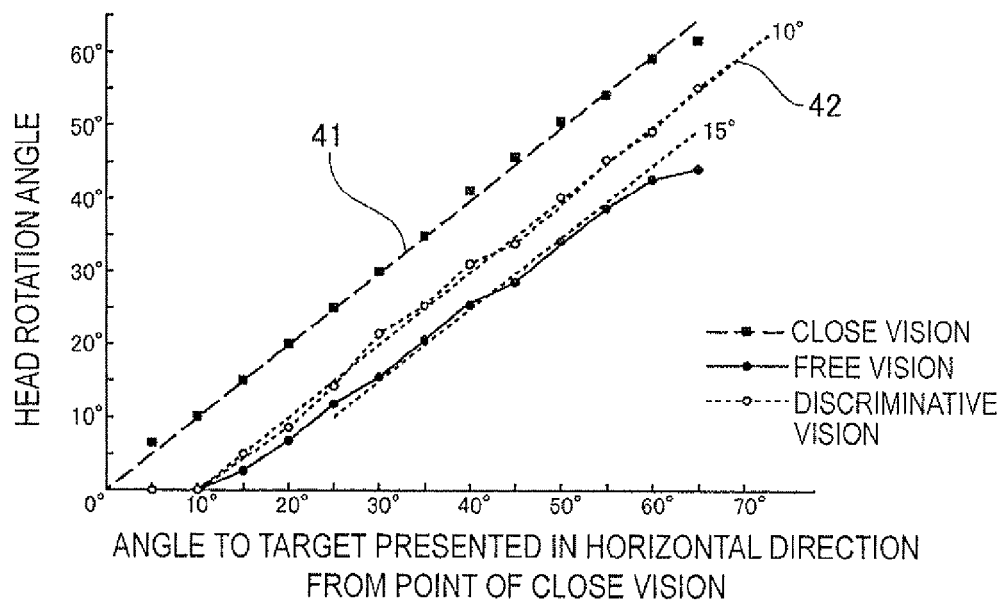
FIG. 5 is a diagram showing a maximum angle of vestibulo-ocular reflex.

FIG. 5 shows an example in which a head position (eye position) movement is observed at the time of target search. The graphs shown in FIG. 5 show how much the head rotates so as to recognize an object (target) having moved from a point of fixation at a certain angle in the horizontal direction. In a fixation state in which the object is concentrated, as indicated by a graph 41, the head rotates along with the object. Meanwhile, in a discriminative vision state such that the object is simply recognized, as indicated by a graph 42, the movement of the head decreases (is smaller) by about 10 degrees with respect to the angle (movement) of the object. From this observation result, the range in which the object can be recognized by the movement of the eyeball can be limited to about 10 degrees. Accordingly, it is thought that, in a natural state, the rotation angle of the head in the horizontal direction when a person looks the object by vestibule-ocular reflex while moving the head is maximum about 10 degrees left and right (the maximum horizontal angle θxm at which the eyeball 3 moves by vestibulo-ocular reflex).

In the progressive power lens, there is a variation in power in the intermediate portion. Thus, it is thought that, if the head moves strongly, the power of lens does not coincide with the distance to the object, and the maximum rotation angle of the head in the vertical direction when the object is viewed by vestibulo-ocular reflex decreases compared to that in the horizontal direction, such that an image is blurred. From above, it is preferable that the head rotation angle which is a parameter when a sway simulation is carried out is about 10 degrees left and right in the horizontal direction, and the head rotation angle in the vertical direction is smaller and for example, about 5 degrees up and down. It is understood that the typical value of the movement range of the line of sight by vestibulo-ocular reflex is ±10 degrees left and right of the principal meridian 14 in the horizontal direction.

Figure 6:
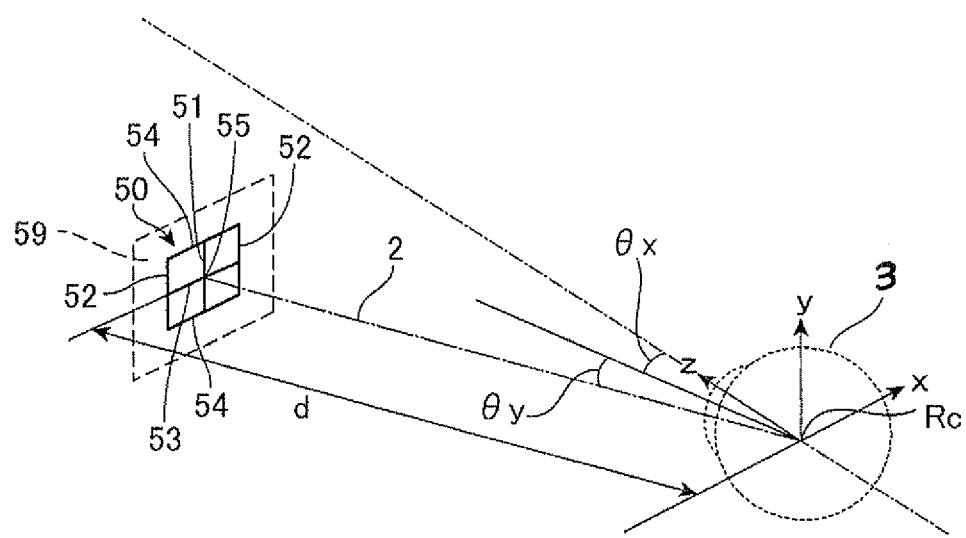
FIG. 6 is a diagram showing a state in which a rectangular pattern is set.

FIG. 6 shows a state in which a visual simulation is carried out taking into consideration vestibulo-ocular reflex when the head rotates toward an object disposed on a virtual plane 59 of a virtual space, in this example, a rectangular pattern 50. In the virtual space, when the rotation center Rc of the eyeball 3 is defined as the origin, the z axis is set in the horizontal front direction, the x axis is set in the horizontal direction, and the y axis is set in the vertical direction. The rectangular pattern 50 of the object is disposed on the virtual plane 59 at a distance d in a direction at an angle $\theta x$ relative to the y-z plane and an angle $\theta y$ relative to the x-z plane.

In this example, the rectangular pattern 50 is a square grid which is bisected in every direction. The rectangular pattern 50 includes a central vertical grid line 51 which passes through a geometric center 55, left and right vertical grid lines 52 which are horizontally symmetrical to the central vertical grid line 51, a central horizontal grid line 53 which passes through the geometric center, and upper and lower horizontal grid lines 54 which are vertically symmetrical to the central horizontal grid line 53. As described below, the distance d between the virtual plane 59 and the eyeball 3 is adjusted such that the rectangular pattern 50 of the square grid has a pitch set by the viewing angle on the spectacle lens 10.

In this example, the spectacle lens 10 is disposed in front of the eyeball 3 at the same position and in the same posture as when actually wearing, and the virtual plane 59 is set such that the left and right vertical grid lines 52 and the upper and lower horizontal grid lines 54 are viewed in the vicinity of the maximum horizontal angle $\theta xm$ at which the eyeball 3 moves relative to the point of fixation by vestibulo-ocular reflex, that is, at ±10 degrees relative to the point of fixation.

The size of the rectangular pattern 50 of the square grid can be specified by the viewing angle, and can be set in accordance with the object to be viewed. For example, the visual field pitch of the grid can be set to be small on the screen of a mobile personal computer or the like, and the visual field pitch of the grid can be set to be large on an object, such as the screen of a desktop personal computer.

In the progressive power lens 10, the distance to the object which is postulated by each of the distance portion, the intermediate portion, and the near portion changes. For this reason, the distance d to the object (virtual plane) 59 is a long distance of several m or more in the distance portion, a short distance of about 40 cm to 30 cm in the near portion, and an intermediate distance of about 1 m to 50 cm in the intermediate portion. However, for example, when walking, a target under observation is at a distance of 2 m to 3 m in the intermediate portion and the near portion. Therefore, it is not necessary to strictly set the distance d depending on the distance, intermediate, and near portions on the lens, and there is little influence on the sway indicator calculation result.

The rectangular pattern 50 as an object is observed in a viewing angle direction deviated from a visual field direction $(\theta x, \theta y)$ by a lens refraction action. An observed image of the rectangular pattern 50 at this time can be obtained by a usual ray tracing method. In this state as basis, if the head rotates at $+\alpha°$ in the horizontal direction, the lens 10 rotates at $+\alpha°$ along with the face. Since the eyeball 3 rotates at $\alpha°$ in a reverse direction, that is, at $-\alpha°$ by vestibulo-ocular reflex at this time, with the use of the position where the line of sight 2 has moved by $-\alpha°$ on the lens 10, the geometric center 55 of the rectangular pattern 50 of the target is viewed. Accordingly, since the number of transmissions of the line of sight 2 to the lens 10 or the entrance angle of the line of sight 2 to the lens 10 changes, the rectangular pattern 50 as an object is observed in a different form.

For this reason, when the head iteratively rotates horizontally or vertically, images of the object (rectangular pattern) 50 at both end positions at the maximum rotation angle or a predetermined rotation angle $\theta x1$ are superimposed at the geometric center 55 of the object, and misalignment in the shape therebetween is calculated geometrically. An example of the horizontal angle $\theta x1$ is the maximum horizontal angle $\theta xm$ (about 10 degrees) at which the eyeball 3 moves by vestibulo-ocular reflex.

One of the indexes which are used for sway evaluation is a sway indicator IDd, and the sway indicator IDd is obtained by calculating variations in the slope of the horizontal grid lines 53 and 54 and the vertical grid lines 51 and 52. A sway indicator IDs is obtained by calculating the movement areas of the horizontal grid lines 53 and 54 and the vertical grid lines 51 and 52.

Figure 7:
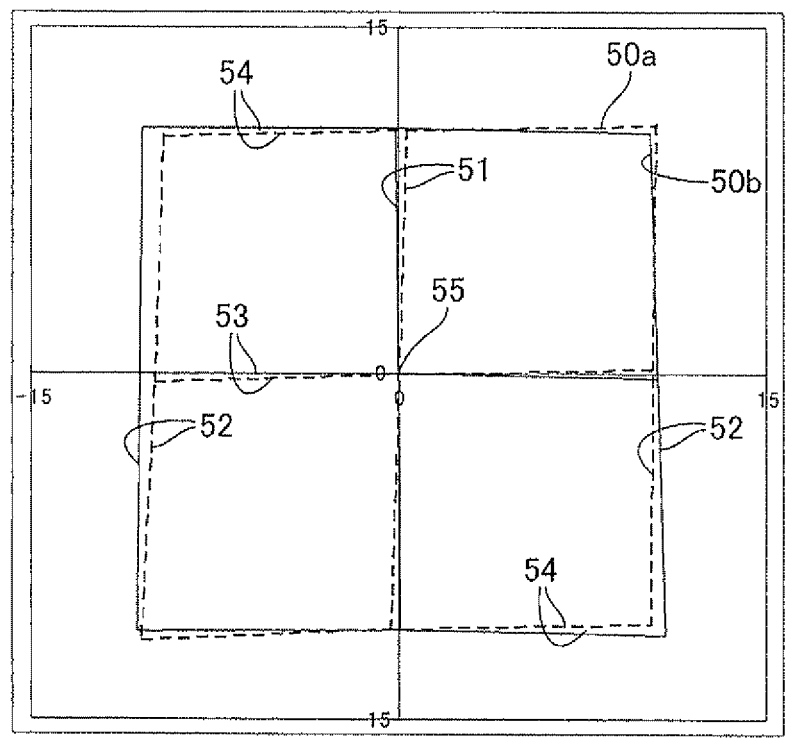
FIG. 7 is a diagram showing geometric misalignment of a rectangular pattern in an overlapping manner.

FIG. 7 shows an example of an image of the rectangular pattern 50 when the eyeball 3 and the rectangular pattern 50 have moved left and right at a first horizontal angle (rotation angle) $\theta x1$ (10 degrees) relative to the point of fixation. This state corresponds to a state where, when the spectacle lens 10 has moved left and right at a horizontal angle (rotation angle) of 10 degrees along with the head, the rectangular pattern 50 is viewed such that the rectangular pattern 50 does not move and the line of sight 2 does not move from the geometric center 55 of the rectangular pattern 50. A rectangular pattern 50a (broken line) is an image (right-rotation image) which is observed at a shaking angle 10° through the spectacle lens 10 by a ray tracing method, and a rectangular pattern 50b (solid line) is an image (left-rotation image) which is observed at a shaking angle of −10° in the same manner. These rectangular patterns 50a and 50b are superimposed such that the geometric centers 55 are aligned with each other. By comparison, an image of the rectangular pattern 50 which is observed at a shaking angle of 0° is substantially located in the middle. Images (upper-rotation image and lower-rotation image) which are observed when a shaking angle is set up and down can be obtained in the same manner.

These images (rectangular patterns) 50a and 50b are images of the object that the user actually obtains when the user shakes the head while viewing the object through the spectacle lens 10. The difference (deformation) between these images 50a and 50b can be regarded as representing the movement of an image when the head is shaken.

Figure 8:
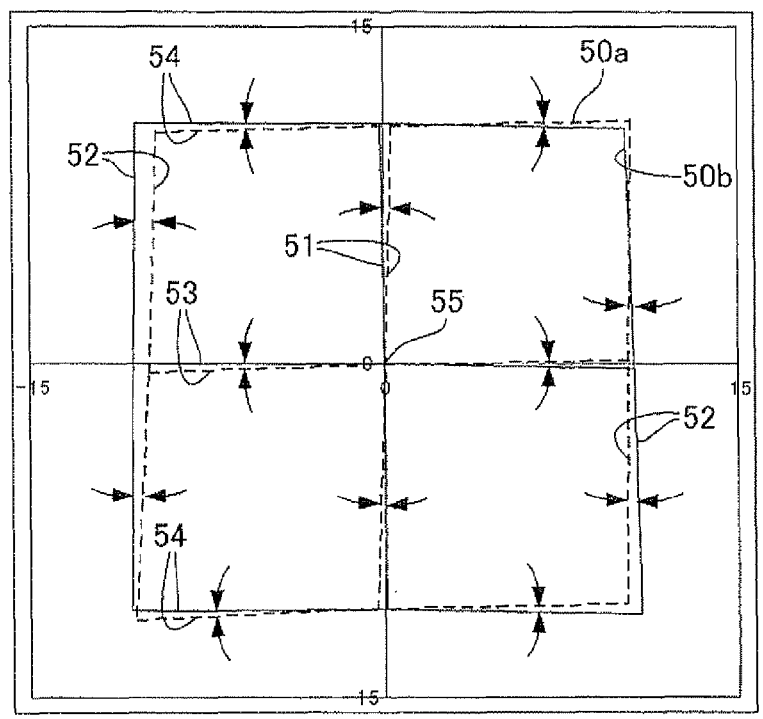
FIG. 8 is a diagram showing variations in the slope of grid lines of a rectangular pattern.

FIG. 8 shows the sway indicator (sway index) IDd. The sway indicator IDd refers to variations in the slope of the grid lines 51 to 54. As shown in FIG. 8, variations in the inclination of the respective sides (grid lines) 51 to 54 of the rectangular pattern 50 are calculated, thereby obtaining 12 sway indexes IDd. It is thought that, of these, the variations in the inclination of the horizontal grid lines 53 and 54 represent "ruffling (undulation)", and the variations in the inclination of the vertical grid lines 51 and 52 represent "fluctuation". Accordingly, if the variations in the inclination of the grid lines 51 to 54 are totaled in each direction, sway can be quantitatively evaluated as "a sense of ruffling" and "a sense of fluctuation".

Figure 9:
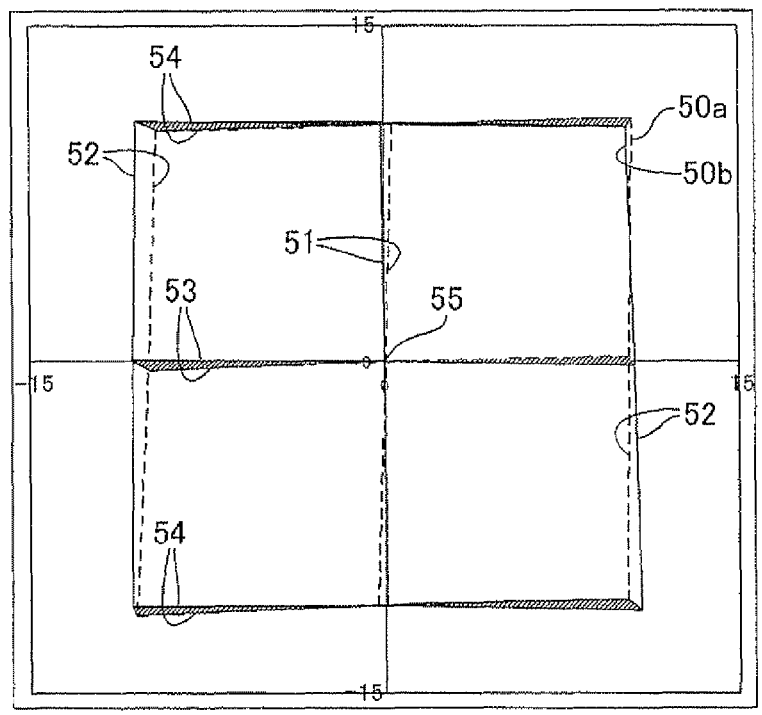
FIG. 9 is a diagram showing variations of grid lines in a horizontal direction of grid lines of a rectangular pattern.
Figure 10:
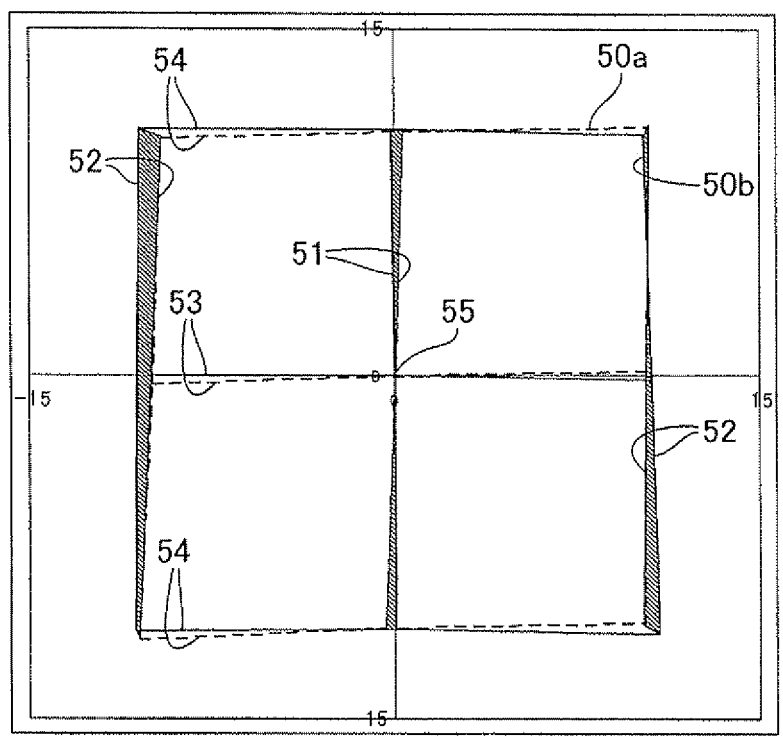
FIG. 10 is a diagram showing variations of grid lines in a vertical direction of grid lines of a rectangular pattern.

FIGS. 9 and 10 show the sway indicator (sway index) IDs. The sway indicator IDs is a different index which is used for sway evaluation, and refers to the magnitude of deformation of the overall shape of the rectangular pattern 50. As shown in FIGS. 9 and 10, in regard to the sway indicator IDs, the displacements of the grid lines 51 to 54 of the rectangular pattern 50 are geometrically calculated as areas, thereby obtaining 12 numerical values. FIG. 9 shows the displacements (hatched portions) of the horizontal grid lines 53 and 54, and FIG. 10 shows the displacements (hatched portions) of the vertical grid lines 51 and 52. The sway indicator IDs represented by the displacement (area) has the same tendency as the sway indicator IDd represented by the variation in the inclination. Meanwhile, when the lens 10 undergoes a significant change in magnification in the vicinity of a sway evaluation position, for example, when there is deformation in which expansion and contraction occur in the horizontal direction, these elements are included in the sway indicator IDs.

The sway indicators IDd and IDs can be used by purpose as a horizontal direction component, a vertical direction component, and a total value thereof. Hereinafter, the sway indicator IDd which is obtained from the variation in the inclination may be expressed as "vibration", and the sway indicator IDs which is obtained from the displacement of the grid line may be expressed as "deformation amount".

The unit of the sway indicator IDd of "vibration" is the variation in the inclination of each grid line on the viewing angle coordinates and is thus dimensionless. The unit of the sway indicator IDs of "deformation amount" is the area on the viewing angle coordinates, and is the square of the degree. The sway index IDs by the deformation amount may become dimensionless by dividing the area of the variation by the area at 0 degree before the head rotates, and may be expressed depending on the proportion (for example, percent).

In regard to the factor IDd relating to vibration, the vibration of the horizontal grid line 53 from among the vibration of the central grid lines (Center Line) 51 and 53 is indicated as "horizontal@CL", and the vibration of the vertical grid line 51 is indicated as "vertical@CL". The vibration of all the horizontal grid lines 53 and 54 including the central grid line 53 is indicated as "horizontal L", the vibration of all the vertical grid lines 51 and 52 is indicated as "vertical L", and the sum or average of the vibration of all the grid lines obtained by totaling "horizontal L" and "vertical L" is indicated as "total L".

Since "horizontal@CL" and "vertical@CL" are easily and simply calculated, it is convenient when calculation is done over the entire surface of the lens 10, and a map is created. Meanwhile, from the fact that, when a person (user) actually feels sway, not only a variation in only one horizontal or vertical line but also a variation of the outline of the target viewed as a form are simultaneously perceived, "horizontal L" and "vertical L" are regarded as indicators which are closer to the feeling of the user.

Since any user simultaneously perceives the horizontal direction and the vertical direction, "total L" obtained by totaling the horizontal direction and the vertical direction becomes the most appropriate indicator. However, there is a case where there is a possibility that any user has different susceptibility to "ruffling (undulation)" and "fluctuation" or how to use the line of sight based on the individual living environment concerns with "ruffling (undulation)" where the line of sight frequently moves in the horizontal direction or conversely concerns with "fluctuation". Accordingly, it is also useful to indicate and evaluate sway by each directional component.

In regard to the indicator IDs relating to a deformation amount, the variation area of all the horizontal grid lines 53 and 54 is indicated as "horizontal L", the variation area of all the vertical grid lines 51 and 52 is indicated as "vertical L", and the total thereof is indicated as "total L". The need for the indication of each component and the indication by the total is the same as that relating to vibration. The indicator IDs by the deformation amount has an advantage in that a variation in magnification is taken into consideration. In particular, in the progressive power lens 10, power addition is made in the vertical direction. For this reason, when the user sees an object while shaking the head in the longitudinal direction, there is a phenomenon that an image expands or is reduced with a variation in power, or is viewed to be shaken back and forth. When the addition power is large, the phenomenon that magnification falls down on the lateral side of the near portion becomes conspicuous. For this reason, expansion and contraction of an image in the lateral direction occur. The indicator IDs by the deformation amount can digitalize these variations, and is thus useful as an evaluation method.

2. Embodiment 1

2.1 First Design and Manufacturing Method

Figure 11:
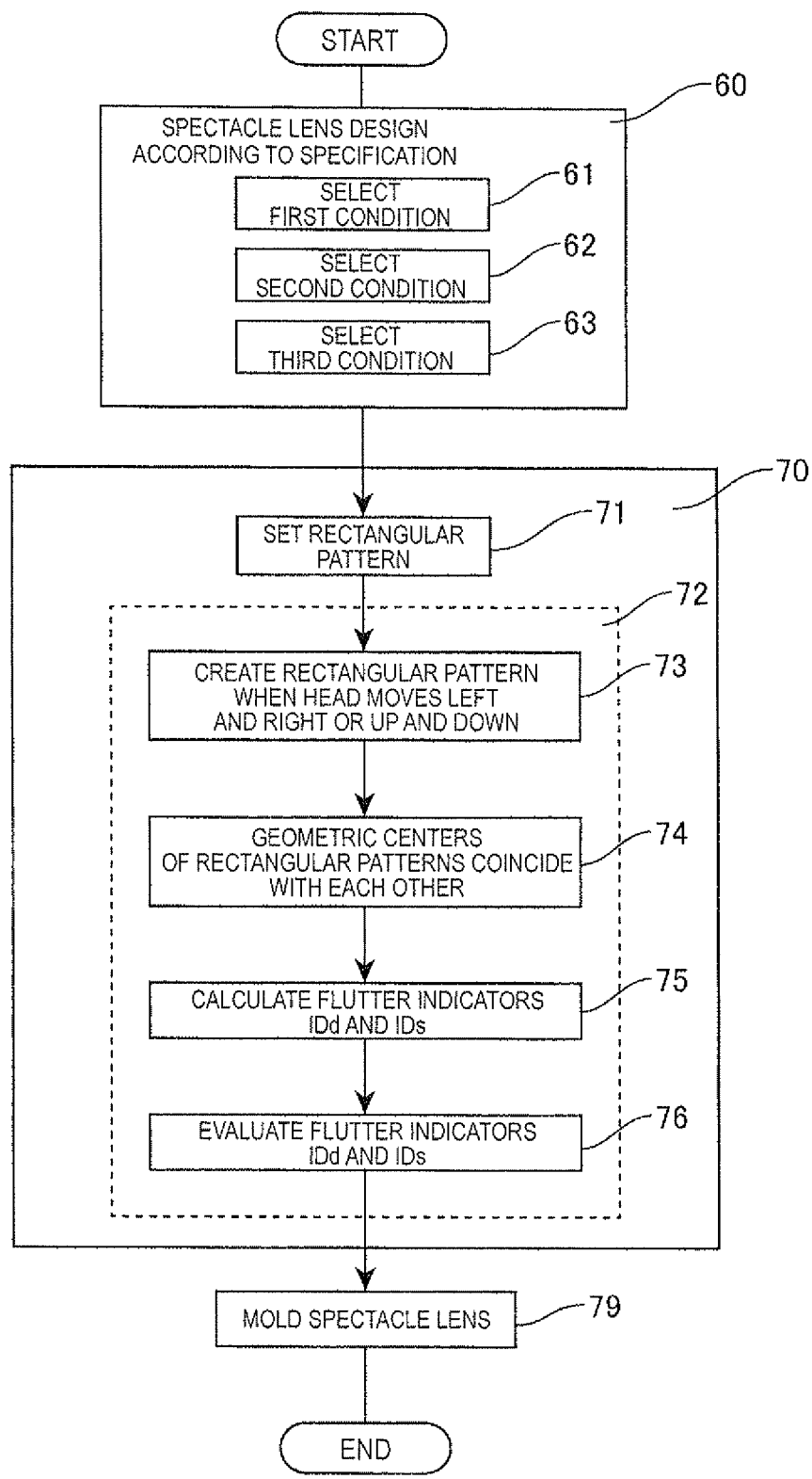
FIG. 11 is a flowchart showing a process for designing and manufacturing a progressive power lens according to a first embodiment.

FIG. 11 shows a method of evaluating, designing, and manufacturing a spectacle lens where image sway is quantified using the sway indicators IDd and IDs. This method includes Step 60 in which the progressive power lens 10 including the distance portion 11 and the near portion 12 is designed on the basis of the spectacle specification, Step 70 in which image sway of the designed progressive power lens 10 is evaluated, and Step 79 in which the progressive power lens 10 selected by evaluation is manufactured as a spectacle lens.

Step 60 in which the progressive power lens 10 is designed includes Step 61 in which a surface power OHPf in the horizontal direction and a surface power OVPf in the vertical direction of the distance portion 11 on the object-side surface 19A along the principal meridian 14, and the surface power OHPn in the horizontal direction and the surface power OVPn in the vertical direction of the near portion 12 on the object-side surface 19A are added to elements of a toric surface (toroidal surface) satisfying Expression (0), and a first condition satisfying Expression (1) is included in the spectacle specification, Step 62 in which a second condition satisfying Expression (2) is included in the spectacle specification, and Step 63 in which a third condition satisfying Expression (3) is included in the spectacle specification.

$$\text{OHPf} \geq \text{OVPf}$$

$$\text{OHPn} \geq \text{OVPn} \tag{0}$$

In Expression (0), equality is not established simultaneously.

$$\text{OVPf} > \text{OVPn} \tag{1}$$

$$\text{OVPf} < \text{OVPn} \tag{2}$$

$$\text{OVPf} = \text{OVPn}$$

$$\text{OHPf} = \text{OHPn} \tag{3}$$

The condition of the toric surface including Expression (0) includes a condition that the object-side surface 19A includes elements of a toric surface including at least one of elements of a toric surface of the distance portion 11 and elements of a toric surface of the near portion 12, a toric surface with the surface power in the horizontal direction greater than the surface power in the vertical direction is formed along the principal meridian 14 by the elements, and elements which cancel shifts in the surface power by the elements of the toric surface on the object-side surface 19A, that is, a toric surface is formed on the eyeball-side surface 19B.

The first condition including Expression (1) is that the surface power OVPf of the distance portion 11 is greater than the surface power OVPn of the near portion 12. Accordingly, Step 60 includes designing the progressive power lens 10 including elements of a toric surface by the spectacle specification where the surface power in the vertical direction progressively decreases from the intermediate portion 13 toward the near portion 12 on the principal meridian 14 of the object-side surface 19A. For this reason, in the progressive power lens 10 designed in Step 60 on the basis of the spectacle specification including the first condition, the object-side surface 19A includes regressive (object-side surface regressive) elements. The surface power OHPf in the horizontal direction of the distance portion 11 and the surface power OHPn in the horizontal direction of the near portion 12 may be equal, and similarly to the surface power in the vertical direction, regressive elements may be included.

The second condition including Expression (2) is that the surface power OVPf of the distance portion 11 is smaller than the surface power OVPn of the near portion 12. Accordingly, Step 60 includes designing a progressive power lens including elements of a toric surface by the spectacle specification where the surface power in the vertical direction progressively increases from the intermediate portion 13 toward the near portion 12 on the principal meridian 14 of the object-side surface 19A. For this reason, in the progressive power lens 10 designed in Step 60 on the basis of the spectacle specification including the second condition, the object-side surface 19A includes elements of a progressive surface (object-side progressive). The surface power OHPf in the horizontal direction of the distance portion 11 and the surface power OHPn in the horizontal direction of the near portion 12 may be equal, and similarly to the surface power in the vertical direction, the elements of the progressive surface may be included.

The third condition including Expression (3) is that the surface power OVPf of the distance portion 11 and the surface power OVPn of the near portion 12 are equal and the surface power OHPf in the horizontal direction of the distance portion 11 and the surface power OHPn in the horizontal direction of the near portion 12 are equal. Accordingly, in Step 60, a progressive power lens is designed using the spectacle specification where the object-side surface 19A is a simple toric surface (toroidal surface) along the principal meridian 14. For this reason, in the progressive power lens 10 designed on the basis of the spectacle specification including the third condition, a region along at least the principal meridian 14 of the object-side surface 19A includes elements of a simple toric surface.

As the visual characteristics of a person when the progressive power lens 10 is used, the use frequency on the principal meridian 14 is very high, and image sway is found when a visual operation is carried out near the principal meridian 14. Therefore, in regard to the conditions on the object-side surface 19A expressed by Expressions (0) to (3), if it is at least within about 10 mm in the horizontal direction with the principal meridian 14 as a center, it is possible to sufficiently obtain the image sway reduction effect or the like.

The progressive power lens 10 designed in this example is an eyeball-side progressive lens which includes elements of a toric surface to cancel shifts in the surface power of the toric surface on the object-side surface 19A. Accordingly, in the spectacle specification which is used in Step 60, a surface power IHPf in the horizontal direction and a surface power IVPf in the vertical direction of the distance portion 11 on the eyeball-side surface 19B along the principal meridian 14, and a surface power IHPn in the horizontal direction and a surface power IVPn in the vertical direction of the near portion 12 on the eyeball-side surface 19B along the principal meridian 14 are selected so as to include the condition of Expression (4)

IHPf>IVPf

IHPn>IVPn

IHPf>IHPn (4)

Step 70 in which image sway of the progressive power lens 10 designed in Step 60 is evaluated includes Step 71 in which the virtual plane 59 including the rectangular pattern 50 is set such that the geometric center 55 is aligned with a point of fixation through the progressive power lens 10, and Step 72 in which geometric misalignment when the rectangular patterns 50 are superimposed by movement of the line of sight is obtained as a sway indicator.

In Step 71, the virtual plane 59 having the rectangular pattern 50 with the central vertical grid line 51 passing through the geometric center 55 and the left and right vertical grid lines 52 horizontally symmetrical to the central vertical grid line 51, the central horizontal grid line 53 passing through the geometric center 55 and the upper and lower horizontal grid lines 54 vertically symmetrical to the central horizontal grid line 53 is set such that the geometric center 55 is aligned with the point of fixation, for example, the fitting point Pe through the progressive power lens 10 including the assumed object-side surface 19A and eyeball-side surface 19B. In this example, the virtual plane 59 is set such that the left and right vertical grid lines 52 (three vertical lines including the center) are viewed near a maximum horizontal angle θmx (10 degrees) at which the eyeball moves by vestibulo-ocular reflex. In regard to the upper and lower horizontal grid lines 54, three lines including the center are viewed up and down at the same interval (viewing angle 10 degrees). The distance from the eyeball 3 to the virtual plane 59 is set to 1 m.

In Step 72 in which sway index is obtained, in Step 73, images (left-rotation image and right-rotation image) of a plurality of rectangular patterns 50 which are viewed when the eyeball 3 moves left and right by the maximum horizontal angle θmx with respect to the point of fixation or images (upper-rotation image and lower-rotation image) of a plurality of rectangular patterns 50 which are viewed when the eyeball 3 moves up and down by a maximum vertical angle θmy are produced. In Step 73, images (left-rotation image and right-rotation image) of rectangular patterns 50 which are viewed when the spectacle lens 10 moves left and right by a first horizontal angle (in this case, the maximum horizontal angle θmx) along with the head within a range in which the line of sight 2 does not move from the geometric center 55 or images (upper-rotation image and lower-rotation image) of rectangular patterns 50 which are viewed when the spectacle lens moves up and down by a first vertical angle along with the head within a range in which the line of sight 2 does not move from the geometric center 55 can be produced.

In Step 74, an image in which the images are superimposed such that the geometric centers 55 are aligned with each other is produced. In Step 75, geometric misalignment of the image in which the images are superimposed such that the geometric centers 55 are aligned with each other is calculated, and a sway indicator IDd representing vibration and a sway indicator IDs representing a deformation amount are obtained.

In Step 75, as the sway indicator IDd, variations in the inclination of the left and right vertical grid lines 52 and the upper and lower horizontal grid lines 54 are calculated, thereby obtaining "vertical L" and "horizontal L". Variations in the inclination of the central vertical grid line 51 and the central horizontal grid line 53 are calculated, thereby obtaining "vertical@L" and "horizontal@L". The average or sum of "vertical L" and "horizontal L" is calculated, thereby obtaining "total L".

As the sway indicator IDs, the movement areas of the left and right vertical grid lines 52 and the upper and lower horizontal grid lines 54 are calculated, thereby obtaining "vertical L" and "horizontal L". The average or sum of the calculated "vertical L" and "horizontal L" is calculated, thereby obtaining "total L". The movement areas of the central vertical grid line 51 and the central horizontal grid line 53 may be calculated to obtain the indicator.

As described above, the indicators IDd and IDs and "vertical L", "horizontal L", and "total L" are suitable as indicators representing image sway, and image sway can be expressed such that many people clearly understand the magnitude of image sway. The tendency and factor of image sway, for example, the factor, such as expansion and contraction, by comparison of the indicators, image sway can be expressed such that the user easily understand image sway.

In Step 76, the obtained sway indicators IDd and IDs are evaluated, and from among the progressive power lenses 10 designed using the spectacle specification including the first to third conditions, a spectacle lens most suitable for the user is selected. In Step 79, the spectacle lens 10 in which sway has been evaluated is molded.

In this way, if image sway is evaluated in advance, in the progressive power lens 10 having distance portion 11 and the near portion 12 of different powers, it is possible to manufacture the progressive power lens 10 in which the sway indicators IDd and IDs are obtained and evaluated in advance and to provide the progressive power lens 10 to the user.

Hereinafter, the evaluation result of the progressive power lens 10 designed on the basis of the spectacle specification including each of the first to third conditions as several conditions will be described. An eyeball-side progressive lens in which the object-side surface 19A is a spherical surface is evaluated as Comparative Example.

2.2 Examples

2.2.1 Example 1

2.2.1.1 Specification Including First Condition

A basic spectacle specification of Example 1 includes the use of a progressive power lens "SEKIO P-1 SYNERGY AS" (refractive index 1.67) manufactured by SEIKO EPSON CORPORATION. This progressive power lens is designed with the application of a progressive zone length of 14 mm, a prescription power (distance power, Sph) of 3.00 (D), and an addition power (Add) of 2.00 (D). The diameter of the progressive power lens of Example 1 is 65 mm, and an astigmatic power is not included. Accordingly, the progressive power lens of Example 1 is a far-sight system spectacle lens in which the average prescription power of the distance portion 11 is plus and the value thereof is equal to or greater than 3.0 (D).

Figure 12:
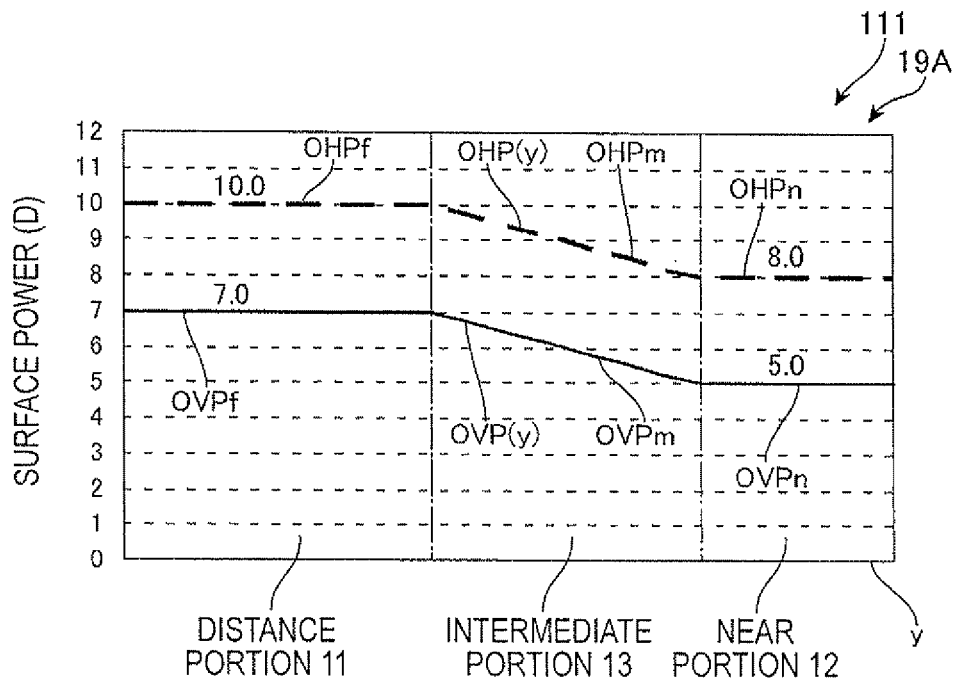
FIG. 12 is a diagram showing a surface power on a principal meridian on the object-side surface of a progressive power lens designed using a spectacle specification including a first condition of Example 1.
Figure 13:
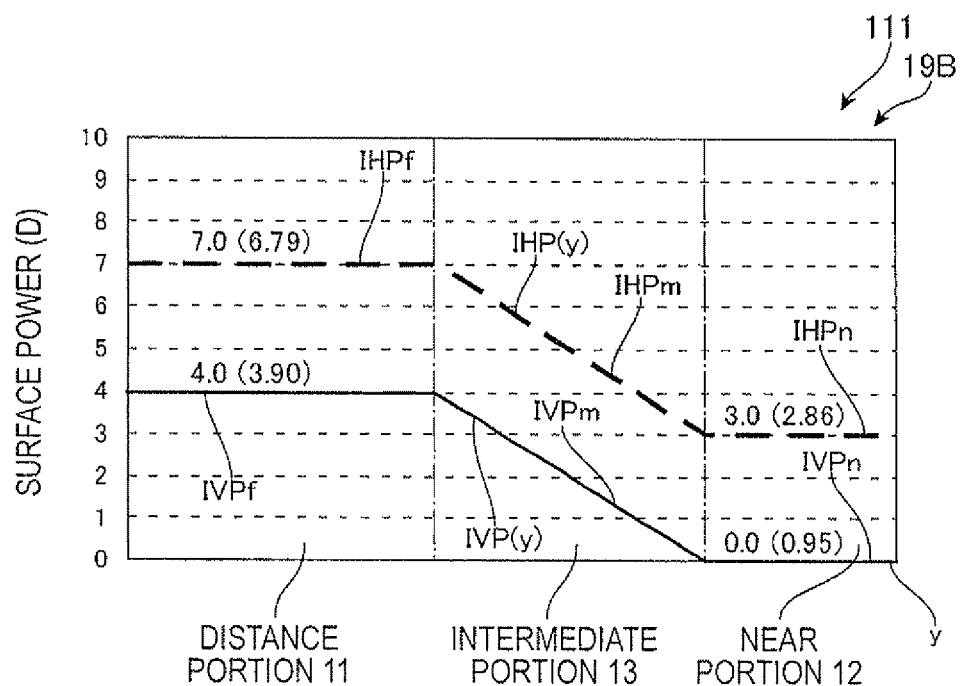
FIG. 13 is a diagram showing a surface power on a principal meridian on the eyeball-side surface of a progressive power lens designed using a spectacle specification including a first condition of Example 1.

FIG. 12 shows a surface power OHP(y) in the horizontal direction and a surface power OVP(y) in the vertical direction along the principal meridian 14 on the object-side surface 19A of a progressive power lens 111 designed using the spectacle specification including the elements of the toric surface expressed by Expression (0) and the first condition expressed by Expression (1) based on the basic specification in terms of dioptre (D). FIG. 13 shows a surface power IHP(y) in the horizontal direction and a surface power IVP(y) in the vertical direction along the principal meridian 14 on the eyeball-side surface 19B of the progressive power lens 111 in terms of dioptre (D).

Although the surface power IHP(y) in the horizontal direction and the surface power IVP(y) in the vertical direction on the eyeball-side surface 19B are intrinsically negative values, in this specification, all the surface powers on the eyeball-side surface 19B have absolute values. The same is also applied to the following description. The y coordinate is the coordinate of a vertical reference line with the fitting point Pe as the origin. The x coordinate described below is the coordinate of a horizontal reference line which is perpendicular to the vertical reference line with the fitting point Pe as the origin. The principal meridian 14 is inset near the nose relative to the vertical reference line, and the coordinate thereof is represented using the y coordinate.

In order to cancel shifts in the surface power by the elements of the toric surface on the object-side surface 19A, the surface power IHPf in the horizontal direction of the distance portion 11 and the surface power IHPn in the horizontal direction of the near portion 12 along the principal meridian 14 or a vertical reference line y (in this example, the principal meridian 14) on the eyeball-side surface 19B satisfy the following conditions $$\text{OHPf}-\text{OVPf}=\text{IHPf}-\text{IVPf} \tag{5}$$

$$\text{OHPn}-\text{OVPn}=\text{IHPn}-\text{IVPn} \tag{6}$$

These conditions and the following conditions do not include a prescription for astigmatism. That is, these conditions do not include a prescription for astigmatism in a prescription for a distance portion. The same is also applied to the following description. The surface powers IHPf and IHPn are absolute values.

With the conditions (5) and (6), elements of a toric surface which cancel shifts in the power by the elements of the toric surfaces in the distance portion and the near portion on the object-side surface can be provided in the distance portion and the near portion on the eyeball-side surface. Accordingly, in the intermediate portion, elements of a toric surface which cancel shifts in the power by the elements of the toric surface on the object-side surface can be provided.

The conditions (5) and (6) are conditional expressions when it is assumed that the thickness of the lens is small. In general, conditional expressions (5a) and (6a) with a shape factor taking into consideration the thickness of the lens for use in calculating the power of a spectacle lens are as follows.

$$\text{IHPf}-\text{IVPf}=\text{OHPf}/(1-t/n \times \text{OHPf})-\text{OVPf}/(1-t/n \times \text{OVPf}) \tag{5a}$$

$$\text{IHPn}-\text{IVPn}=\text{OHPn}/(1-t/n \times \text{OHPn})-\text{OVPn}/(1-t/n \times \text{OVPn}) \tag{6a}$$

Here, t is the thickness (unit meter) of the lens, and n is the refractive index of a lens material.

Although with the use of the expressions taking into consideration the thickness of the lens, it is possible to cancel the elements of the toric surface applied to the object-side surface on the eyeball-side surface with higher precision, the object can be substantially attained by the abbreviated expressions of the expressions (5) and (6). In the following description, in regard to the expression of the surface power IHP(y) in the horizontal direction and the surface power IVP(y) in the vertical direction along the principal meridian 14 of the eyeball-side surface 19B starting with FIG. 13, the lens is a thin lens such that the surface powers have values to neglect the influence of the thickness, and the values to be generally assumed with the thickness are shown in parentheses.

The elements of the toric surface on the object-side surface 19A are cancelled by the elements of the toric surface on the eyeball-side surface 19B, such that, while the elements of the toric surfaces on the eyeball-side and object-side surfaces are not intended for astigmatism correction, sway of images having passed through the spectacle lens involved in the movement of the eyes (line of sight) is suppressed. Thus, it is more effectively available.

In a progressive power lens 10a, in regard to a transmission refractive power (average power) HP in the horizontal direction and a transmission refractive power (average power) VP in the vertical direction along the principal meridian 14, if the line of sight 2 is perpendicular to the respective surfaces 19A and 19B of the lens 10a, HP and VP are obtained approximately by the following expressions.

$$HP(y) = OHP(y) - IHP(y) \quad (7)$$

$$VP(y) = OVP(y) - IVP(y) \quad (8)$$

Expressions (7) and (8) are relational expressions when it is assumed that the thickness of the lens is small, and may be substituted with relational expressions with a shape factor taking into consideration the thickness of the lens for use in generally calculating the power of a spectacle lens. In this case, Expressions (7a) and (8a) are obtained.

$$HP(y) = OHP(y)/(1 - t/n \times OHP(y)) - IHP(y) \quad (7a)$$

$$VP(y) = OVP(y)/(1 - t/n \times OVP(y)) - IVP(y) \quad (8a)$$

Here, t is the thickness (unit meter) of the lens, and n is the refractive index of a lens material. In regard to the y coordinates of Expressions (7), (7a), (8), and (8a), for more accurate calculation, in the peripheral portion of the lens, misalignment between the object-side surface and the eyeball-side surface at the transmission position of the line of sight on the lens is obtained by ray trace and applied.

In a region other than the principal meridian 14, it is necessary to take into consideration a prismatic effect since the line of sight 2 relative to the respective surfaces 19A and 19B of the lens 10 is inclined from the vertical direction. However, the relations of Expressions (7) and (8) are approximately established.

In the progressive power lens 111, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 12, the surface power OHPf in the horizontal direction of the distance portion 11 on the object-side surface 19A is constant to 10.0 (D). The surface power OHPm in the horizontal direction of the intermediate portion 13 progressively decreases and becomes 8.0 (D) in the near portion 12. The surface power OHPn in the horizontal direction of the near portion 12 is constant to 8.0 (D).

The surface power OVPf in the vertical direction of the distance portion 11 on the object-side surface 19A is constant to 7.0 (D). The surface power OVPm in the vertical direction of the intermediate portion 13 progressively decreases and becomes 5.0 (D) in the near portion 12. The surface power OVPn in the vertical direction of the near portion 12 is constant to 5.0 (D).

On the object-side surface 19A of the progressive power lens 111, a toric surface in which the surface powers OHPf, OHPm, and OHPn in the horizontal direction are respectively shifted in a direction to be greater than the surface powers OVPf, OVPm, and OVPn in the vertical direction by 3.0 (D) is formed along the principal meridian 14. In regard to the surface power in the vertical direction, the surface power OVPf of the distance portion 11 is greater than the surface power OVPn of the near portion 12 and includes regressive elements. In regard to the surface power in the horizontal direction, the surface power OHPf of the distance portion 11 is greater than the surface power OHPn of the near portion 12 and includes regressive elements.

In the eyeball-side surface 19B shown in FIG. 13, the surface power IHPf in the horizontal direction of the distance portion 11 is constant to 7.0 (D). The surface power IHPm in the horizontal direction of the intermediate portion 13 progressively decreases and becomes 3.0 (D) in the near portion 12. The surface power IHPn in the horizontal direction of the near portion 12 is constant to 3.0 (D). Although the values neglecting the thickness of the lens have been described, even when the thickness of the lens is taken into consideration, the values are different but the tendency is not changed.

The surface power IVPf in the vertical direction of the distance portion 11 on the eyeball-side surface 19B is constant to 4.0 (D). The surface power IVPm in the vertical direction of the intermediate portion 13 progressively decreases and becomes 0.0 (D) in the near portion 12. The surface power IVPn in the vertical direction of the near portion 12 is constant to 0.0 (D).

On the eyeball-side surface 19B of the progressive power lens 111, a toric surface in which the surface powers IHPf, IHPm, and IHPn in the horizontal direction are respectively shifted in a direction to be greater than the surface powers IVPf, IVPm, and IVPn in the vertical direction by 3.0 (D) is formed along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 111 includes the conditions of Expressions (0), (1), and (4).

2.2.1.2 Specification Including Second Condition

Figure 14:
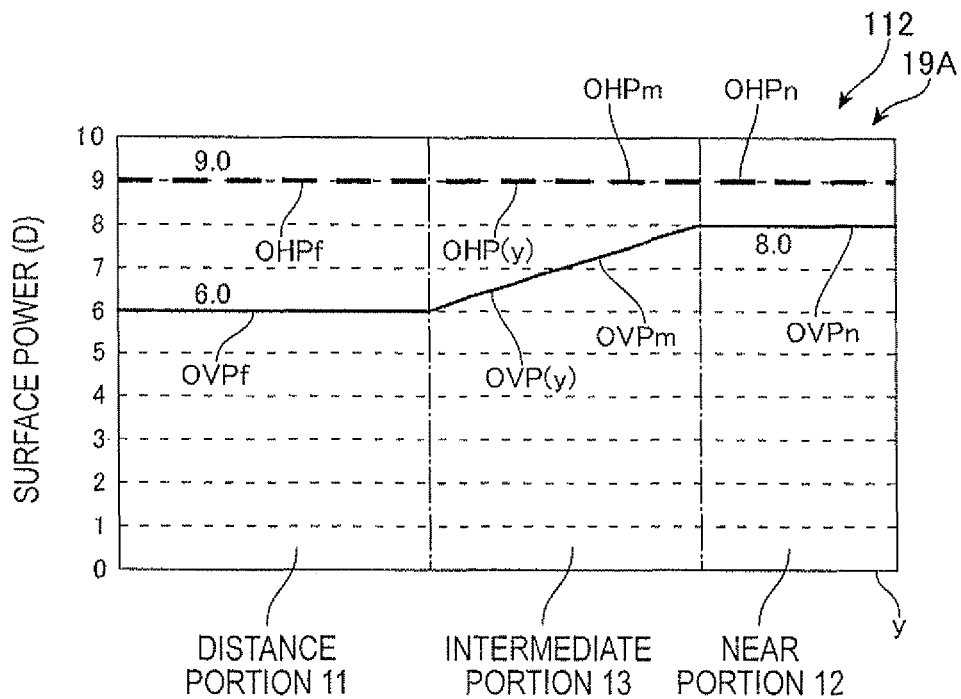
FIG. 14 is a diagram showing a surface power on a principal meridian on the object-side surface of a progressive power lens designed using a spectacle specification including a second condition of Example 1.
Figure 15:
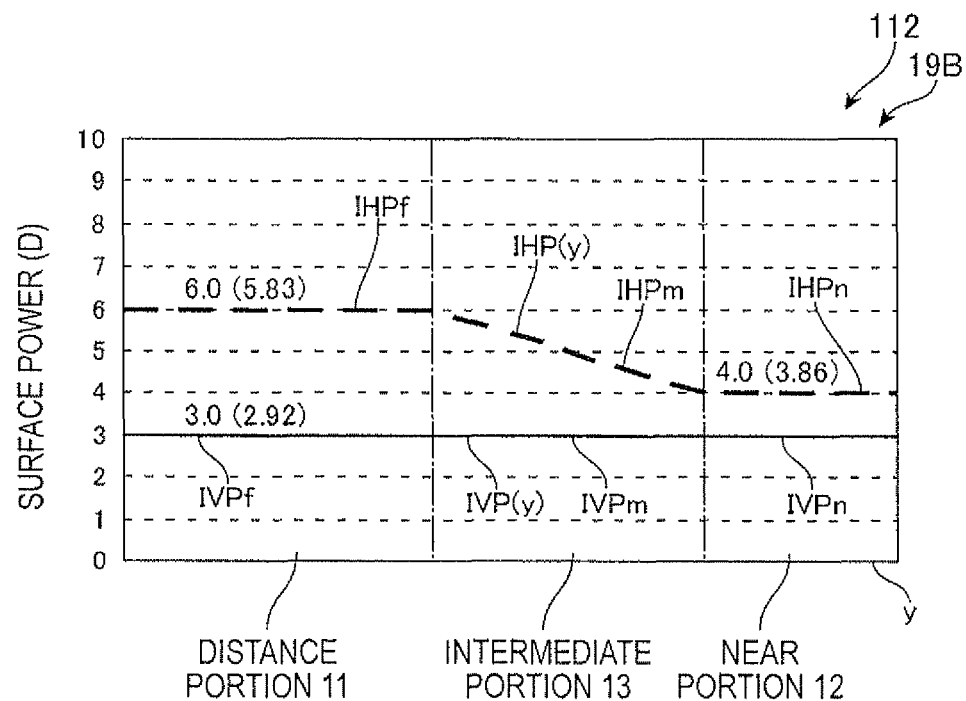
FIG. 15 is a diagram showing a surface power on a principal meridian on the eyeball-side surface of a progressive power lens designed using a spectacle specification including a second condition of Example 1.

FIG. 14 shows a surface power OHP(y) in the horizontal direction and a surface power OVP(y) in the vertical direction along the principal meridian 14 on the object-side surface 19A of a progressive power lens 112 designed using the spectacle specification including the elements of the toric surface expressed by Expression (0) and the second condition expressed by Expression (2) based on the basic specification in terms of dioptre (D). FIG. 15 shows a surface power IHP(y) in the horizontal direction and a surface power IVP(y) in the vertical direction along the principal meridian 14 on the eyeball-side surface 19B of the progressive power lens 112 in terms of dioptre (D). Unless particularly described, the spectacle specification is the same as the spectacle specification of (2.2.1.1). The same is also applied to the following description.

In the progressive power lens 112, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 14, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 9.0 (D).

The surface power OVPf in the vertical direction of the distance portion 11 on the object-side surface 19A is constant to 6.0 (D). The surface power OVPm in the vertical direction of the intermediate portion 13 progressively increases and becomes 8.0 (D) in the near portion 12. The surface power OVPn in the vertical direction of the near portion 12 is constant to 8.0 (D).

On the object-side surface 19A of the progressive power lens 112, a toric surface in which the surface power OHPf in the horizontal direction of the distance portion 11 is shifted in a direction to be greater than the surface power OVPf in the vertical direction by 3.0 (D), the surface power OHPn in the horizontal direction of the near portion 12 is shifted in a direction to be greater than the surface power OVPn in the vertical direction by 1.0 (D), and the surface power OVPm in the vertical direction of the intermediate portion 13 is progressively shifted is formed along the principal meridian 14. In regard to the surface power in the vertical direction, the surface power OVPn of the near portion 12 is greater than the surface power OVPf of the distance portion 11 and includes elements of a progressive surface.

On the eyeball-side surface 19B shown in FIG. 15, the surface power IHPf in the horizontal direction of the distance portion 11 is constant to 6.0 (D). The surface power IHPm in the horizontal direction of the intermediate portion 13 progressively decreases and becomes 4.0 (D) in the near portion 12. The surface power IHPn in the horizontal direction of the near portion 12 is constant to 4.0 (D).

The surface power IVPf in the vertical direction of the distance portion 11, the surface power IVPm in the vertical direction of the intermediate portion 13, and the surface power IVPn in the vertical direction of the near portion 12 on the eyeball-side surface 19B are constant to 3.0 (D).

On the eyeball-side surface 19B of the progressive power lens 112, a toric surface in which the surface power IHPf in the horizontal direction is shifted in a direction to be greater than the surface power IVPf in the vertical direction of the distance portion 11 by 3.0 (D), the surface power IHPn in the horizontal direction is shifted in a direction to be greater than the surface power IVPn in the vertical direction of the near portion 12 by 1.0 (D), and the surface power IHPm in the horizontal direction of the intermediate portion 13 is progressively shifted is formed along the principal meridian 14, and shifts in the surface power by the elements of the toric surface on the object-side surface 19A are cancelled. In regard to the surface power in the vertical direction, while the surface power IVPf of the distance portion 11 is equal to the surface power IVPn of the near portion 12, a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 112 includes the conditions of Expressions (0), (2), and (4).

2.2.1.3 Specification Including Third Condition

Figure 16:
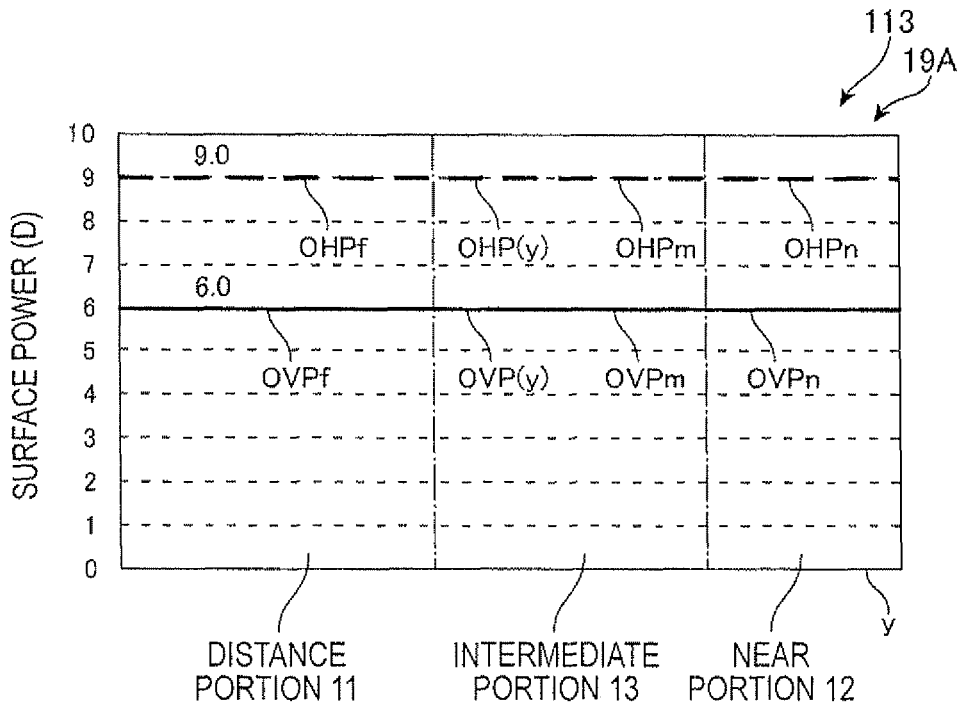
FIG. 16 is a diagram showing a surface power on a principal meridian on the object-side surface of a progressive power lens designed using a spectacle specification including a third condition of Example 1.
Figure 17:
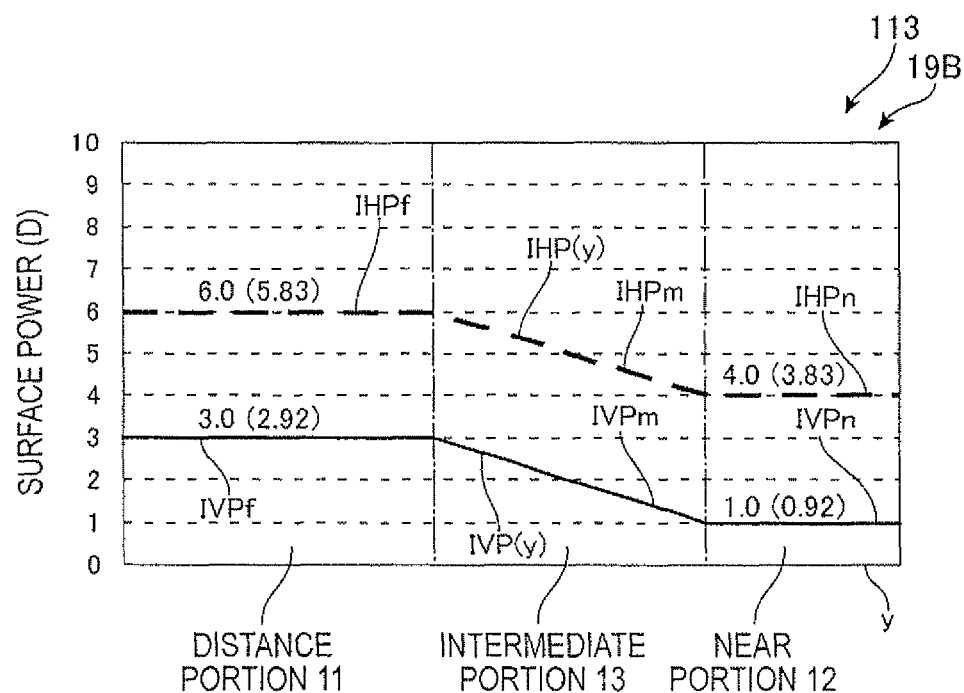
FIG. 17 is a diagram showing a surface power on a principal meridian on the eyeball-side surface of a progressive power lens designed using a spectacle specification including a third condition of Example 1.

FIG. 16 shows a surface power OHP(y) in the horizontal direction and a surface power OVP(y) in the vertical direction along the principal meridian 14 on the object-side surface 19A of a progressive power lens 113 designed using the spectacle specification including the elements of the toric surface expressed by Expression (0) and the third condition expressed by Expression (3) based on the basic specification in terms of dioptre (D). FIG. 17 shows a surface power IHP(y) in the horizontal direction and a surface power IVP(y) in the vertical direction along the principal meridian 14 on the eyeball-side surface 19B of the progressive power lens 113 in terms of dioptre (D).

In the progressive power lens 113, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 16, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 9.0 (D).

Similarly, the surface power OVPf in the vertical direction of the distance portion 11, the surface power OVPm in the vertical direction of the intermediate portion 13, and the surface power OVPn in the vertical direction of the near portion 12 on the object-side surface 19A are constant to 6.0 (D).

On the object-side surface 19A of the progressive power lens 113, a toric surface in which the surface powers OHPf, OHPm, and OHPn in the horizontal direction are respectively shifted in a direction to be greater than the surface powers OVPf, OVPm, and OVPn in the vertical direction by 3.0 (D) is formed along the principal meridian 14. The surface powers OVPf, OVPm, and OVPn in the vertical direction are equal, and the surface powers OHPf, OHPm, and OHPn in the horizontal direction are equal, such that a simple toric surface (toroidal surface) is formed along the principal meridian 14.

On the eyeball-side surface 19B shown in FIG. 17, the surface power IHPf in the horizontal direction of the distance portion 11 is constant to 6.0 (D). The surface power IHPm in the horizontal direction of the intermediate portion 13 progressively decreases and becomes 4.0 (D) in the near portion 12. The surface power IHPn in the horizontal direction of the near portion 12 is constant to 4.0 (D).

The surface power IVPf in the vertical direction of the distance portion 11 on the eyeball-side surface 19B is constant to 3.0 (D). The surface power IVPm in the vertical direction of the intermediate portion 13 progressively decreases and becomes 1.0 (D) in the near portion 12. The surface power IVPn in the vertical direction of the near portion 12 is constant to 1.0 (D).

On the eyeball-side surface 19B of the progressive power lens 113, a toric surface in which the surface powers IHPf, IHPm, and IHPn in the horizontal direction are respectively shifted in a direction to be greater than the surface powers IVPf, IVPm, and IVPn in the vertical direction by 3.0 (D) is formed along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 113 includes the conditions of Expressions (0), (3), and (4).

2.2.1.4 Comparative Example 1

Figure 18:
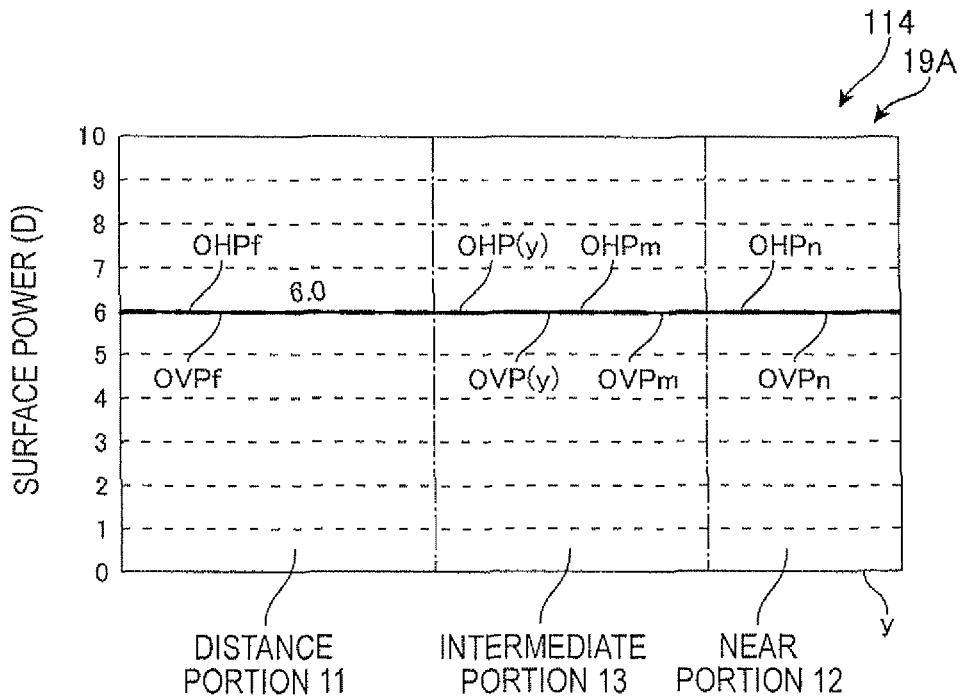
FIG. 18 is a diagram showing a surface power on a principal meridian on the object-side surface of a progressive power lens of Comparative Example 1.
Figure 19:
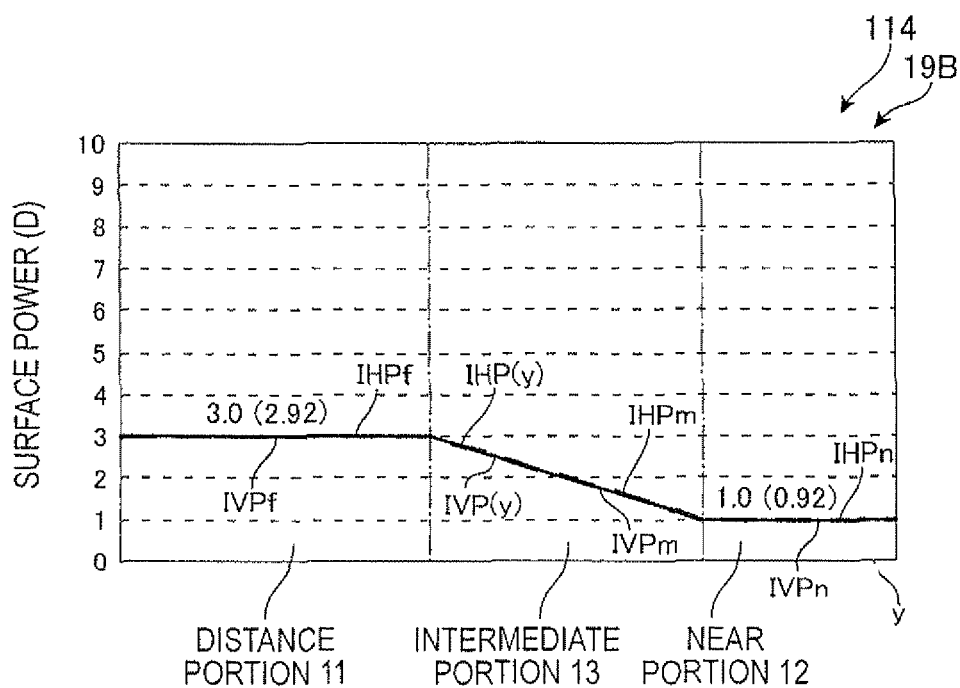
FIG. 19 is a diagram showing a surface power on a principal meridian on the eyeball-side surface of a progressive power lens of Comparative Example 1.
Figure 20A:
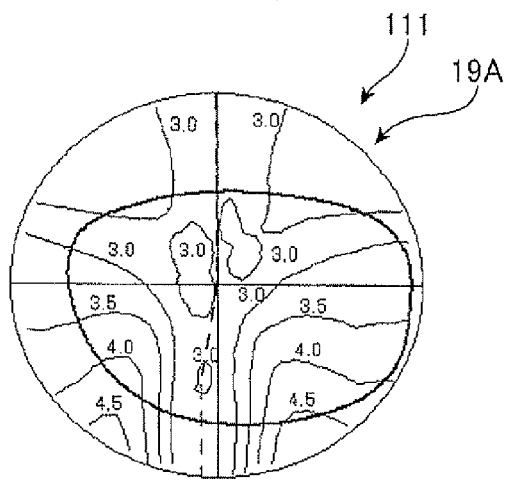
FIG. 20A is a diagram showing a surface astigmatism distribution on the object-side surface of a progressive power lens based on a first condition of Example 1.
Figure 20B:
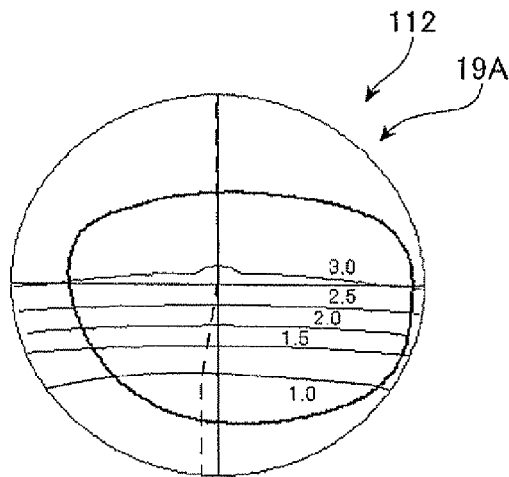
FIG. 20B is a diagram showing a surface astigmatism distribution on the object-side surface of a progressive power lens based on a second condition.
Figure 20C:
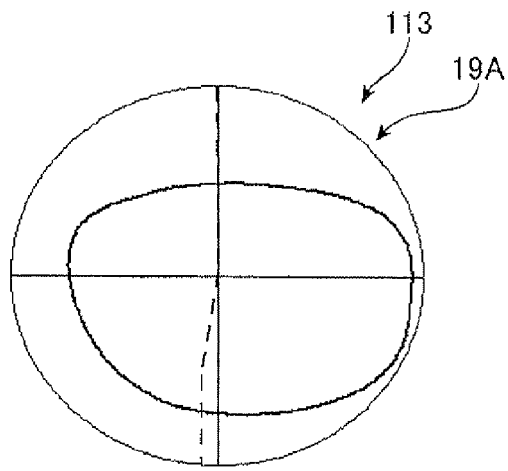
FIG. 20C is a diagram showing a surface astigmatism distribution on the object-side surface of a progressive power lens on a third condition.
Figure 20D:
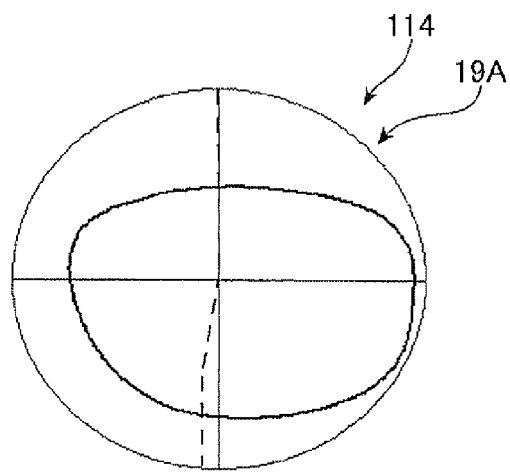
FIG. 20D is a diagram showing a surface astigmatism distribution on the object-side surface of a progressive power lens of Comparative Example 1.
Figure 21A:
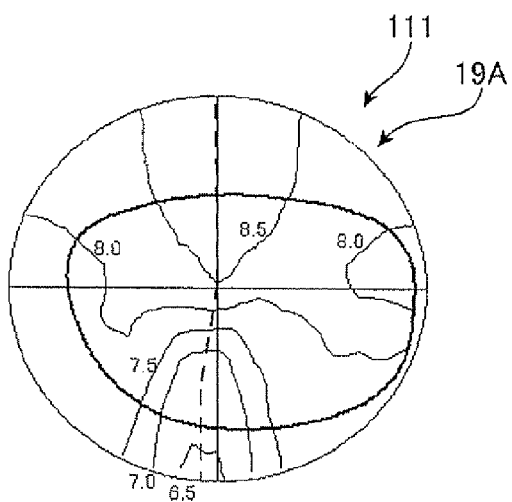
FIG. 21A is a diagram showing an equivalent spherical surface power distribution on the object-side surface of a progressive power lens based on a first condition of Example 1.
Figure 21B:
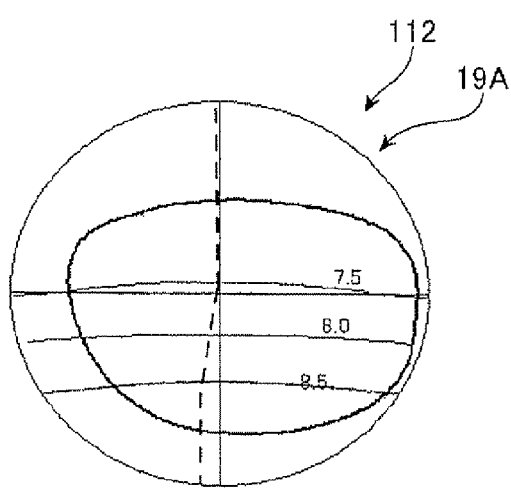
FIG. 21B is a diagram showing an equivalent spherical surface power distribution on the object-side surface of a progressive power lens based on a second condition.
Figure 21C:
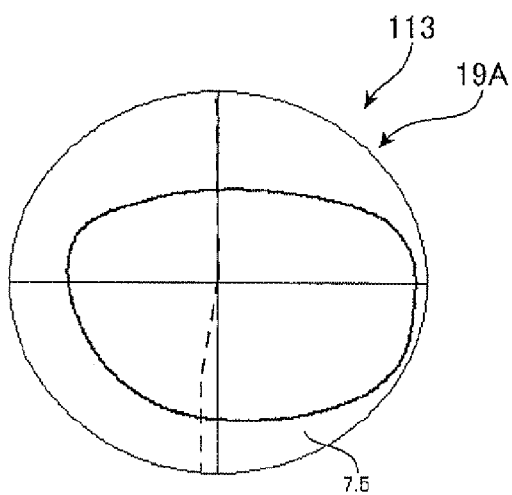
FIG. 21C is a diagram showing an equivalent spherical surface power distribution on the object-side surface of a progressive power lens based on a third condition.
Figure 21D:
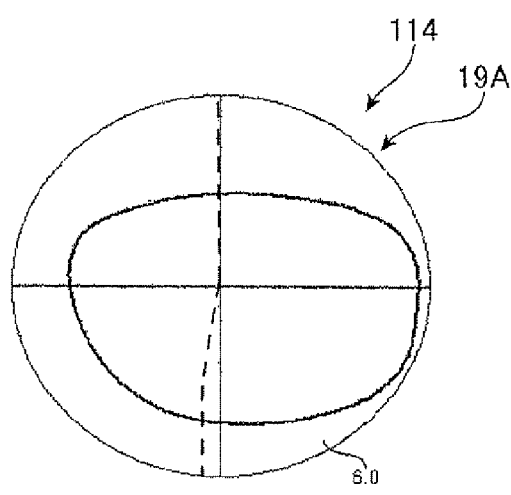
FIG. 21D is a diagram showing an equivalent spherical surface power distribution on the object-side surface of a progressive power lens of Comparative Example 1.
Figure 22A:
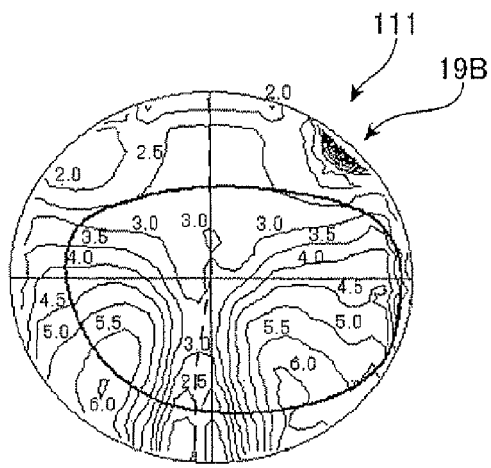
FIG. 22A is a diagram showing a surface astigmatism distribution on the eyeball-side surface of a progressive power lens based on a first condition of Example 1.
Figure 22B:
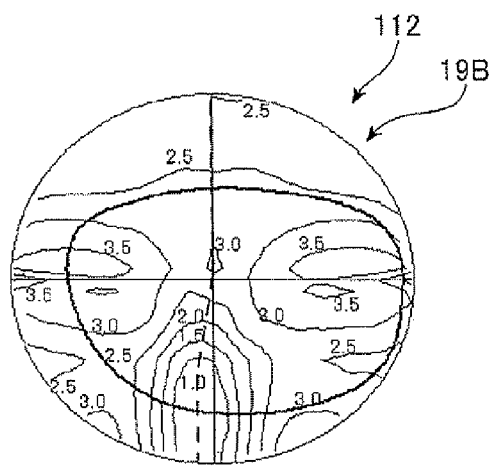
FIG. 22B is a diagram showing a surface astigmatism distribution on the eyeball-side surface of a progressive power lens based on a second condition.
Figure 22C:
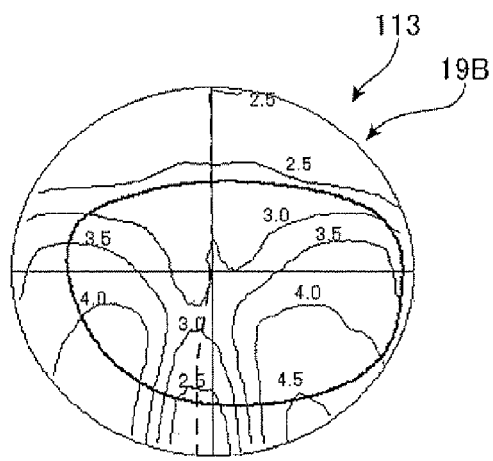
FIG. 22C is a diagram showing a surface astigmatism distribution on the eyeball-side surface of a progressive power lens based on a third condition.
Figure 22D:
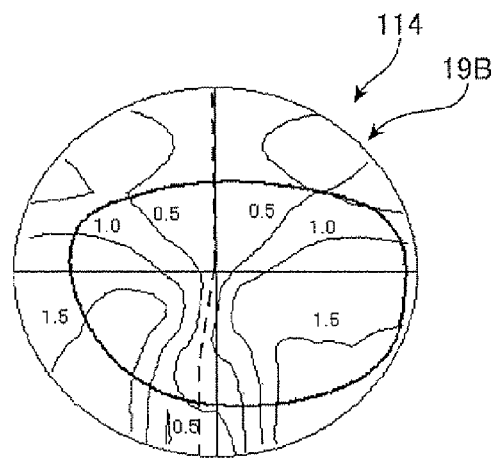
FIG. 22D is a diagram showing a surface astigmatism distribution on the eyeball-side surface of a progressive power lens of Comparative Example 1.
Figure 23A:
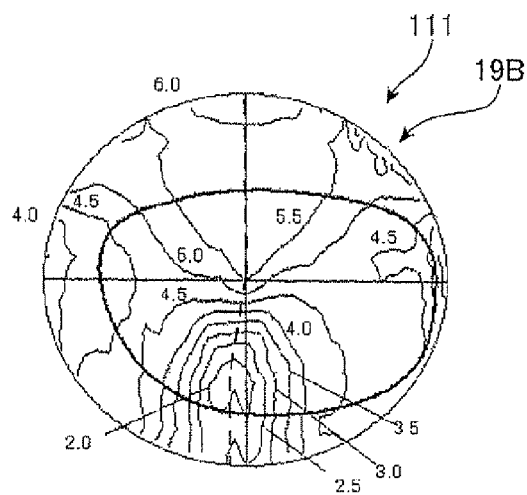
FIG. 23A is a diagram showing an equivalent spherical surface power distribution on the eyeball-side surface of a progressive power lens based on a first condition of Example 1.
Figure 23B:
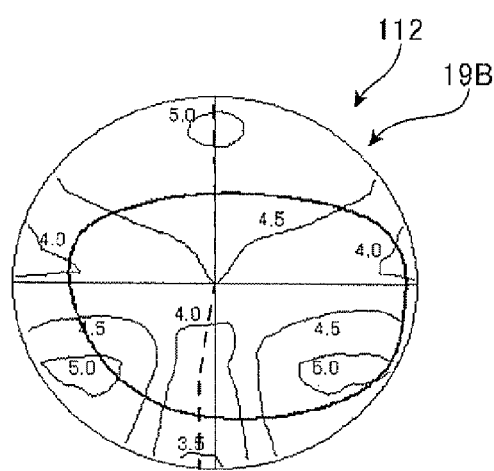
FIG. 23B is a diagram showing an equivalent spherical surface power distribution on the eyeball-side surface of a progressive power lens based on a second condition.
Figure 23C:
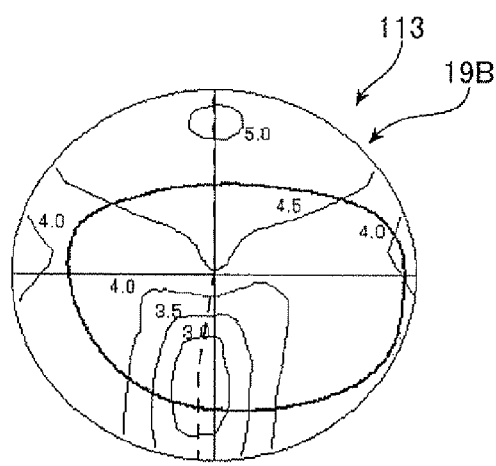
FIG. 23C is a diagram showing an equivalent spherical surface power distribution on the eyeball-side surface of a progressive power lens based on a third condition.
Figure 23D:
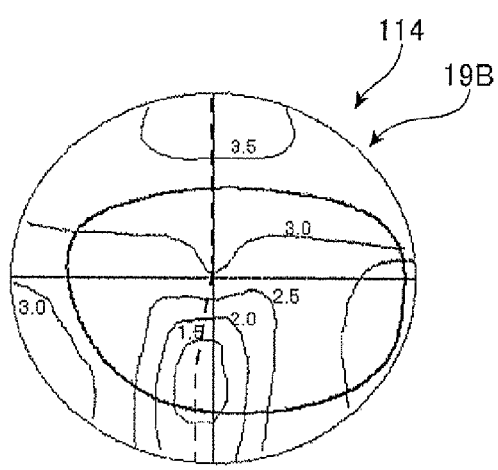
FIG. 23D is a diagram showing an equivalent spherical surface power distribution on the eyeball-side surface of a progressive power lens of Comparative Example 1.
Figure 24A:
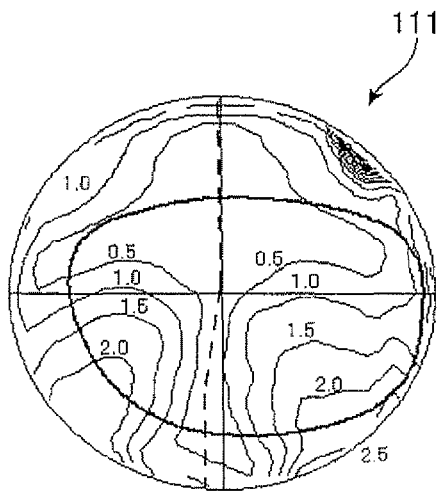
FIG. 24A is a diagram showing an astigmatism distribution of a progressive power lens based on a first condition of Example 1.
Figure 24B:
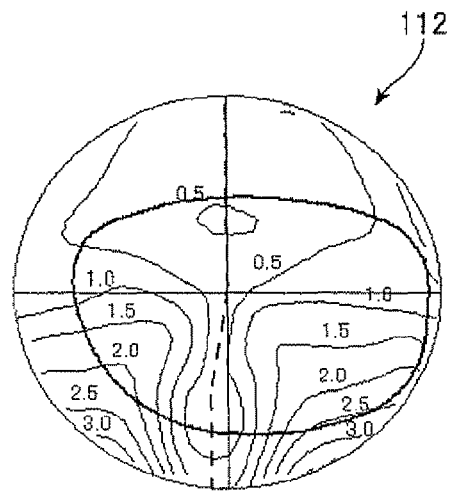
FIG. 24B is a diagram showing an astigmatism distribution of a progressive power lens based on a second condition.
Figure 24C:
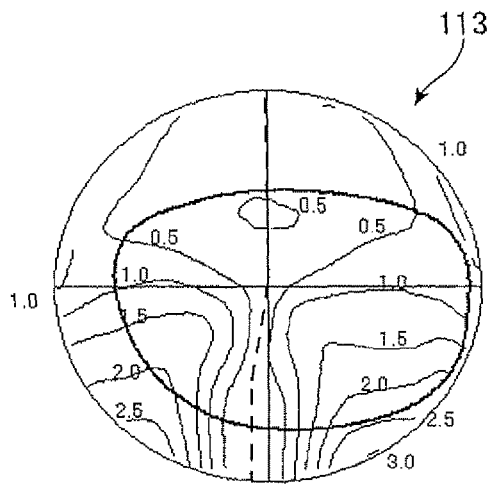
FIG. 24C is a diagram showing an astigmatism distribution of a progressive power lens based on a third condition.
Figure 24D:
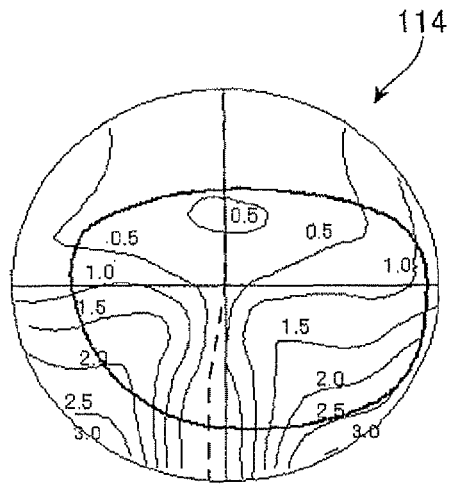
FIG. 24D is a diagram showing an astigmatism distribution of a progressive power lens of Comparative Example 1.
Figure 25A:
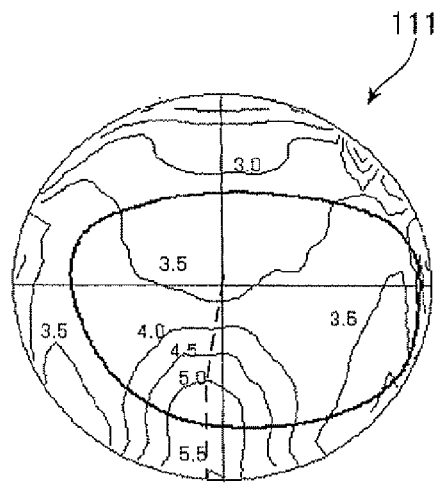
FIG. 25A is a diagram showing an equivalent spherical power distribution of a progressive power lens based on a first condition of Example 1.
Figure 25B:
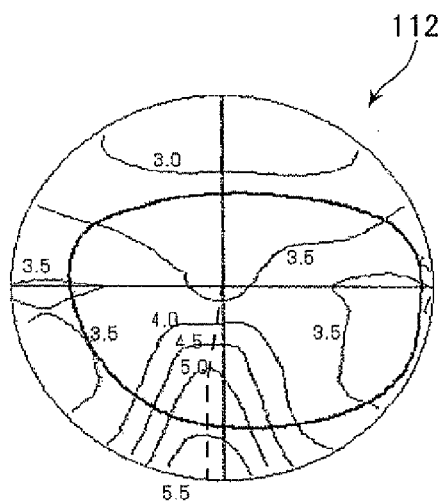
FIG. 25B is a diagram showing an equivalent spherical power distribution of a progressive power lens based on a second condition.
Figure 25C:
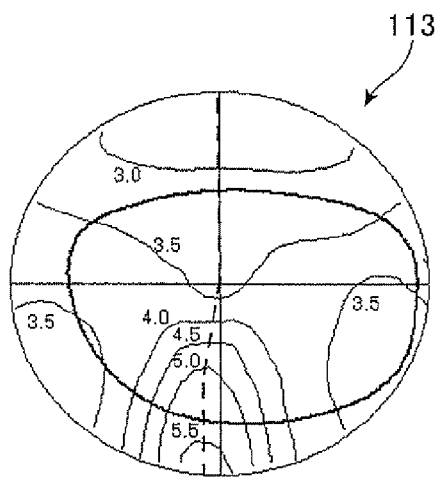
FIG. 25C is a diagram showing an equivalent spherical power distribution of a progressive power lens based on a third condition.
Figure 25D:
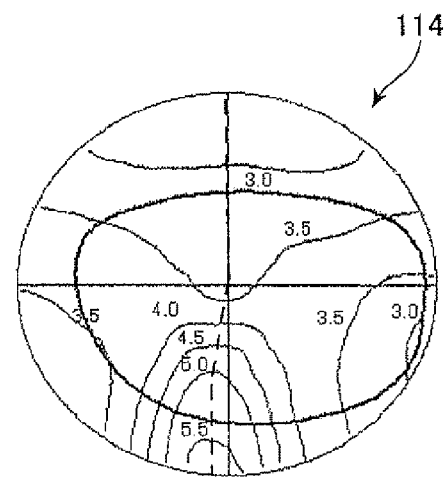
FIG. 25D is a diagram showing an equivalent spherical power distribution of a progressive power lens of Comparative Example 1.

FIG. 18 shows a surface power OHP(y) in the horizontal direction and a surface power OVP(y) in the vertical direction along the principal meridian 14 on the object-side surface 19A of a progressive power lens 114 of Comparative Example 1 designed using an eyeball-side progressive specification, in which the object-side surface 19A is a spherical surface, based on the basic specification in terms of dioptre (D) FIG. 19 shows a surface power IHP(y) in the horizontal direction and a surface power IVP(y) in the vertical direction along the principal meridian 14 on the eyeball-side surface 19B of the progressive power lens 114 in terms of dioptre (D).

As shown in FIG. 18, on the object-side surface 19A of the progressive power lens 114, the surface power OHPf in the horizontal direction of the distance portion 11, the surface power OHPm in the horizontal direction of the intermediate portion 13, the surface power OHPn in the horizontal direction of the near portion 12, the surface power OVPf in the vertical direction of the distance portion 11, the surface power OVPm in the vertical direction of the intermediate portion 13, and the surface power OVPn in the vertical direction of the near portion 12 are constant to 6.0 (D).

On the eyeball-side surface 19B of the progressive power lens 114 shown in FIG. 19, the surface power IHPf in the horizontal direction and the surface power IVPf in the vertical direction of the distance portion 11 are constant to 3.0 (D). The surface power IHPm in the horizontal direction and the surface power IVPm in the vertical direction of the intermediate portion 13 progressively decrease and become 1.0 (D) in the near portion 12. The surface power IHPn in the horizontal direction and the surface power IVPn in the vertical direction of the near portion 12 are constant to 1.0 (D).

Accordingly, the progressive power lens 114 is an eyeball-side progressive lens for a spherical prescription, and does not include elements of a toric surface other than astigmatism correction.

2.2.1.5 Comparison

FIGS. 20A to 20D show surface astigmatism distributions on the object-side surface 19A of the progressive power lenses 111 to 114 of Example 1 and Comparative Example 1. FIGS. 21A to 21D show equivalent spherical surface power distributions on the object-side surface 19A of the progressive power lenses 111 to 114 of Example 1 and Comparative Example 1. An equivalent spherical surface power ESP is obtained by Expression (9).

$$ESP=(OHP+OVP)/2 \qquad (9)$$

The unit of each value in the drawings is (D, dioptre). Lines in the vertical and horizontal directions of the drawing represent reference lines (vertical reference line y and horizontal reference line x) which pass through the geometric center 55 of a circular lens, and a shape image when the progressive power lens is fitted into the frame with the geometric center 55, which is the intersection between the reference lines, as a fitting point is shown. A principal meridian is indicated by a broken line. The same is also applied to the subsequent drawings.

FIGS. 22A to 22D show surface astigmatism distributions on the eyeball-side surface 19B of the progressive power lenses 111 to 114 of Example 1 and Comparative Example 1. FIGS. 23A to 23D show equivalent spherical surface power distributions on the eyeball-side surface 19B of the progressive power lenses 111 to 114 of Example 1 and Comparative Example 1.

FIGS. 24A to 24D show astigmatism distributions when observation is done through each position on the lens in the progressive power lenses 111 to 114 of Example 1 and Comparative Example 1. FIGS. 25A to 25D show equivalent spherical power distributions when observation is done through each position on the lens in the progressive power lenses 111 to 114 of Example 1 and Comparative Example 1. As shown in these drawings, the progressive power lenses 111 to 113 of Example 1 are designed such that the astigmatism distribution and the equivalent spherical power distribution are substantially the same as those in the progressive power lens 114 of Comparative Example 1. That is, the eyeball-side surface 19B of each of the progressive power lenses 111 to 113 is corrected to substantially have the same optical characteristics (astigmatism and equivalent spherical power) within at least a range of the shape when the lens is fitted into the frame to correspond to the progressive power lens 114 of Comparative Example 1.

Figure 26A:
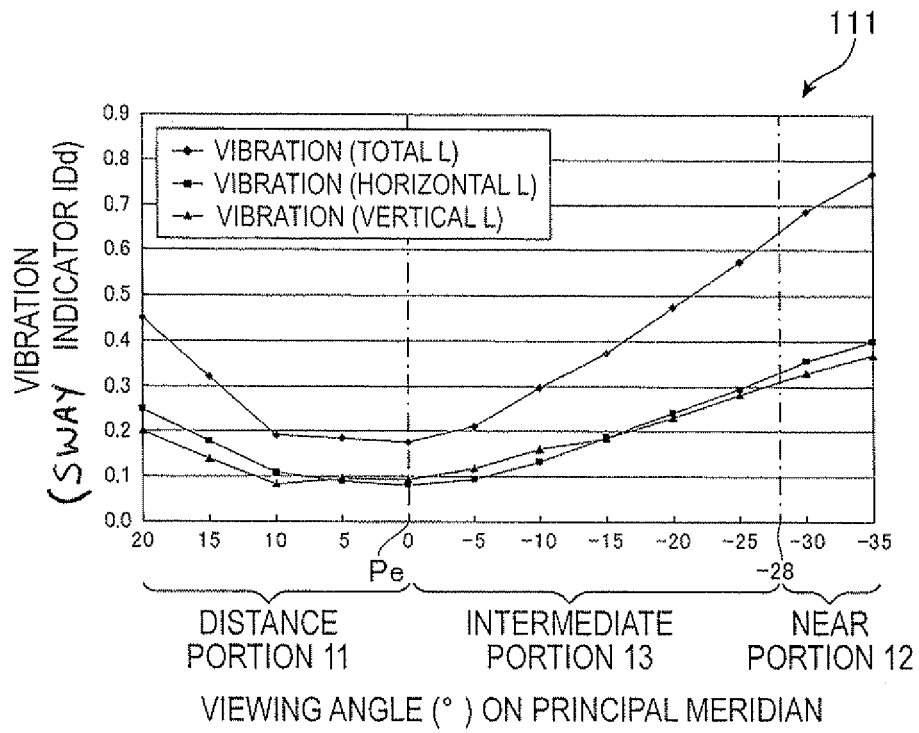
FIG. 26A is a diagram showing vibration (sway indicator IDd) of a progressive power lens based on a first condition of Example 1.
Figure 26B:
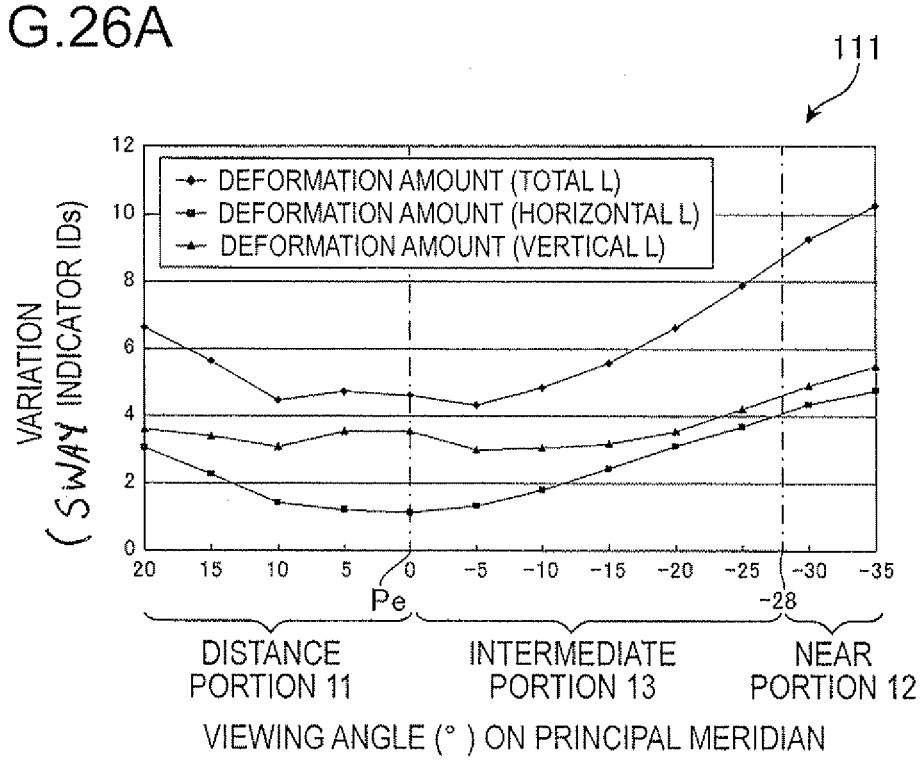
FIG. 26B is a diagram showing a deformation amount (sway indicator IDs).

FIG. 26A shows an indicator IDd relating to vibration obtained by the above-described sway evaluation method (Step 70) in the progressive power lens 111. FIG. 263 shows an indicator (a sway indicator by a variation) IDs relating to a deformation amount obtained by the sway evaluation method in the progressive power lens 111. The viewing angle pitch of the grid 50 under observation is 10 degrees, the head is shaken in the left-right direction, and the shaking angle is 10 degrees left and right. The indicator IDs relating to a deformation amount represents the deformation amount by the proportion (%). Hereinafter, unless particularly described, observation is done under the same condition.

In regard to the indicator IDd relating to vibration, "horizontal L" which is the sum of the vibration of all the horizontal grid lines 53 and 54 including the central grid line 53, "vertical L" which is the sum of the vibration of all the vertical grid lines 51 and 52, and "total L" which represents the sum or average of the vibration of all the grid lines obtained by totaling "horizontal L" and "vertical L" are obtained at a few points along the principal meridian. The fitting point Pe of the progressive power lens 111 is in the horizontal front vision with the viewing angle of 0 degrees, that is, at the primary position of the eye. The distance portion 11 is up to 20 degrees upward from the fitting point Pe, the intermediate portion 13 is up to near about −28 degrees downward from the fitting point Pe, and below the intermediate portion 13 corresponds to the near portion 12. The same is also applied to the respective lenses.

In regard to the indicator IDs relating to a deformation amount, "horizontal L" which is the sum of the variation areas of all the horizontal grid lines 53 and 54 including the central grid line 53, "vertical L" which is the sum of the variation areas of all the vertical grid lines 51 and 52, and "total L" which is the sum or average of the variation areas of all the grid lines obtained by totaling "horizontal L" and "vertical L" are obtained at a few points along the principal meridian.

Figure 27A:
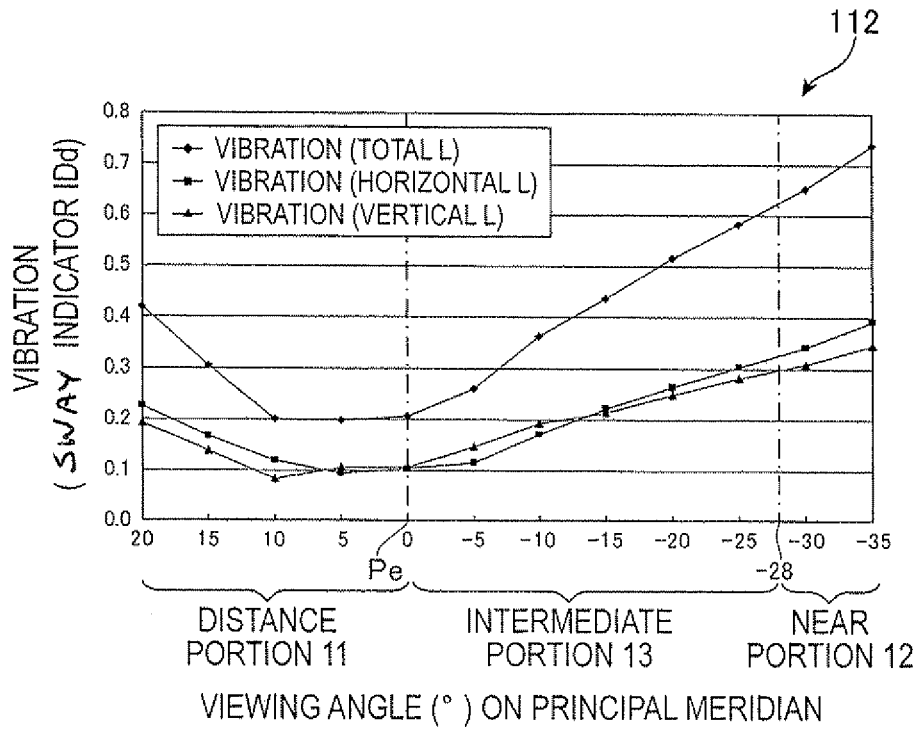
FIG. 27A is a diagram showing vibration (sway indicator IDd) of a progressive power lens based on a second condition of Example 1.
Figure 27B:
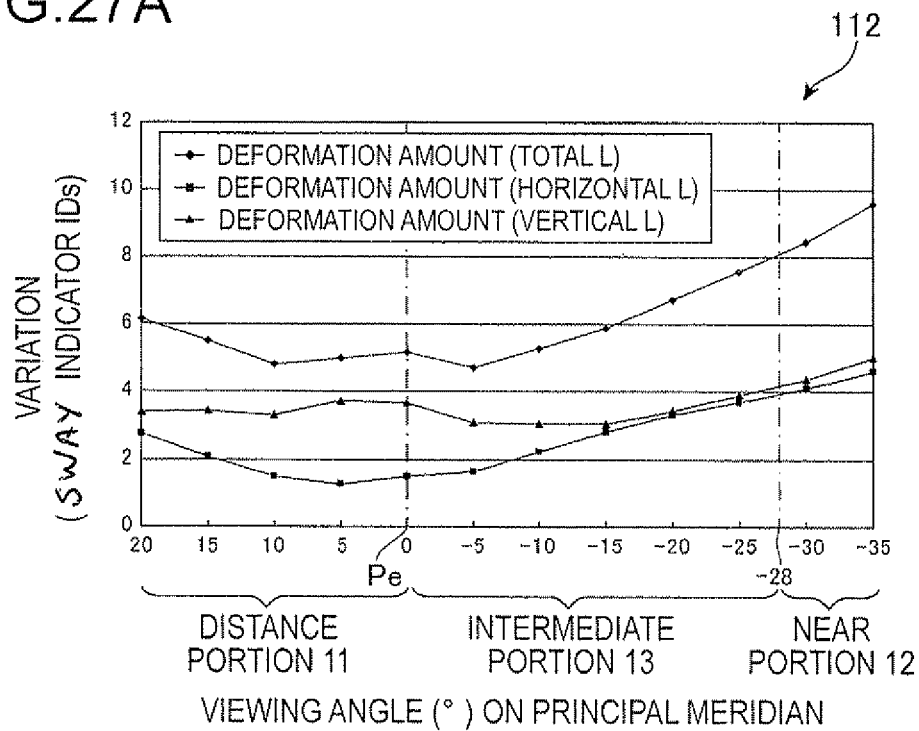
FIG. 27B is a diagram showing a deformation amount (sway indicator IDs).
Figure 28A:
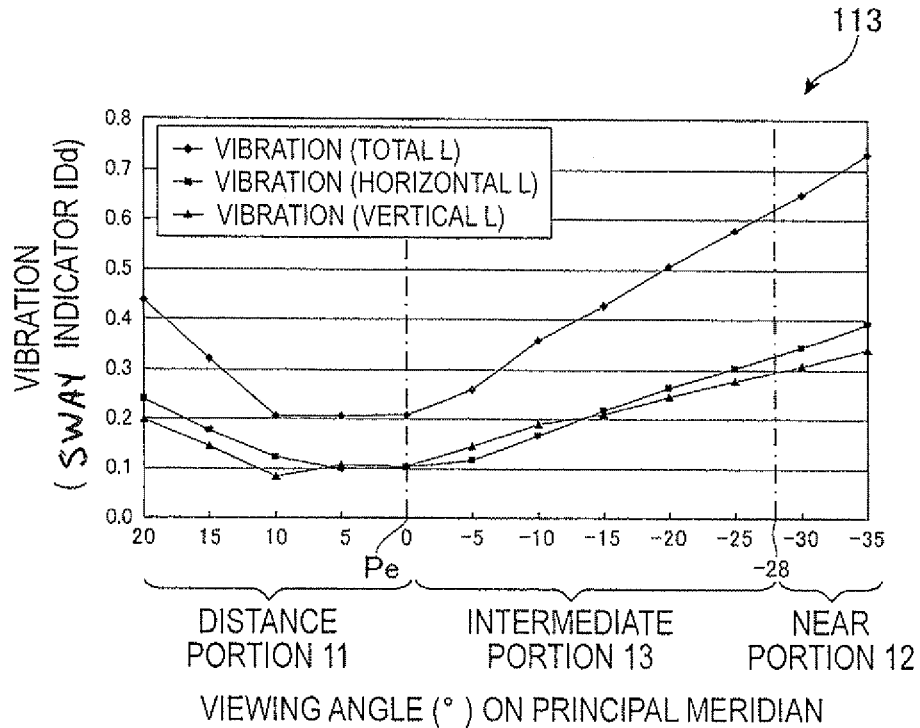
FIG. 28A is a diagram showing vibration (sway indicator IDd) of a progressive power lens based on a third condition of Example 1.
Figure 28B:
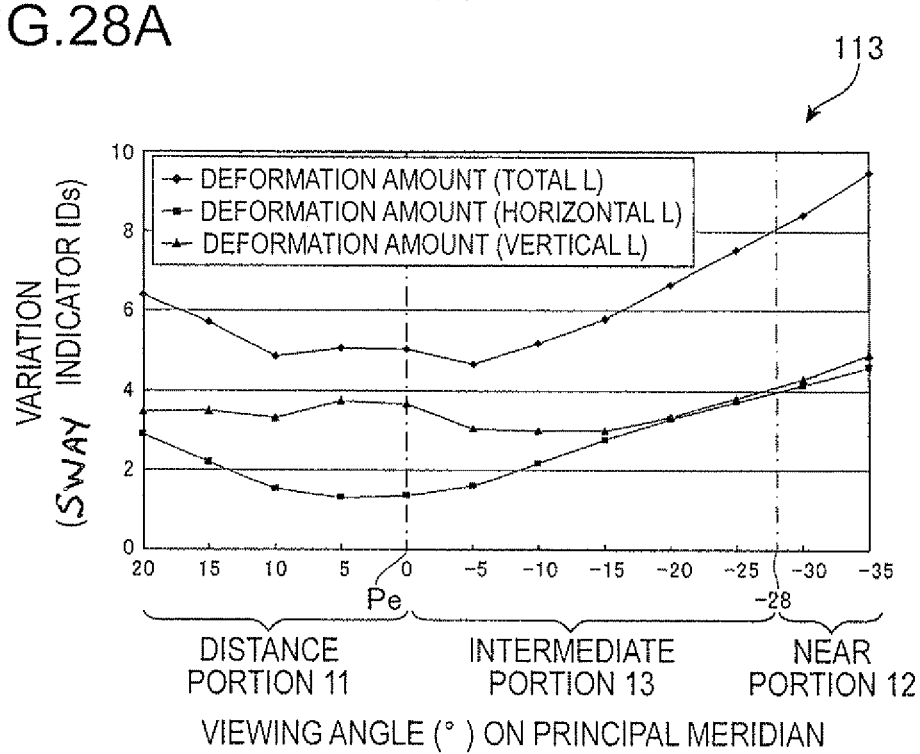
FIG. 28B is a diagram showing a deformation amount (sway indicator IDs).
Figure 29A:
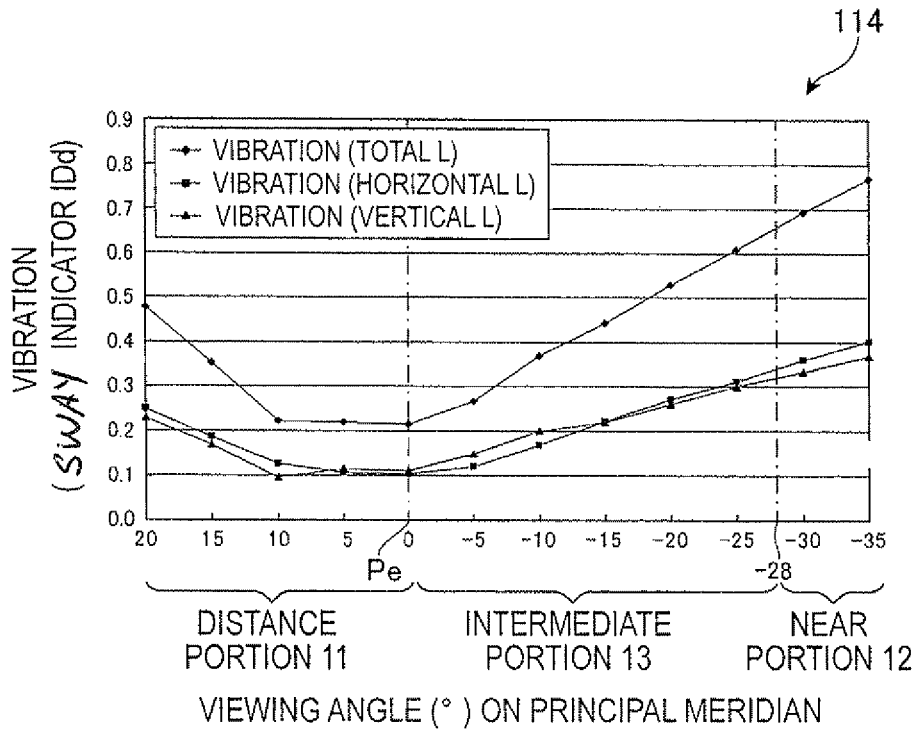
FIG. 29A is a diagram showing vibration (sway indicator IDd) of a progressive power lens of Comparative Example 1.
Figure 29B:
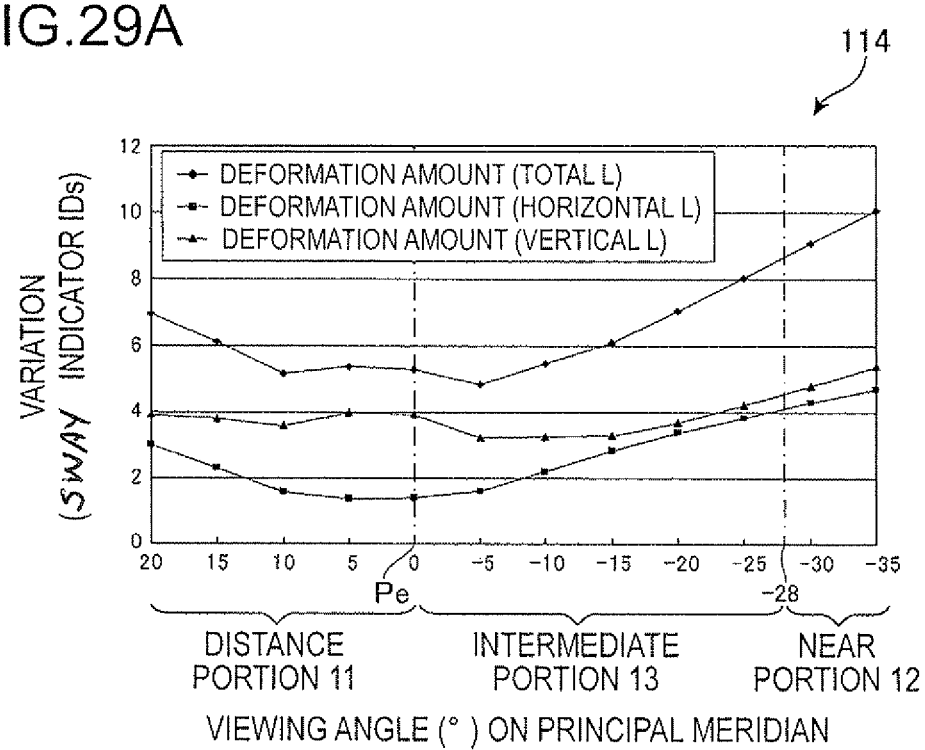
FIG. 29B is a diagram showing a deformation amount (sway indicator IDs).

FIG. 27A shows an indicator IDd relating to vibration obtained by the above-described sway evaluation method (Step 70) in the progressive power lens 112, and FIG. 27B shows an indicator IDs relating to a deformation amount. FIG. 28A shows an indicator IDd relating to vibration obtained by the above-described sway evaluation method (Step 70) in the progressive power lens 113, and FIG. 28B shows an indicator IDs relating to a deformation amount. FIG. 29A shows an indicator IDd relating to vibration obtained by the above-described sway evaluation method (Step 70) in the progressive power lens 114 of Comparative Example 1, and FIG. 29A shows an indicator IDs relating to a deformation amount.

By comparison of the indicators IDs and IDd, the progressive power lenses 111 to 113 of Example 1 have low values compared to the progressive power lens 114 of Comparative Example 1. In particular, the indicators IDs and IDd of the progressive power lens 111 designed using the first condition have low values.

Figure 30A:
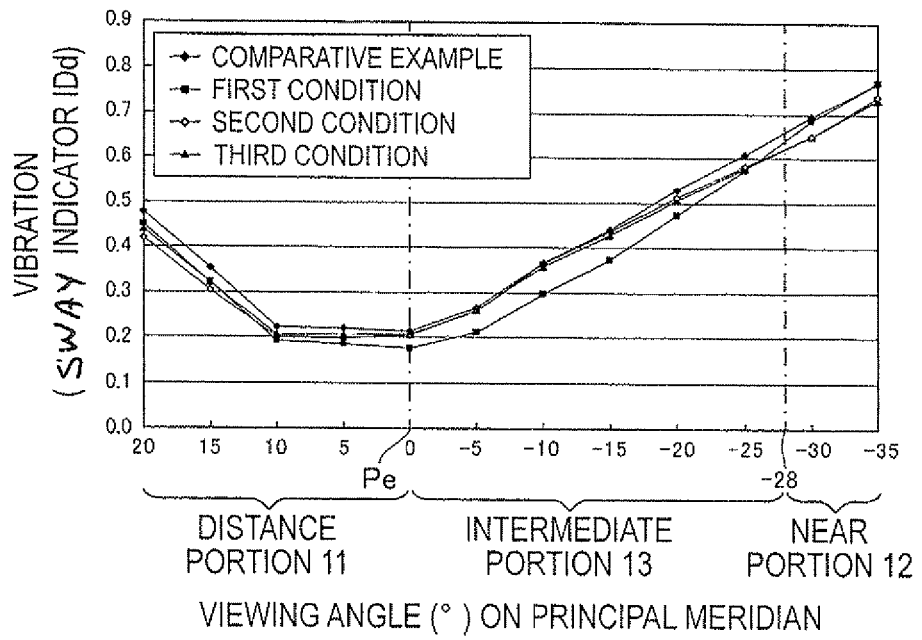
FIG. 30A is a diagram showing vibration (sway indicator IDd) of a progressive power lens of Example 1 and Comparative Example 1.
Figure 30B:
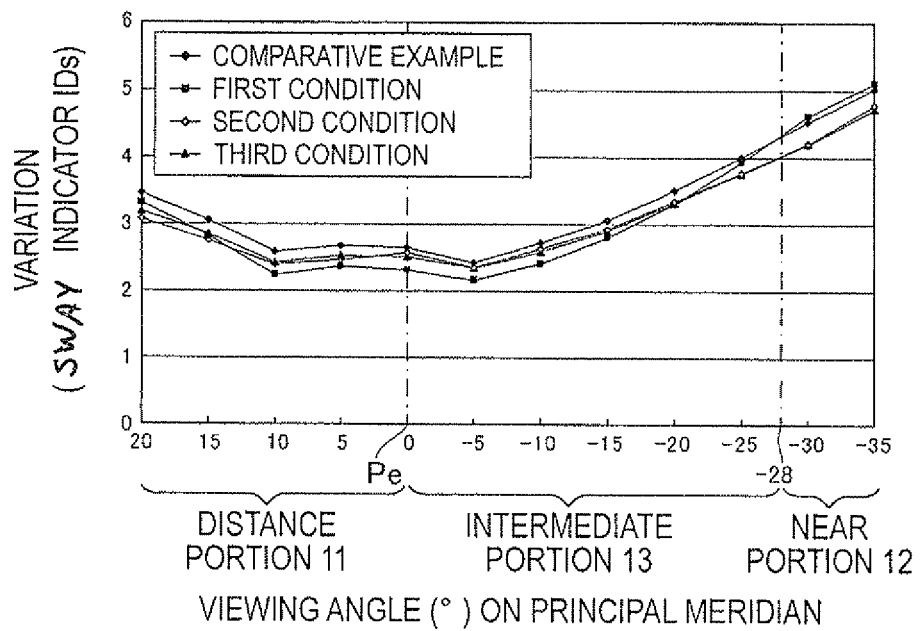
FIG. 30B is a diagram showing a deformation amount (sway indicator IDs).

FIG. 30A shows an indicator IDd relating to vibration in the progressive power lenses 111 to 114 of Example 1 and Comparative Example 1, and FIG. 30B shows an indicator IDs relating to a deformation amount. FIG. 30A shows "total L" which represents the sum or average of vibration of grid lines in each of the lenses 111 to 114, and FIG. 30B shows "total L" which represents the sum or average of the variation areas of grid lines in each of the lenses 111 to 114.

Figure 31:
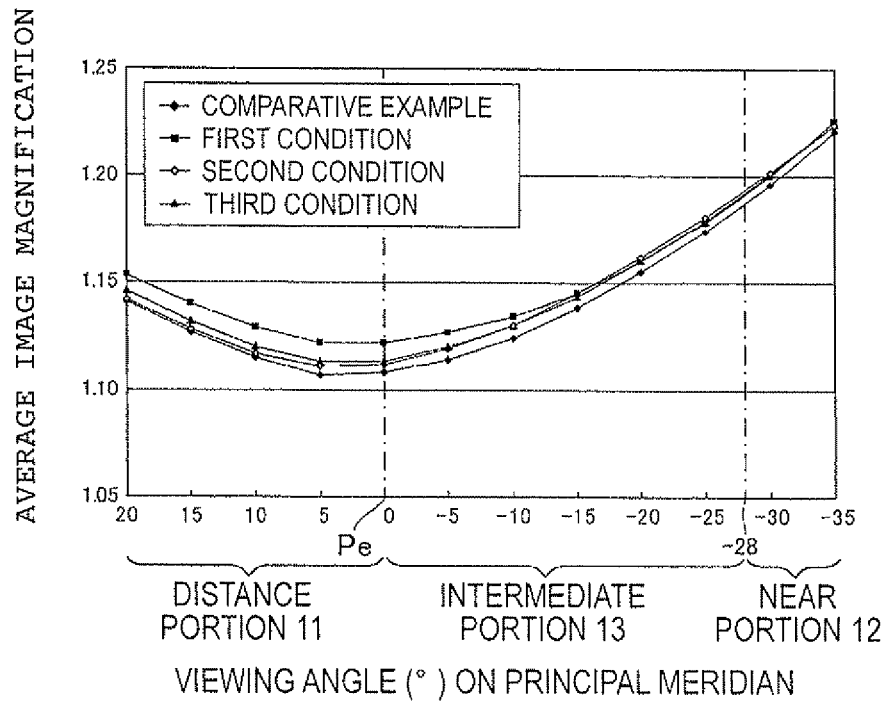
FIG. 31 is a diagram showing average image magnification on a principal meridian of a progressive power lens of Example 1 and Comparative Example 1.

FIG. 31 shows average image magnification on the principal meridian 14 obtained by a ray trace method in each of the progressive power lenses 111 to 114 of Example 1 and Comparative Example 1.

From sway evaluation shown in these drawings, it is found that, when the prescription power of the distance portion 11 is a far-sight system, all the progressive power lenses 111 to 113 of Example 1 have less sway compared to the progressive power lens 114 of Comparative Example 1. In particular, it is found that the progressive power lens 111 applied with the first condition has less sway distinctly in the intermediate portion 13 compared to other progressive power lenses 112 and 113 of Example 1. As shown in FIG. 31, in regard to image magnification, it is understood that the progressive power lens 111 applied with the first condition has the highest magnification in the distance portion 11 compared to other progressive power lenses 112 and 113 of Example 1 and the lens 114 of Comparative Example 1, vision is improved, and a difference in image magnification between the distance portion 11 and the near portion 12 is small.

Therefore, with the use of the progressive power lenses 111 to 113 of Example 1 including the elements of the toric surface, it is understood that, even if there is no significant difference in the optical characteristics (astigmatism and equivalent spherical power) from the progressive power lens 114 of Comparative Example 1 having a spherical surface, it is possible to reduce image sway. In the progressive power lenses 111 to 113 of Example 1, it is thought that the regions along the principal meridian 14 on the object-side surface 19A and the eyeball-side surface 19B include the elements of the toric surface having a large surface power in the horizontal direction, and a change in the angle at which the line of sight 2 passing through the lens and the lens intersect becomes small, thereby suppressing image sway.

In the far-sight system, in particular, in the far-sight system where the prescription power of the distance portion 11 is equal to or greater than 3.0 (D), the progressive power lens 111 in which the object-side surface 19A includes the regressive elements and which uses the first condition has the least sway, a difference in magnification can be reduced, and vision improvement is achieved. Therefore, when the prescription of the distance portion 11 is a far-sight system, it is effective to preferentially select the spectacle specification including the first condition.

2.2.2 Example 2

2.2.2.1 Specification Including First Condition

A basic spectacle specification of Example 2 includes the use of a progressive power lens "SEKIO P-1 SYNERGY AS" (refractive index 1.67) manufactured by SEIKO EPSON CORPORATION. This progressive power lens is designed with the application of a progressive zone length of 14 mm, a prescription power (distance power, Sph) of −3.00 (D), and an addition power (Add) of 2.00 (D). The diameter of the progressive power lens of Example 2 is 65 mm, and an astigmatic power is not included. Accordingly, the progressive power lens of Example 2 is a near-sight system spectacle lens in which the average prescription power of the distance portion 11 is equal to or smaller than −3.0 (D), that is, the average prescription power of the distance portion 11 is minus and the absolute value thereof is equal to or greater than 3.0 (D).

Figure 32:
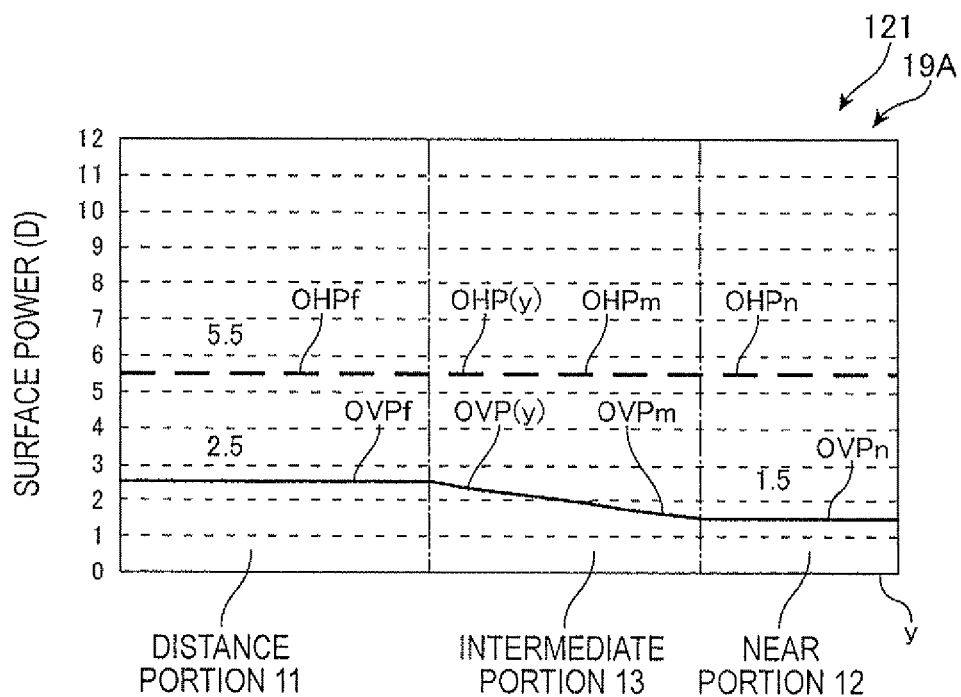
FIG. 32 is a diagram showing a surface power on a principal meridian on the object-side surface of a progressive power lens designed using a spectacle specification including a first condition of Example 2.
Figure 33:
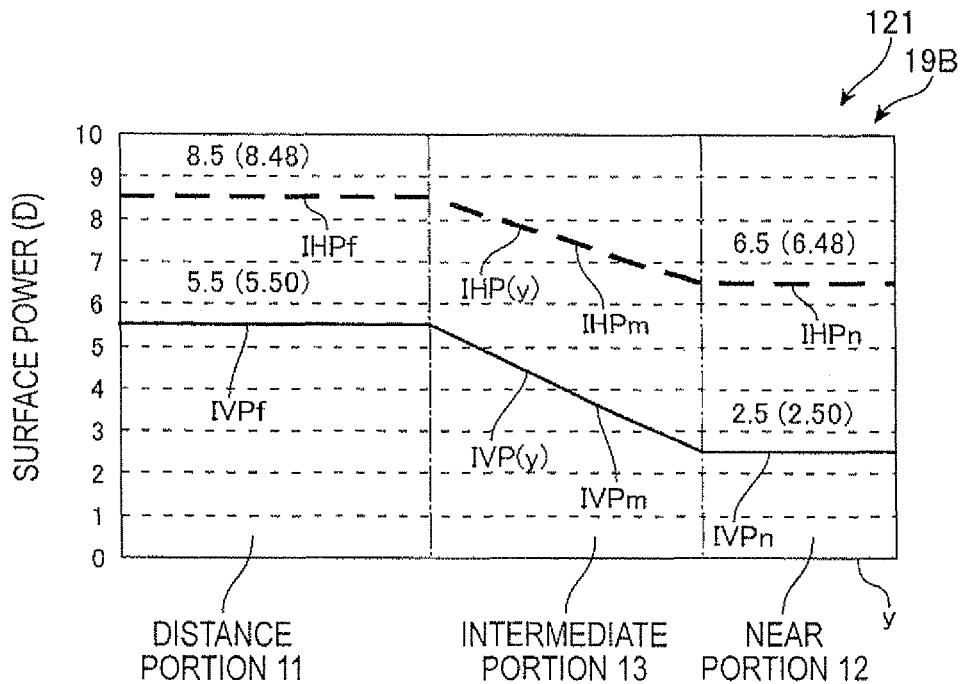
FIG. 33 is a diagram showing a surface power on a principal meridian on the eyeball-side surface of a progressive power lens designed using a spectacle specification including a first condition of Example 2.

FIG. 32 shows a surface power OHP(y) in the horizontal direction and a surface power OVP(y) in the vertical direction along the principal meridian 14 on the object-side surface 19A of a progressive power lens 121 designed using the spectacle specification including the elements of the toric surface expressed by Expression (0) and the first condition expressed by Expression (1) based on the basic specification in terms of dioptre (D). FIG. 33 shows a surface power IHP(y) in the horizontal direction and a surface power IVP(y) in the vertical direction along the principal meridian 14 on the eyeball-side surface 19B of the progressive power lens 121 in terms of dioptre (D).

In the progressive power lens 121, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 32, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 5.5 (D).

The surface power OVPf in the vertical direction of the distance portion 11 on the object-side surface 19A is constant to 2.5 (D). The surface power OVPm in the vertical direction of the intermediate portion 13 progressively decreases and becomes 1.5 (D) in the near portion 12. The surface power OVPn in the vertical direction of the near portion 12 is constant to 1.5 (D).

On the object-side surface 19A of the progressive power lens 121, a toric surface in which the surface power OHPf in the horizontal direction is shifted in a direction to be greater than the surface power OVPf in the vertical direction of the distance portion 11 by 3.0 (D), the surface power OHPn in the horizontal direction is shifted in a direction to be greater than the surface power OVPn in the vertical direction of the near portion 12 by 4.0 (D), and the surface power OVPm in the vertical direction of the intermediate portion 13 progressively changes is formed along the principal meridian 14. In regard to the surface power in the vertical direction, the surface power OVPf of the distance portion 11 is greater than the surface power OVPn of the near portion 12 and includes regressive elements.

On the eyeball-side surface 19B shown in FIG. 33, the surface power IHPf in the horizontal direction of the distance portion 11 is constant to 8.5 (D). The surface power IHPm in the horizontal direction of the intermediate portion 13 progressively decreases and becomes 6.5 (D) in the near portion 12. The surface power IHPn in the horizontal direction of the near portion 12 is constant to 6.5 (D).

The surface power IVPf in the vertical direction of the distance portion 11 on the eyeball-side surface 19B is constant to 5.5 (D). The surface power IVPm in the vertical direction of the intermediate portion 13 progressively decreases and becomes 2.5 (D) in the near portion 12. The surface power IVPn in the vertical direction of the near portion 12 is constant to 2.5 (D).

On the eyeball-side surface 19B of the progressive power lens 121, a toric surface in which the surface power IHPf in the horizontal direction is shifted in a direction to be greater than the surface power IVPf in the vertical direction of the distance portion 11 by 3.0 (D), the surface power IHPn in the horizontal direction is shifted in a direction to be greater than the surface power IVPn in the vertical direction of the near portion 12 by 4.0 (D), and the surface power IVPm in the vertical direction of the intermediate portion 13 progressively changes along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and predetermined distance power and addition power are obtained in relation to the surface power on the object-side surface 19A. The surface power in the horizontal direction includes elements of a progressive surface with the surface power IHPf of the distance portion 11 greater than the surface power IHPn of the near portion 12, and predetermined distance power and addition power are obtained in relation to the surface power on the object-side surface 19A.

Accordingly, the progressive power lens 121 includes the conditions of Expressions (0), (1), and (4).

2.2.2.2 Specification Including Second Condition

Figure 34:
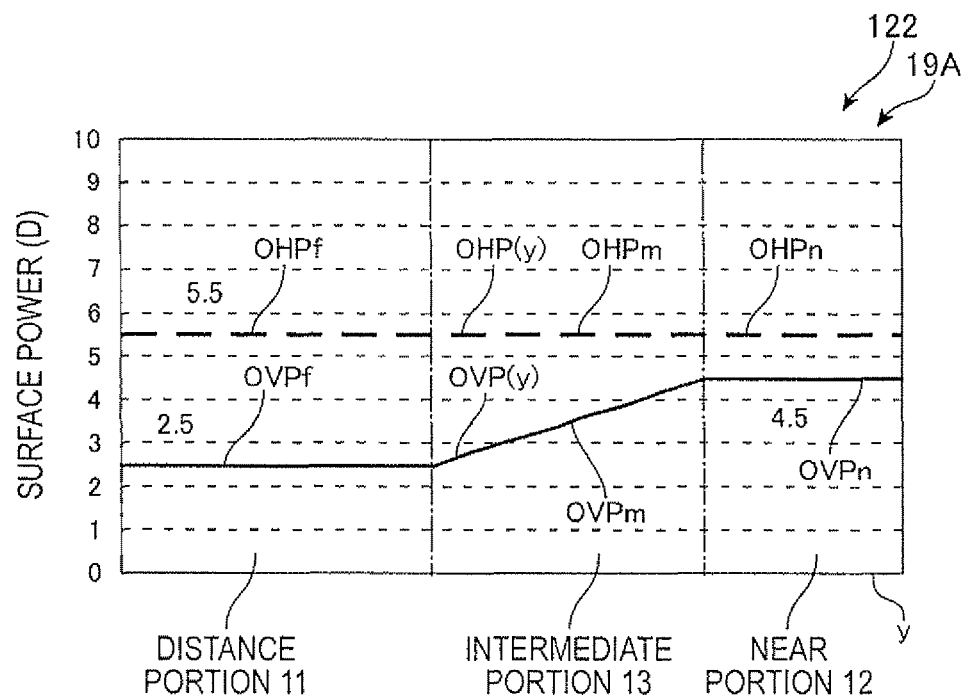
FIG. 34 is a diagram showing a surface power on a principal meridian on the object-side surface of a progressive power lens designed using a spectacle specification including a second condition of Example 2.
Figure 35:
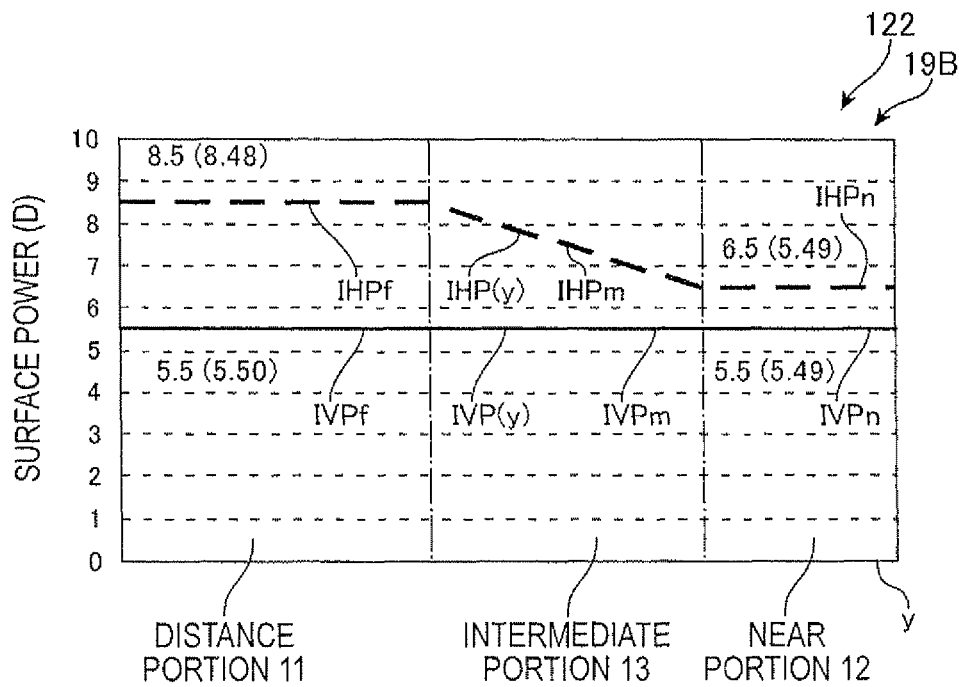
FIG. 35 is a diagram showing a surface power on a principal meridian on the eyeball-side surface of a progressive power lens designed using a spectacle specification including a second condition of Example 2.

FIG. 34 shows a surface power OHP(y) in the horizontal direction and a surface power OVP(y) in the vertical direction along the principal meridian 14 on the object-side surface 19A of a progressive power lens 122 designed using the spectacle specification including the elements of the toric surface expressed by Expression (0) and the second condition expressed by Expression (2) based on the basic specification in terms of dioptre (D). FIG. 35 shows a surface power IHP(y) in the horizontal direction and a surface power IVP(y) in the vertical direction along the principal meridian 14 on the eyeball-side surface 19B of the progressive power lens 122 in terms of dioptre (D). Unless particularly described, the spectacle specification is the same as the spectacle specification of (2.2.2.1). The same is also applied to the following description.

In the progressive power lens 122, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 34, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 5.5 (D).

The surface power OVPf in the vertical direction of the distance portion 11 on the object-side surface 19A is constant to 2.5 (D). The surface power OVPm in the vertical direction of the intermediate portion 13 progressively increases and becomes 4.5 (D) in the near portion 12. The surface power OVPn in the vertical direction of the near portion 12 is constant to 4.5 (D).

On the object-side surface 19A of the progressive power lens 122, a toric surface in which the surface power OHPf in the horizontal direction is shifted in a direction to be greater than the surface power OVPf in the vertical direction of the distance portion 11 by 3.0 (D), the surface power OHPn in the horizontal direction is shifted in a direction to be greater than the surface power OVPn in the vertical direction of the near portion 12 by 1.0 (D), and the surface power OVPm in the vertical direction of the intermediate portion 13 is progressively shifted along the principal meridian 14. In regard to the surface power in the vertical direction, the surface power OVPn of the near portion 12 is greater than the surface power OVPf of the distance portion 11, and the intermediate portion 13 includes elements of a progressive surface.

On the eyeball-side surface 19B shown in FIG. 35, the surface power IHPf in the horizontal direction of the distance portion 11 is constant to 8.5 (D). The surface power IHPm in the horizontal direction of the intermediate portion 13 progressively decreases and becomes 6.5 (D) in the near portion 12. The surface power IHPn in the horizontal direction of the near portion 12 is constant to 6.5 (D).

The surface power IVPf in the vertical direction of the distance portion 11, the surface power IVPm in the vertical direction of the intermediate portion 13, and the surface power IVPn in the vertical direction of the near portion 12 on the eyeball-side surface 19B are constant to 5.5 (D).

On the eyeball-side surface 19B of the progressive power lens 122, a toric surface in which the surface power IHPf in the horizontal direction is shifted in a direction to be greater than the surface power IVPf in the vertical direction of the distance portion 11 by 3.0 (D), the surface power IHPn in the horizontal direction is shifted in a direction to be greater than the surface power IVPn in the vertical direction of the near portion 12 by 1.0 (D), and the surface power IHPm in the horizontal direction of the intermediate portion 13 is progressively shifted along the principal meridian 14, and shifts in the surface power by the elements of the toric surface on the object-side surface 19A are cancelled. In regard to the surface power in the vertical direction, while the surface power IVPf of the distance portion 11 is equal to the surface power IVPn of the near portion 12, a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 122 includes the conditions of Expressions (0), (2), and (4).

2.2.2.3 Specification Including Third Condition

Figure 36:
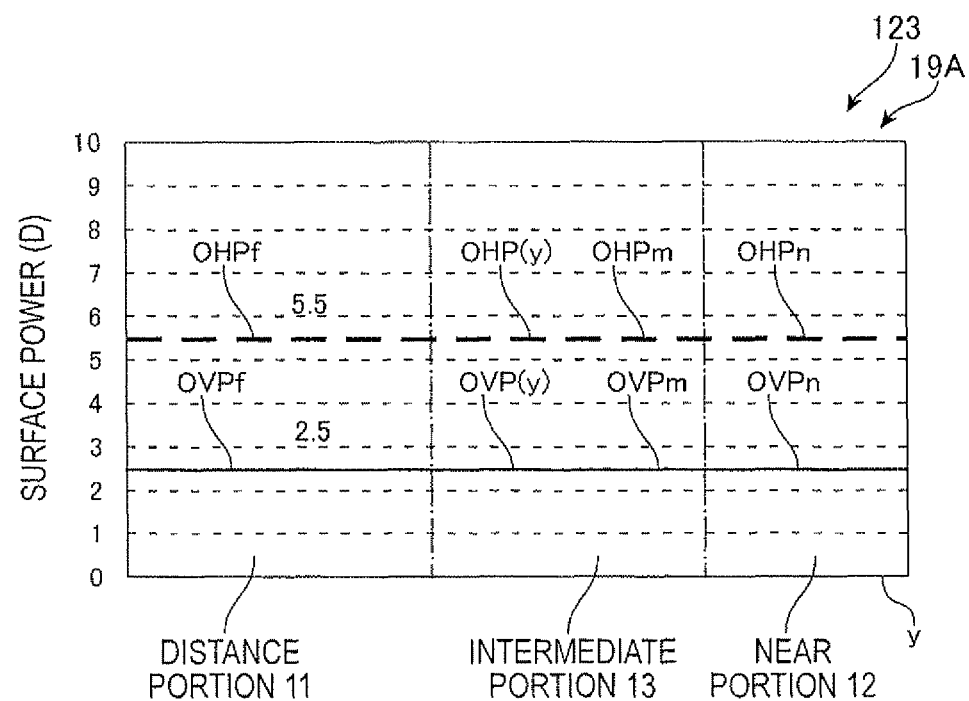
FIG. 36 is a diagram showing a surface power on a principal meridian on the object-side surface of a progressive power lens designed using a spectacle specification including a third condition of Example 2.
Figure 37:
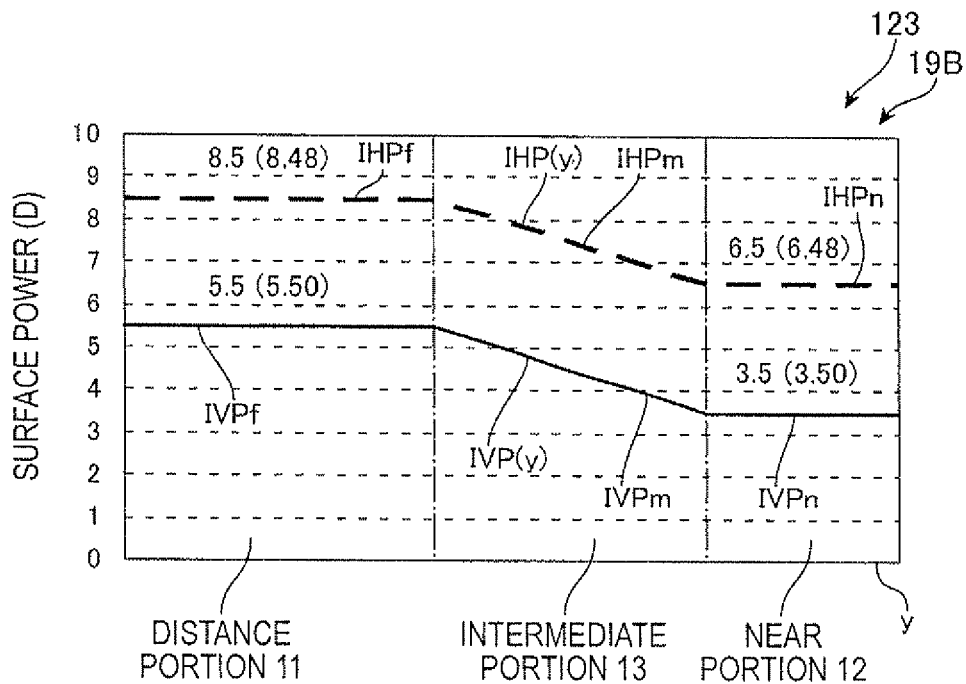
FIG. 37 is a diagram showing a surface power on a principal meridian on the eyeball-side surface of a progressive power lens designed using a spectacle specification including a third condition of Example 2.

FIG. 36 shows a surface power OHP(y) in the horizontal direction and a surface power OVP(y) in the vertical direction along the principal meridian 14 on the object-side surface 19A of a progressive power lens 123 designed using the spectacle specification including the elements of the toric surface expressed by Expression (0) and the third condition expressed by Expression (3) based on the basic specification in terms of dioptre (D). FIG. 37 shows a surface power IHP(y) in the horizontal direction and a surface power IVP(y) in the vertical direction along the principal meridian 14 on the eyeball-side surface 19B of the progressive power lens 123 in terms of dioptre (D).

In the progressive power lens 123, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 36, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 5.5 (D).

Similarly, the surface power OVPf in the vertical direction of the distance portion 11, the surface power OVPm in the vertical direction of the intermediate portion 13, and the surface power OVPn in the vertical direction of the near portion 12 on the object-side surface 19A are constant to 2.5 (D).

On the object-side surface 19A of the progressive power lens 123, a toric surface in which the surface powers OHPf, OHPm, and OHPn in the horizontal direction are respectively shifted in a direction to be greater than the surface powers OVPf, OVPm, and OVPn in the vertical direction by 3.0 (D) is formed along the principal meridian 14. The surface powers OVPf, OVPm, and OVPn in the vertical direction are equal, and the surface powers OHPf, OHPm, and OHPn in the horizontal direction are equal, such that a simple toric surface (toroidal surface) is formed along the principal meridian 14.

On the eyeball-side surface 19B shown in FIG. 37, the surface power IHPf in the horizontal direction of the distance portion 11 is constant to 8.5 (D). The surface power IHPm in the horizontal direction of the intermediate portion 13 progressively decreases and becomes 6.5 (D) in the near portion 12. The surface power IHPn in the horizontal direction of the near portion 12 is constant to 6.5 (D).

The surface power IVPf in the vertical direction of the distance portion 11 on the eyeball-side surface 19B is constant to 5.5 (D). The surface power IVPm in the vertical direction of the intermediate portion 13 progressively decreases and becomes 3.5 (D) in the near portion 12. The surface power IVPn in the vertical direction of the near portion 12 is constant to 3.5 (D).

On the eyeball-side surface 19B of the progressive power lens 123, a toric surface in which the surface powers IHPf, IHPm, and IHPn in the horizontal direction are respectively shifted in a direction to be greater than the surface powers IVPf, IVPm, and IVPn in the vertical direction by 3.0 (D) is formed along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 123 includes the conditions of Expressions (0), (3), and (4).

2.2.2.4 Comparative Example 2

Figure 38:
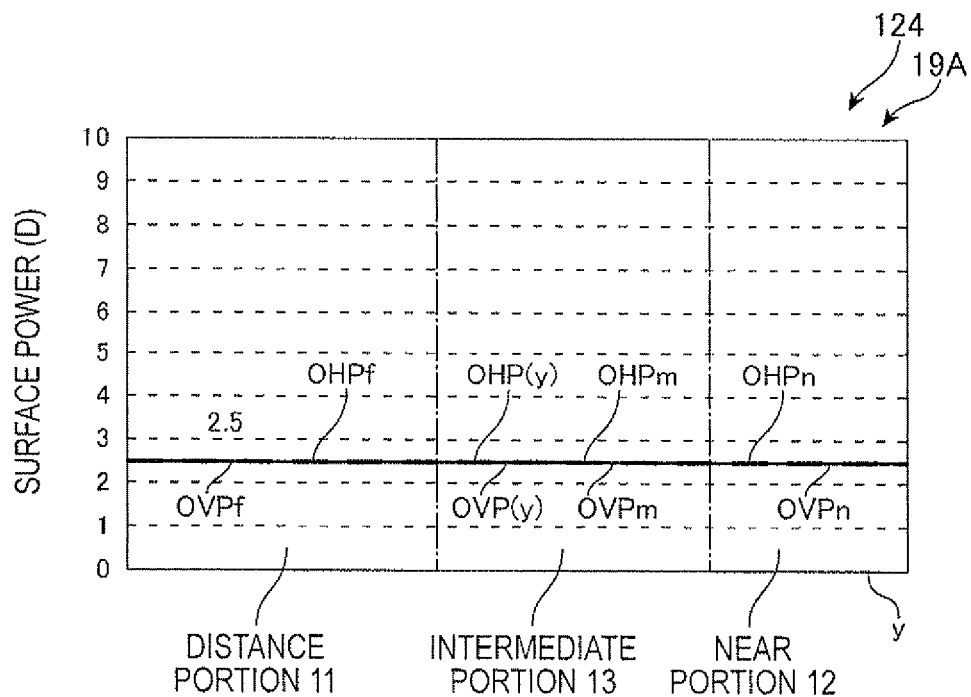
FIG. 38 is a diagram showing a surface power on a principal meridian on the object-side surface of a progressive power lens of Comparative Example 2.
Figure 39:
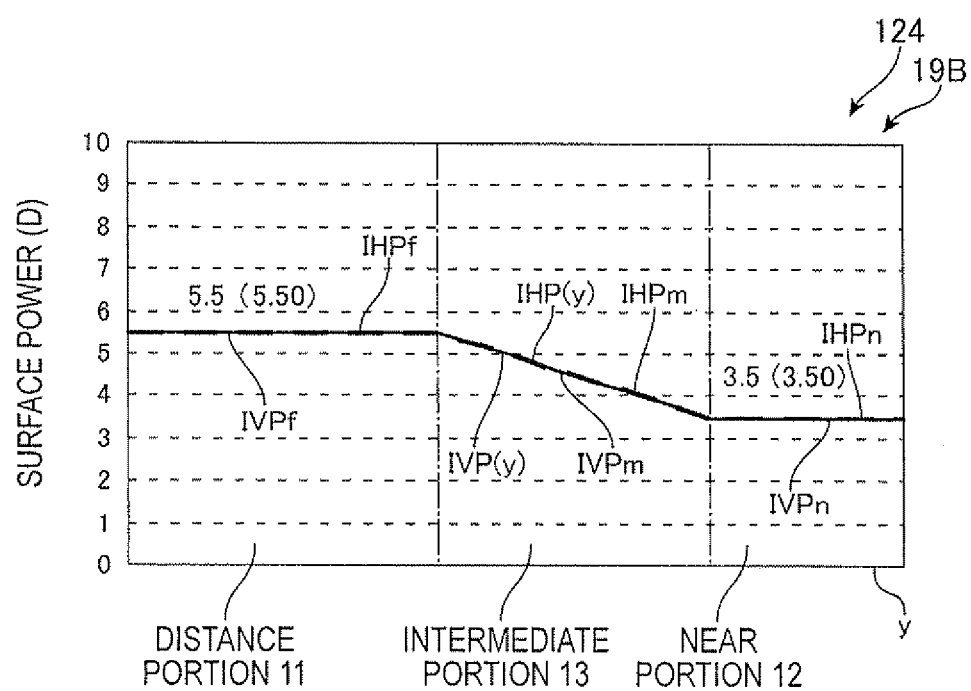
FIG. 39 is a diagram showing a surface power on a principal meridian on the eyeball-side surface of a progressive power lens of Comparative Example 2.
Figure 40A:
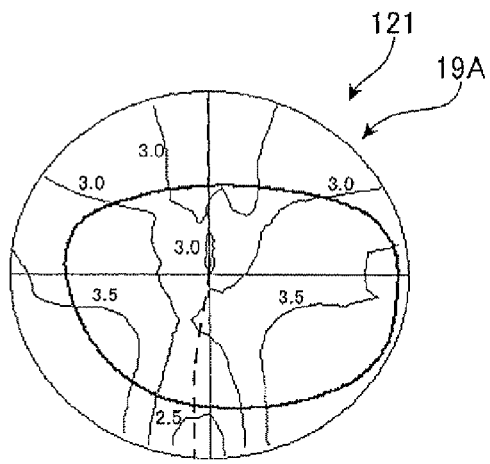
FIG. 40A is a diagram showing a surface astigmatism distribution on the object-side surface of a progressive power lens based on a first condition of Example 2.
Figure 40B:
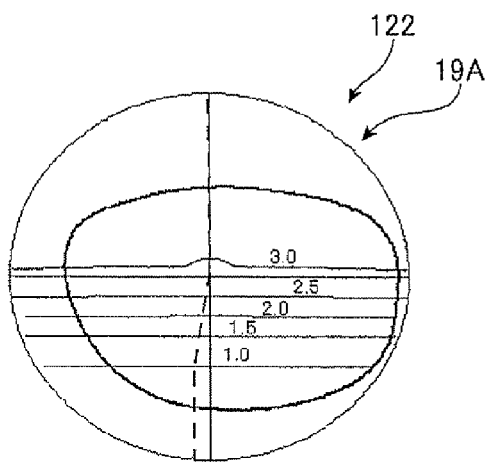
FIG. 40B is a diagram showing a surface astigmatism distribution on the object-side surface of a progressive power lens based on a second condition.
Figure 40C:
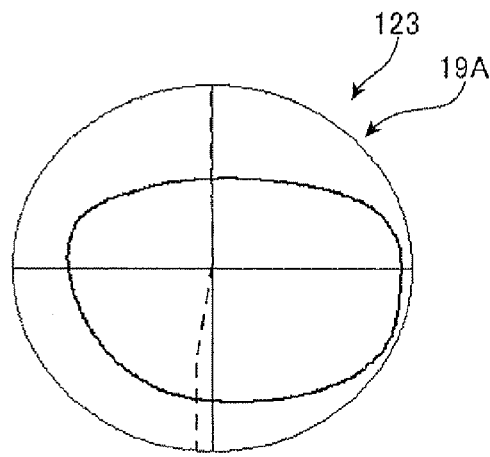
FIG. 40C is a diagram showing a surface astigmatism distribution on the object-side surface of a progressive power lens based on a third condition.
Figure 40D:
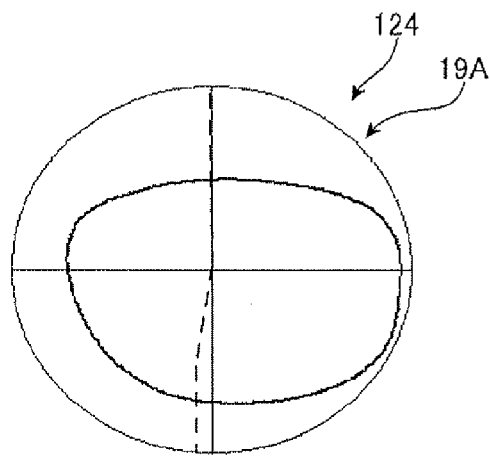
FIG. 40D is a diagram showing a surface astigmatism distribution on the object-side surface of a progressive power lens of Comparative Example 2.
Figure 41A:
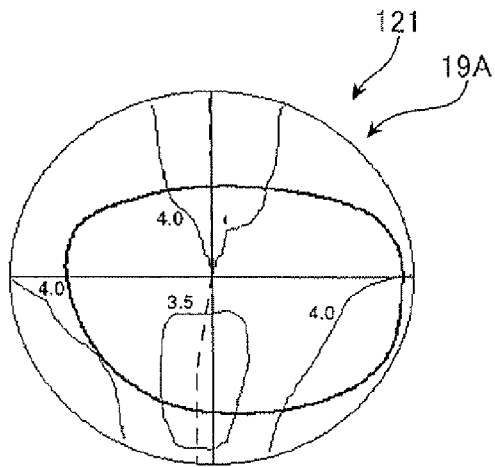
FIG. 41A is a diagram showing an equivalent spherical surface power distribution on the object-side surface of a progressive power lens based on a first condition of Example 2.
Figure 41B:
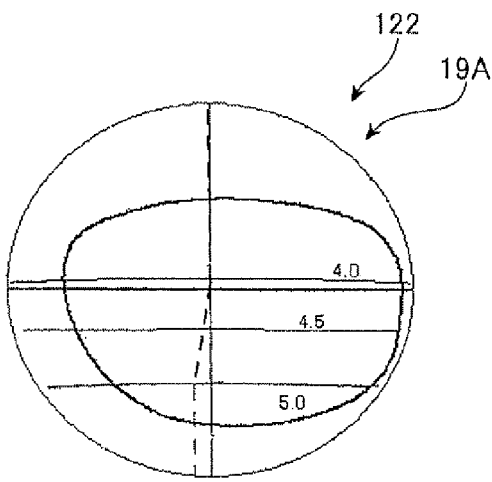
FIG. 41B is a diagram showing an equivalent spherical surface power distribution on the object-side surface of a progressive power lens based on a second condition.
Figure 41C:
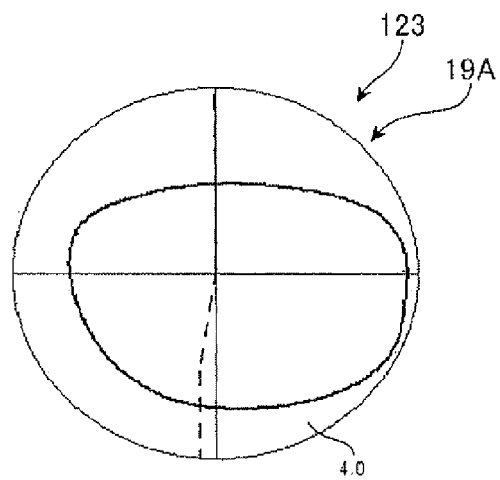
FIG. 41C is a diagram showing an equivalent spherical surface power distribution on the object-side surface of a progressive power lens based on a third condition.
Figure 41D:
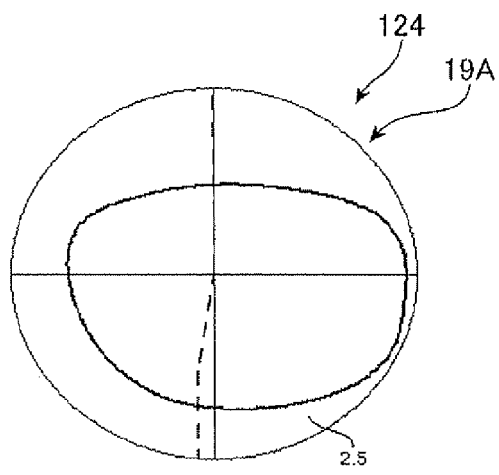
FIG. 41D is a diagram showing an equivalent spherical surface power distribution on the object-side surface of a progressive power lens of Comparative Example 2.
Figure 42A:
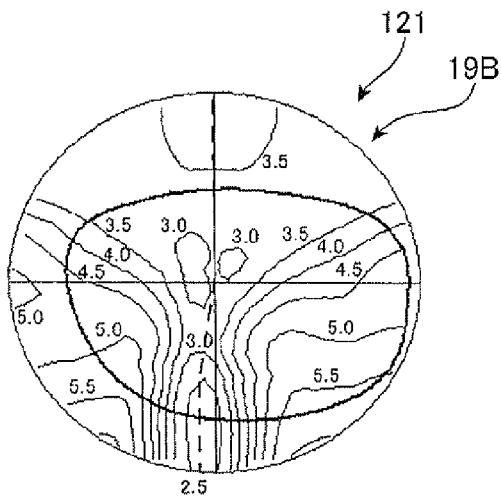
FIG. 42A is a diagram showing a surface astigmatism distribution on the eyeball-side surface of a progressive power lens based on a first condition of Example 2.
Figure 42B:
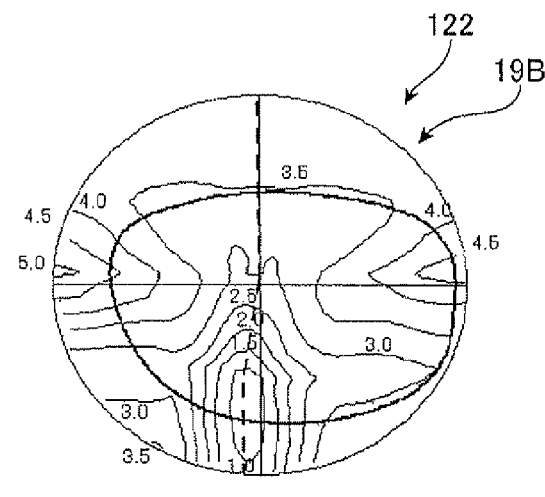
FIG. 42B is a diagram showing a. surface astigmatism distribution on the eyeball-side surface of a progressive power lens based on a second condition.
Figure 42C:
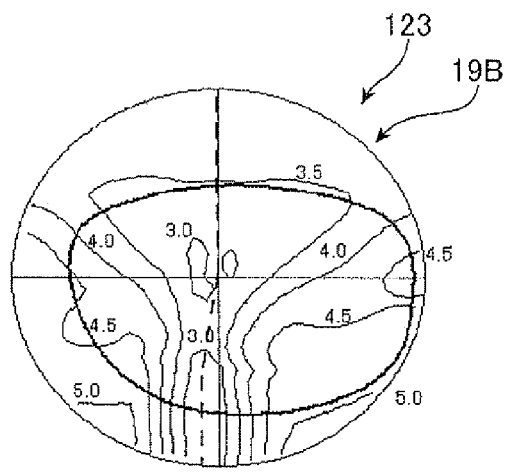
FIG. 42C is a diagram showing a surface astigmatism distribution on the eyeball-side surface of a progressive power lens based on a third condition.
Figure 42D:
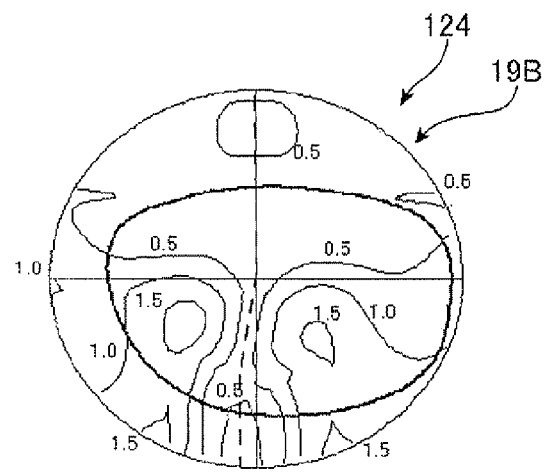
FIG. 42D is a diagram showing a surface astigmatism distribution on the eyeball-side surface of a progressive power lens of Comparative Example 2.
Figure 43A:
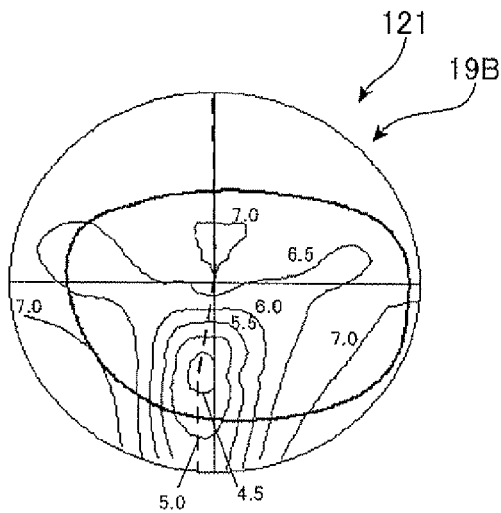
FIG. 43A is a diagram showing an equivalent spherical surface power distribution on the eyeball-side surface of a progressive power lens based on a first condition of Example 2.
Figure 43B:
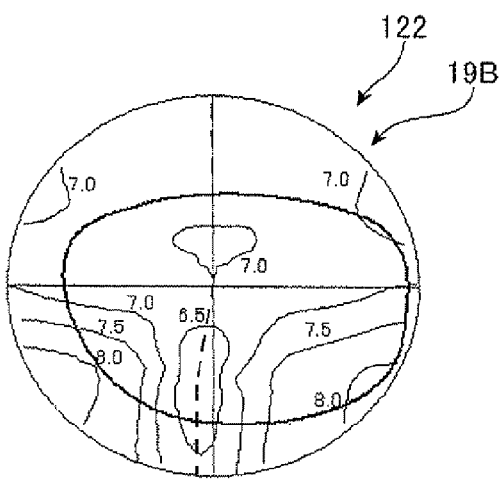
FIG. 43B is a diagram showing an equivalent spherical surface power distribution on the eyeball-side surface of a progressive power lens based on a second condition.
Figure 43C:
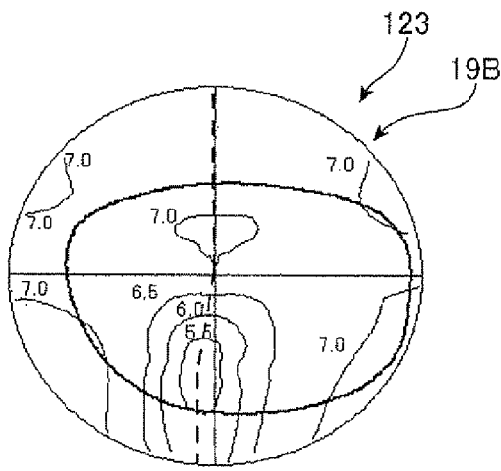
FIG. 43C is a diagram showing an equivalent spherical surface power distribution on the eyeball-side surface of a progressive power lens based on a third condition.
Figure 43D:
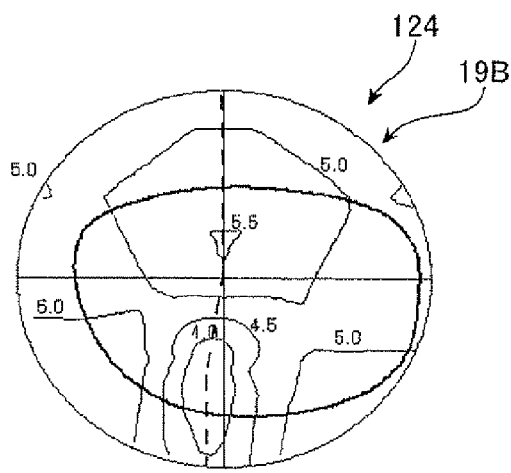
FIG. 43D is a diagram showing an equivalent spherical surface power distribution on the eyeball-side surface of a progressive power lens of Comparative Example 2.
Figure 44A:
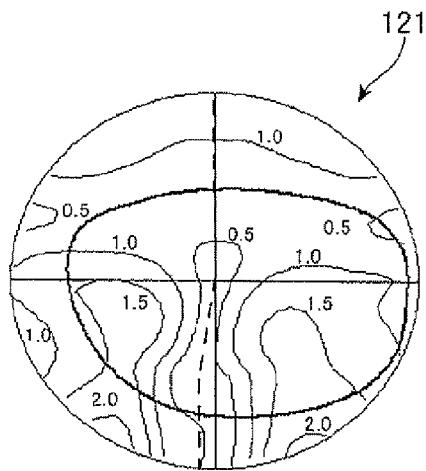
FIG. 44A is a diagram showing an astigmatism distribution of a progressive power lens based on a first condition of Example 2.
Figure 44B:
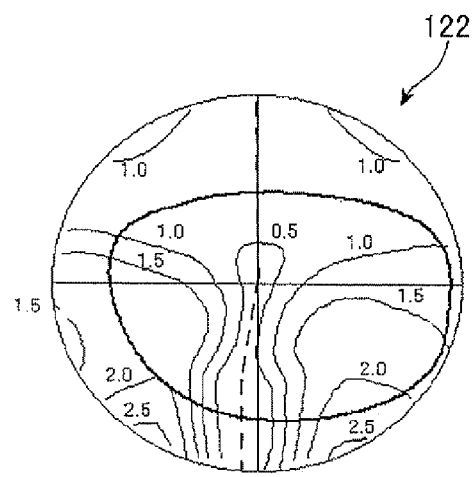
FIG. 44B is a diagram showing an astigmatism distribution of a progressive power lens based on a second condition.
Figure 44C:
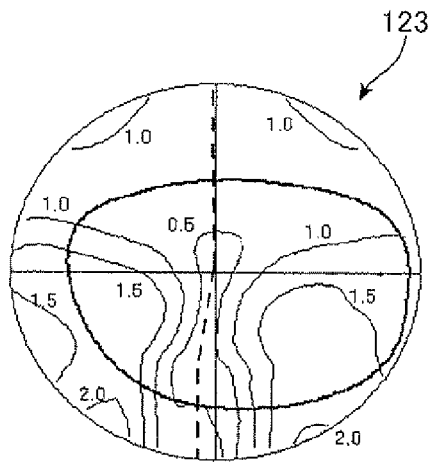
FIG. 44C is a diagram showing an astigmatism distribution of a progressive power lens based on a third condition.
Figure 44D:
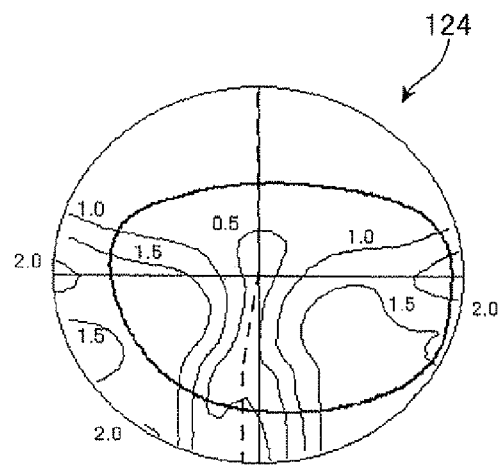
FIG. 44D is a diagram showing an astigmatism distribution of a progressive power lens of Comparative Example 2.
Figure 45A:
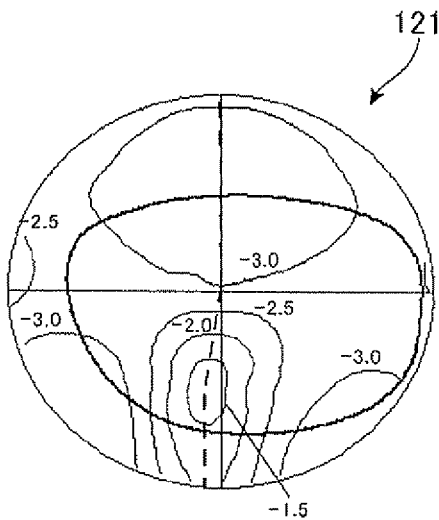
FIG. 45A is a diagram showing an equivalent spherical power distribution of a progressive power lens based on a first condition of Example 2.
Figure 45B:
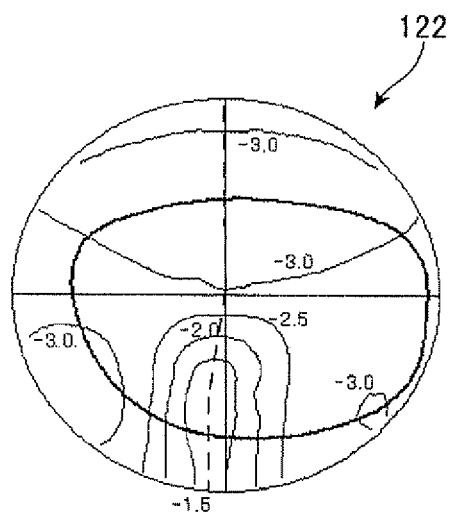
FIG. 45B is a diagram showing an equivalent spherical power distribution of a progressive power lens based on a second condition.
Figure 45C:
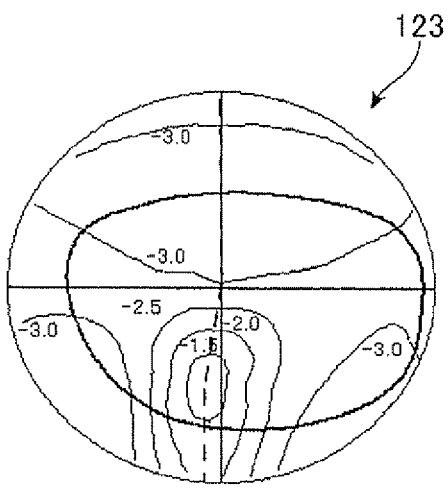
FIG. 45C is a diagram showing an equivalent spherical power distribution of a progressive power lens based on a third condition.
Figure 45D:
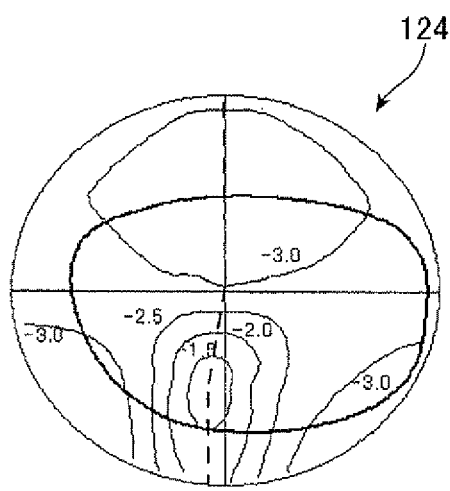
FIG. 45D is a diagram showing an equivalent spherical power distribution of a progressive power lens of Comparative Example 2.

FIG. 38 shows a surface power OHP(y) in the horizontal direction and a surface power OVP(y) in the vertical direction along the principal meridian 14 on the object-side surface 19A of a progressive power lens 124 of Comparative Example 2 designed using an eyeball-side progressive specification, in which the object-side surface 19A is a spherical surface, based on the basic specification in terms of dioptre (D). FIG. 39 shows a surface power IHP(y) in the horizontal direction and a surface power IVP(y) in the vertical direction along the principal meridian 14 on the eyeball-side surface 19B of the progressive power lens 124 in terms of dioptre (D).

As shown in FIG. 38, on the object-side surface 19A of the progressive power lens 124, the surface power OHPf in the horizontal direction of the distance portion 11, the surface power OHPm in the horizontal direction of the intermediate portion 13, the surface power OHPn in the horizontal direction of the near portion 12, the surface power OVPf in the vertical direction of the distance portion 11, the surface power OVPm in the vertical direction of the intermediate portion 13, and the surface power OVPn in the vertical direction of the near portion 12 are constant to 2.5 (D).

On the eyeball-side surface 19B of the progressive power lens 124 shown in FIG. 39, the surface power IHPf in the horizontal direction and the surface power IVPf in the vertical direction of the distance portion 11 are constant to 5.5 (D). The surface power IHPm in the horizontal direction and the surface power IVPm in the vertical direction of the intermediate portion 13 progressively decrease and become 3.5 (D) in the near portion 12. The surface power IHPn in the horizontal direction and the surface power IVPn in the vertical direction of the near portion 12 are constant to 3.5 (D).

Accordingly, the progressive power lens 124 is an eyeball-side progressive lens for a spherical prescription, and does not include elements of a toric surface other than astigmatism correction.

2.2.2.5 Comparison

FIGS. 40A to 40D show surface astigmatism distributions on the object-side surface 19A of the progressive power lenses 121 to 124 of Example 2 and Comparative Example 2. FIGS. 41A to 41D show equivalent spherical surface power distributions on the object-side surface 19A of the progressive power lenses 121 to 124 of Example 2 and Comparative Example 2. FIGS. 42A to 42D show surface astigmatism distributions on the eyeball-side surface 19B of the progressive power lenses 121 to 124 of Example 2 and Comparative Example 2. FIGS. 43A to 43D show equivalent spherical surface power distributions on the eyeball-side surface 19B of the progressive power lenses 121 to 124 of Example 2 and Comparative Example 2. FIGS. 44A to 44D show astigmatism distributions when observation is done through each position on the lens in the progressive power lenses 121 to 124 of Example 2 and Comparative Example 2. FIGS. 45A to 45D show equivalent spherical power distributions when observation is done through each position on the lens in the progressive power lenses 121 to 124 of Example 2 and Comparative Example 2. As shown in these drawings, the progressive power lenses 121 to 123 of Example 2 are designed such that the astigmatism distribution and the equivalent spherical power distribution are substantially the same as those in the progressive power lens 124 of Comparative Example 2. That is, the eyeball-side surface 19B of each of the progressive power lenses 121 to 123 is corrected to substantially have the same optical characteristics (astigmatism and equivalent spherical power) within at least a range of the shape when the lens is fitted into the frame to correspond to the progressive power lens 124 of Comparative Example 2.

Figure 46A:
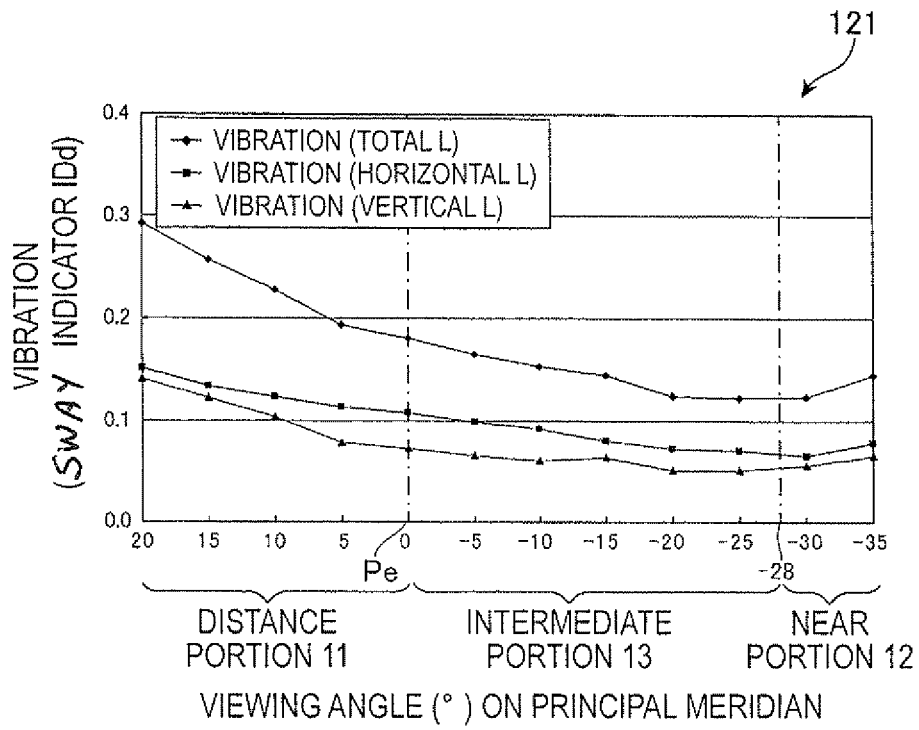
FIG. 46A is a diagram showing vibration (sway indicator IDd) of a progressive power lens based on a first condition of Example 2.
Figure 46B:
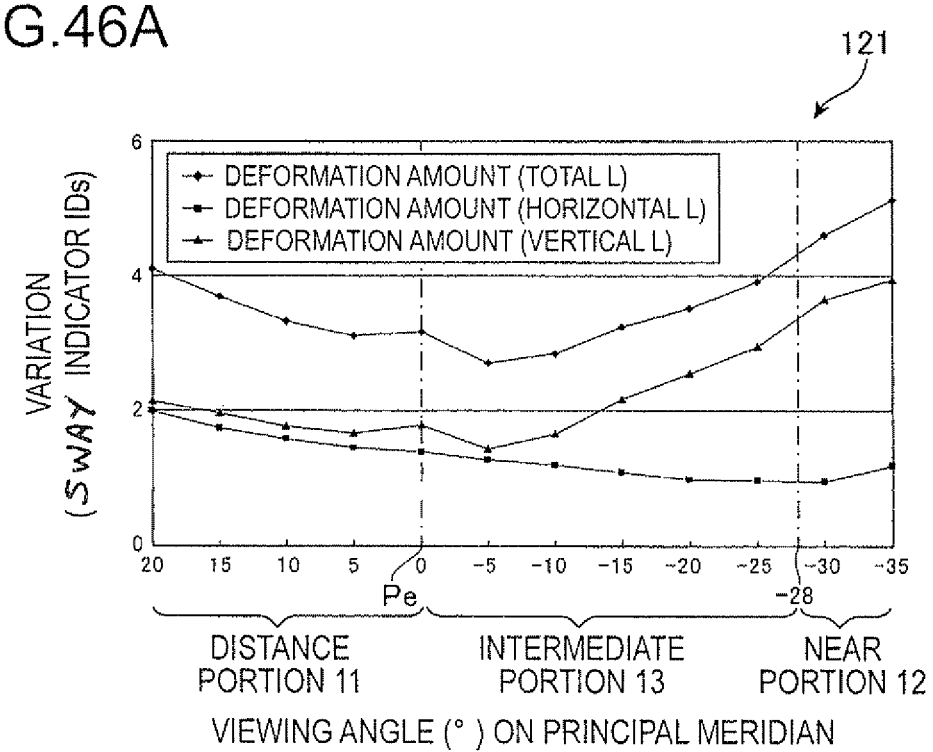
FIG. 46B is a diagram showing a deformation amount (sway indicator IDs).

FIG. 46A shows an indicator IDd relating to vibration obtained by the above-described sway evaluation method (Step 70) in the progressive power lens 121. FIG. 46B shows an indicator (a sway indicator by a variation) IDs relating to a deformation amount. In regard to the indicator IDd relating to vibration, "horizontal L", "vertical L", and "total L" which represents the sum or average of vibration of all the grid lines obtained by totaling "horizontal L" and "vertical L" are obtained at a few points along the principal meridian. In regard to the indicator IDs relating to a deformation amount, "horizontal L", "vertical L", and "total L" which represents the sum or average of the variation areas of all the grid lines obtained by totaling "horizontal L" and "vertical L" are obtained at a few points along the principal meridian.

Figure 47A:
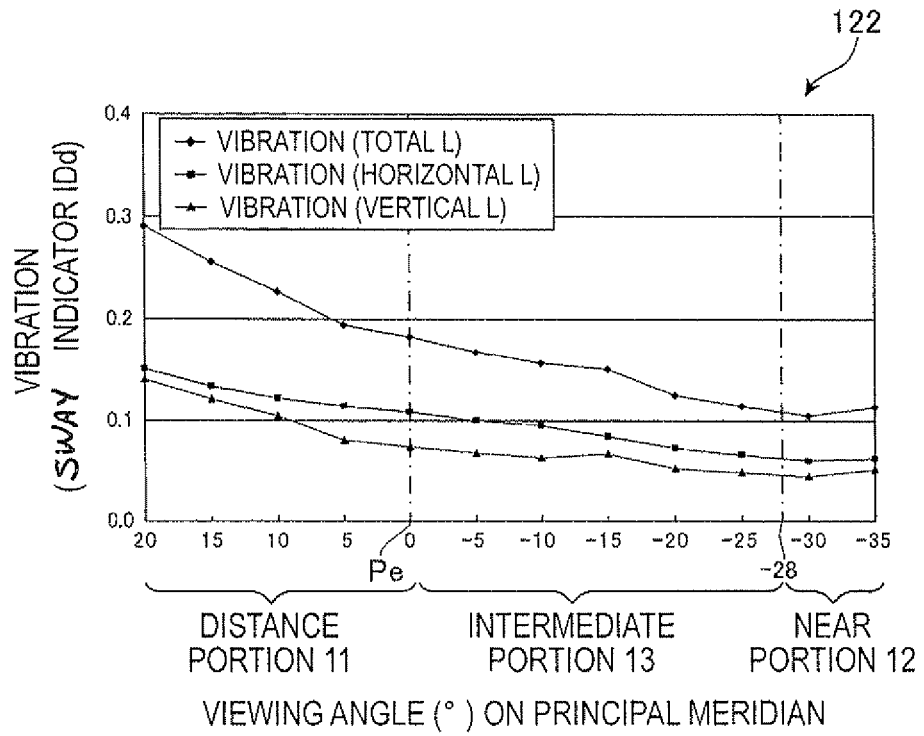
FIG. 47A is a diagram showing vibration (sway indicator IDd) of a progressive power lens based on a second condition of Example 2.
Figure 47B:
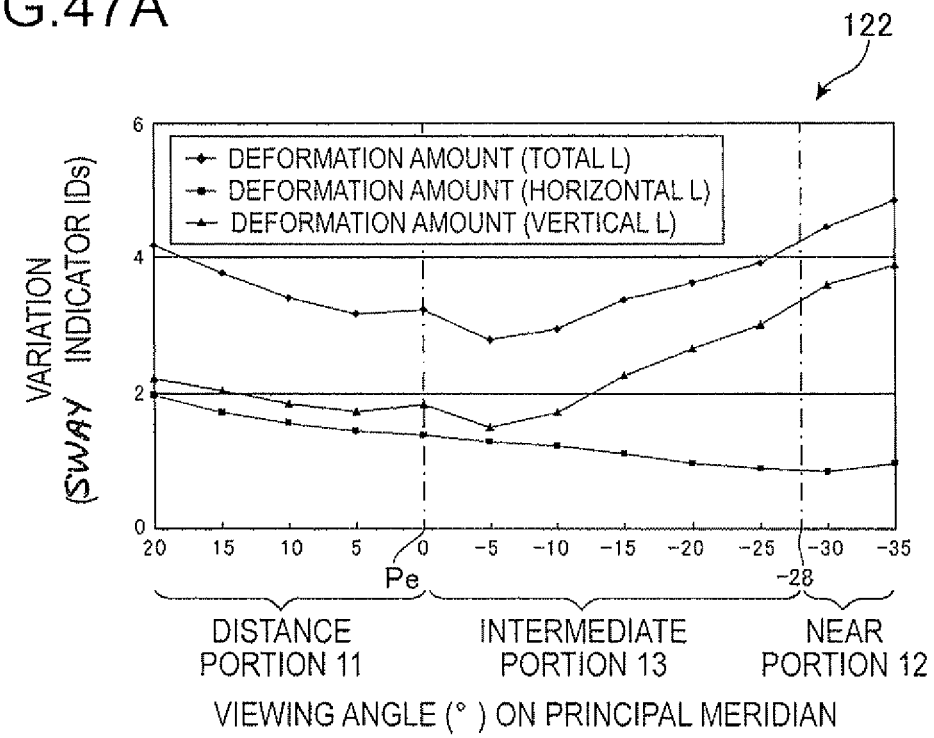
FIG. 47B is a diagram showing a deformation amount (sway indicator IDs).
Figure 48A:
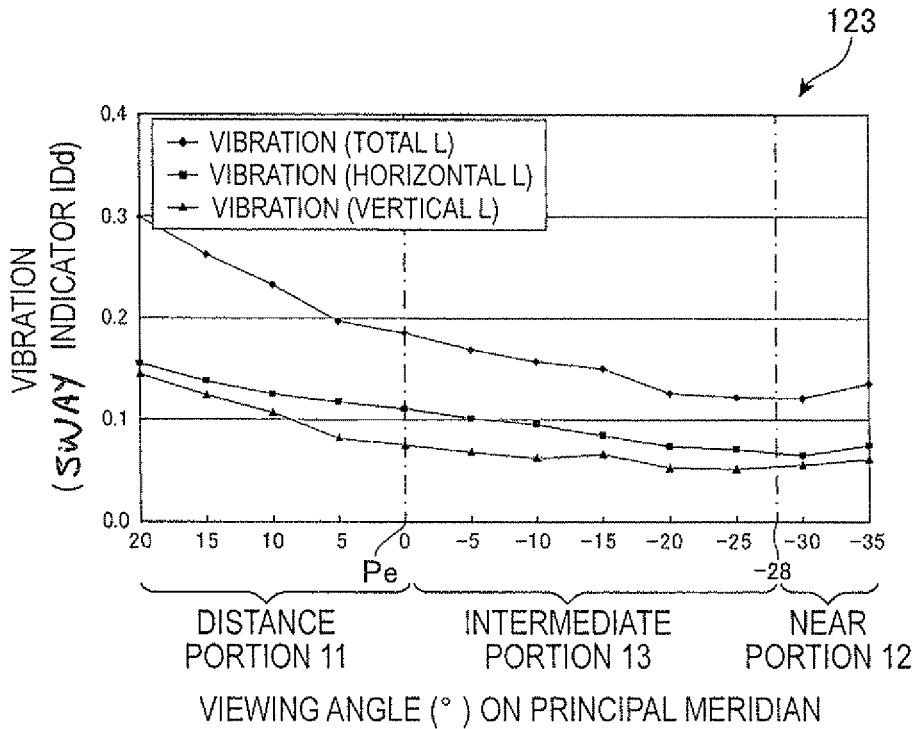
FIG. 48A is a diagram showing vibration (sway indicator IDd) of a progressive power lens based on a third condition of Example 2.
Figure 48B:
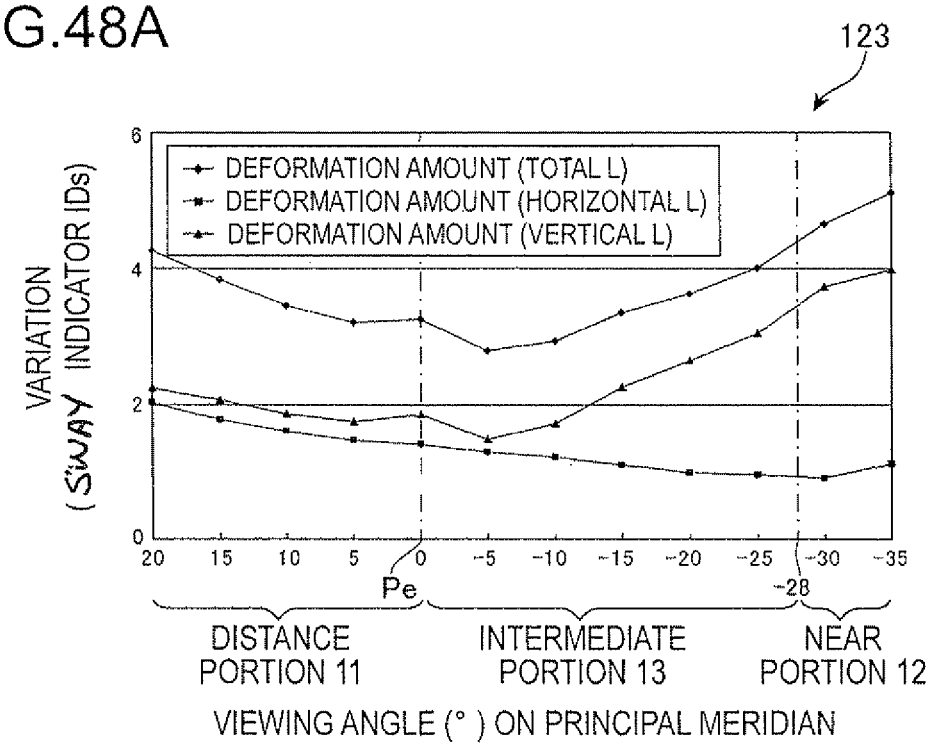
FIG. 48B is a diagram showing a deformation amount (sway indicator IDs).
Figure 49A:
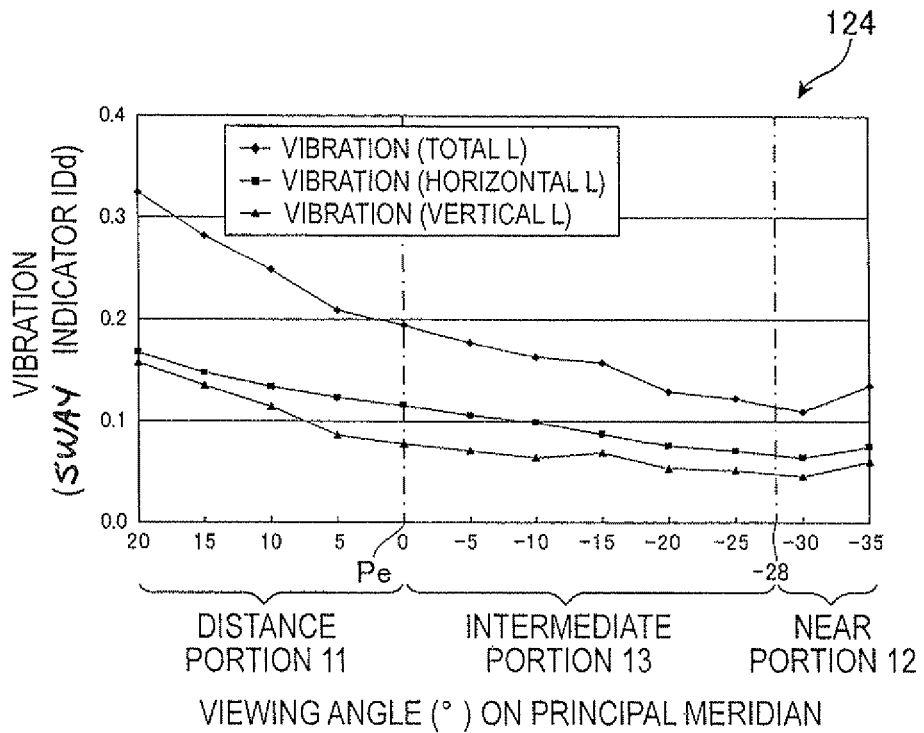
FIG. 49A is a diagram showing vibration (sway indicator IDd) of a progressive power lens of Comparative Example 2.
Figure 49B:
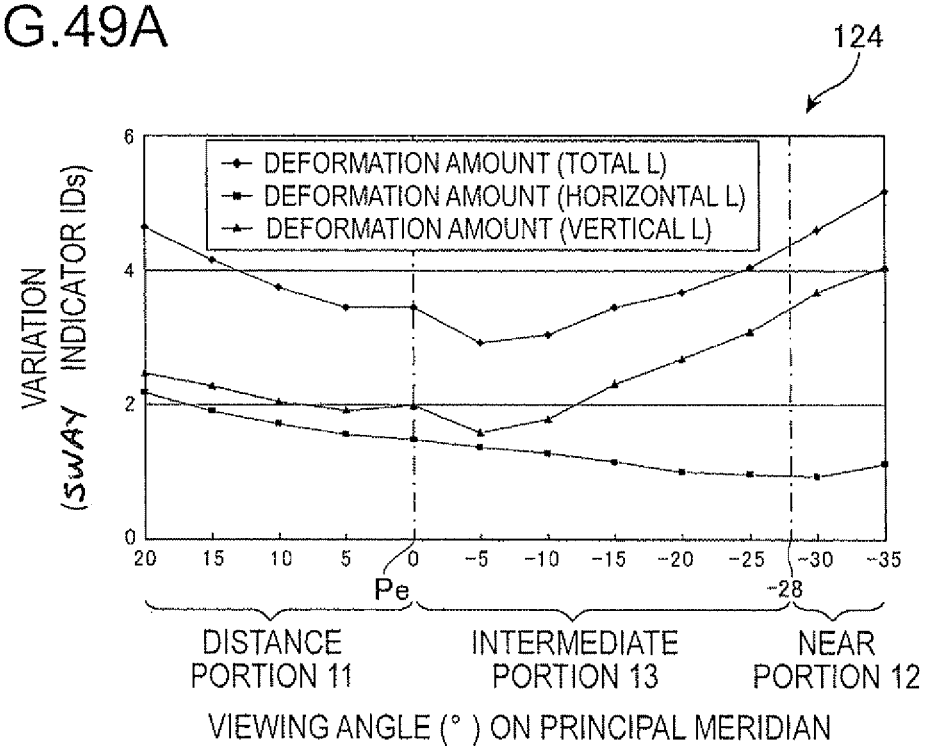
FIG. 49B is a diagram showing a deformation amount (sway indicator IDs).

FIG. 47A shows an indicator IDd relating to vibration obtained by the above-described sway evaluation method (Step 70) in the progressive power lens 122, and FIG. 47B shows an indicator IDs relating to a deformation amount. FIG. 48A shows an indicator IDd relating to vibration obtained by the above-described sway evaluation method (Step 70) in the progressive power lens 123. FIG. 48B shows an indicator IDs relating to a deformation amount. FIG. 49A shows an indicator IDd relating to vibration obtained by the above-described sway evaluation method (Step 70) in the progressive power lens 124 of Comparative Example 2, and FIG. 49B shows an indicator IDs relating to a deformation amount.

By comparison of the indicators IDs and IDd, the progressive power lenses 121 to 123 of Example 2 have low values compared to the progressive power lens 124 of Comparative Example 2. In particular, the indicators IDs and IDd of the progressive power lens 122 designed using the second condition have low values in the near portion 12.

Figure 50A:
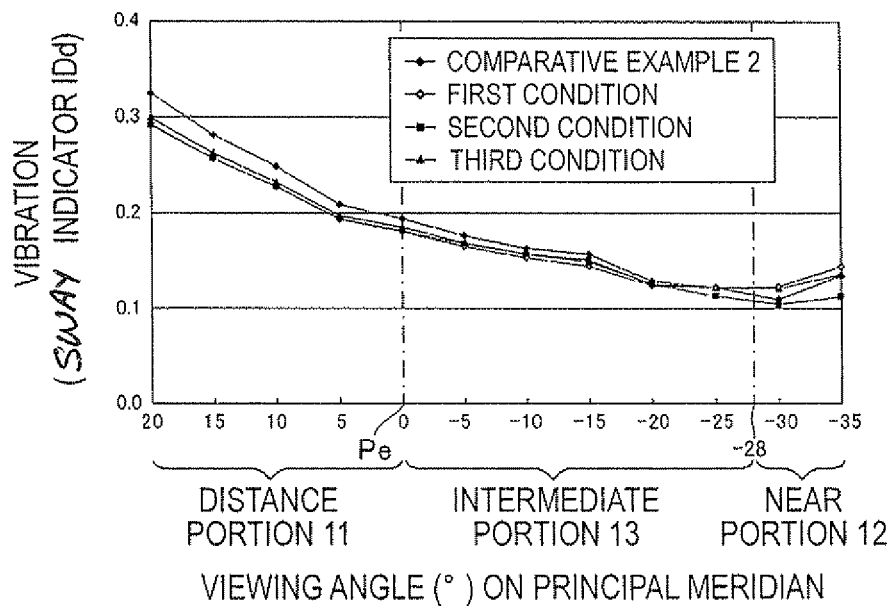
FIG. 50A is a diagram showing vibration (sway indicator IDd) of a progressive power lens of Example 2 and Comparative Example 2.
Figure 50B:
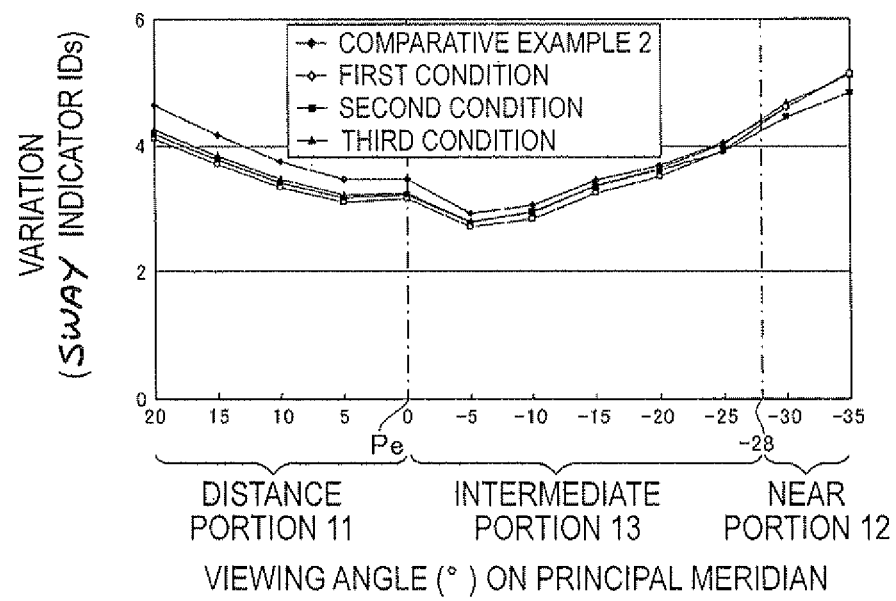
FIG. 50B is a, diagram showing a deformation amount (sway indicator IDs).

FIG. 50A shows an indicator IDd relating to vibration in the progressive power lenses 121 to 124 of Example 2 and Comparative Example 2, and FIG. 50B shows an indicator IDs relating to a deformation amount. FIG. 50A shows "total L" which represents the sum or average of vibration of grid lines in each of the lenses 121 to 124, and FIG. 50B shows "total L" which represents the sum or average of the variation areas of grid lines in each of the lenses 121 to 124.

Figure 51:
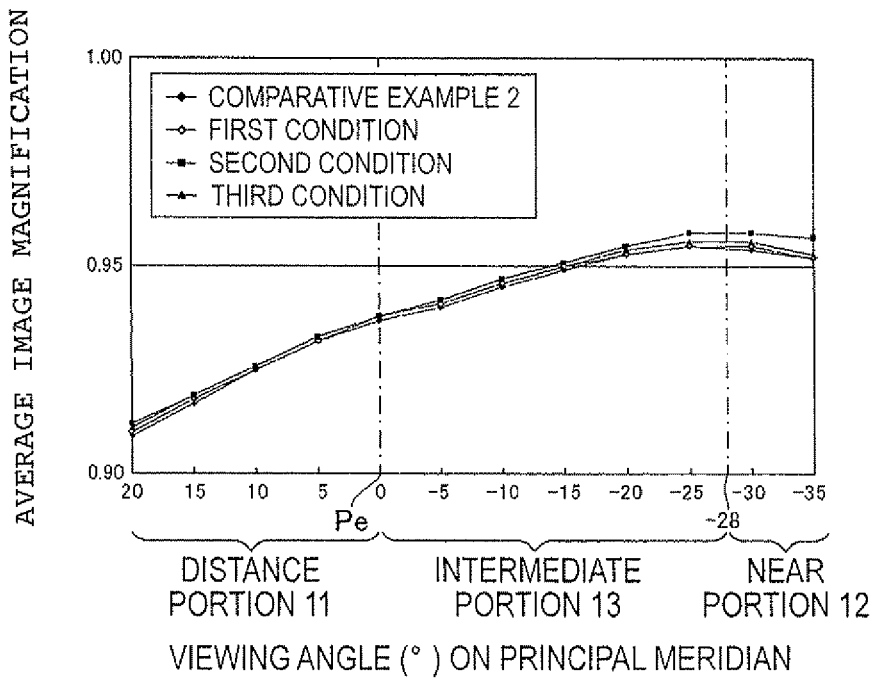
FIG. 51 is a diagram showing average image magnification on a principal meridian of a progressive power lens of Example 2 and Comparative Example 2.

FIG. 51 shows average image magnification on the principal meridian 14 obtained by a ray trace method in each of the progressive power lenses 121 to 124 of Example 2 and Comparative Example 2.

From sway evaluation shown in these drawings, it is found that, even when the prescription power of the distance portion 11 is a near-sight system, all the progressive power lenses 121 to 123 of Example 2 have less sway compared to the progressive power lens 124 of Comparative Example 2. In particular, it is found that the progressive power lens 122 applied with the second condition has less sway in the near portion 12 compared to other progressive power lenses 111 and 113 of Example 2. However, the difference is not so large, and for practical use, a difference in image sway may not be perceived so much.

As shown in FIG. 51, the progressive power lens 112 applied with the second condition has high image magnification over the distance portion 11, the intermediate portion 13, and the near portion 12 compared to other progressive power lenses 111 and 113 of Example 2 and the lens 124 of Comparative Example 2. In particular, there is a difference in image magnification from below the intermediate portion 13 to the near portion 12. A study on aniseikonia due to a difference in magnification caused by a difference between the left and right powers of the spectacles shows that a person perceives a difference in image magnification of about 0.2%, and a difference of 1 to 2% interferes with binocular vision. Accordingly, a difference in image magnification shown in FIG. 51 sufficiently affects vision.

Accordingly, in the near-sight system as well as the far-sight system, with the use of the progressive power lenses 121 to 123 of Example 2 having the elements of the tonic surface, it is understood that it is possible to reduce image sway compared to the progressive power lens 124 of Comparative Example 2 having a spherical surface. In the near-sight system, in particular, in the near-sight system where the prescription power of the distance portion 11 is equal to or smaller than −3.0 (D), it is understood that the progressive power lens 122 in which the object-side surface 19A includes elements of a progressive surface and which uses the second condition has the highest magnification, and is suitable as a near-sight system progressive power lens.

That is, in the prescription for the far-sight system, image magnification is greater than 1, and an image is viewed on a magnified scale, thereby obtaining satisfactory vision by much. Meanwhile, in the prescription for the near-sight system, image magnification is smaller than 1, and an image is viewed on a reduced scale. For this reason, good vision is obtained with difficulty. The progressive power lens 122 by a second specification includes a so-called object-side progressive specification where the surface power OVP in the vertical direction on the object-side surface 19A progressively increases from the intermediate portion 13 toward the near portion 12. Accordingly, it is possible to reduce image sway by the elements of the toric surface and to increase image magnification.

As described above, in the near-sight system, it is understood that, with the use of the second condition, it is possible to provide the progressive power lens 122 which has less image sway and is likely to obtain good vision. Accordingly, when the prescription of the distance portion 11 is a near-sight system, it is effective to preferentially select the spectacle specification including the second condition.

2.2.3 Example 3

2.2.3.1 Specification Including First Condition

A basic spectacle specification of Example 3 includes the use of a progressive power lens "SEKIO P-1 SYNERGY AS" (refractive index 1.67) manufactured by SEIKO EPSON CORPORATION. This progressive power lens is designed with the application of a progressive zone length of 14 mm, a prescription power (plus distance power, Sph) of 0.0 (D), and an addition power (Add) of 2.00 (D). The diameter of the progressive power lens of Example 3 is 65 mm, and an astigmatic power is not included. Accordingly, the progressive power lens of Example 3 is a spectacle lens in which the average prescription power of the distance portion 11 is near 0.0 (D), specifically, the average prescription power of the distance portion 11 is close to emmetropia.

Figure 52:
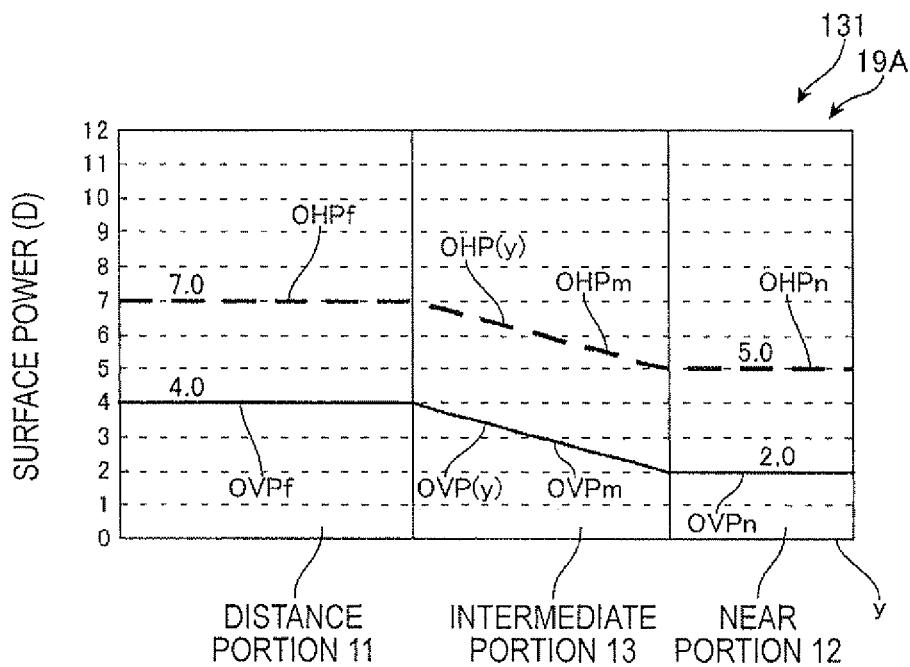
FIG. 52 is a diagram showing a surface power on a principal meridian on the object-side surface of a progressive power lens designed using a spectacle specification including a first condition of Example 3.
Figure 53:
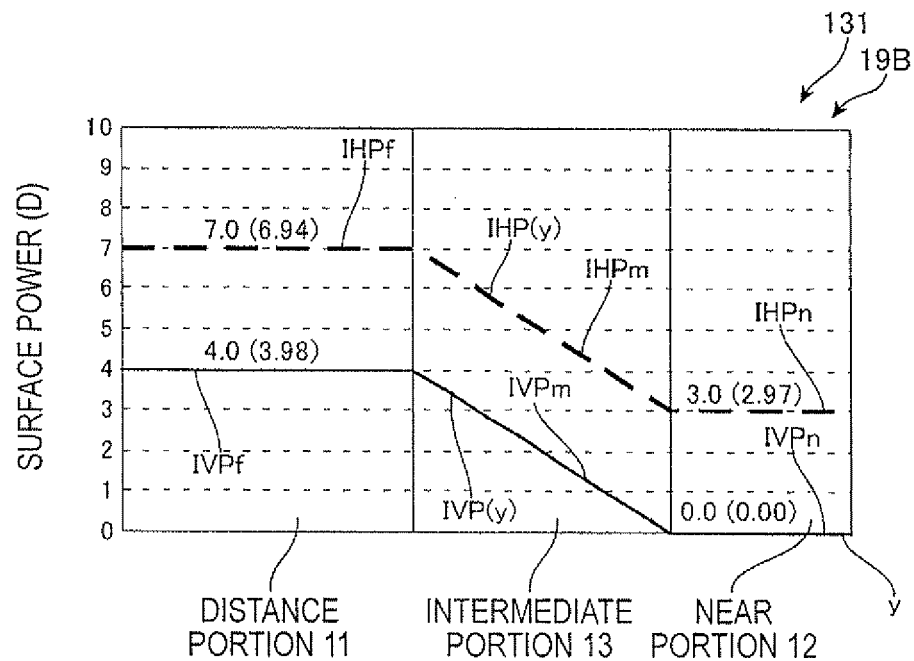
FIG. 53 is a diagram showing a surface power on a principal meridian on the eyeball-side surface of a progressive power lens designed using a spectacle specification including a first condition of Example 3.

FIG. 52 shows a surface power OHP(y) in the horizontal direction and a surface power OVP(y) in the vertical direction along the principal meridian 14 on the object-side surface 19A of a progressive power lens 131 designed using the spectacle specification including the elements of the toric surface expressed by Expression (0) and the first condition expressed by Expression (1) based on the basic specification in terms of dioptre (D). FIG. 53 shows a surface power IHP(y) in the horizontal direction and a surface power IVP(y) in the vertical direction along the principal meridian 14 on the eyeball-side surface 19B of the progressive power lens 131 in terms of dioptre (D).

In the progressive power lens 131, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 52, the surface power OHPf in the horizontal direction of the distance portion 11 on the object-side surface 19A is constant to 7.0 (D). The surface power OHPm in the horizontal direction of the intermediate portion 13 progressively decreases and becomes 5.0 (D) in the near portion 12. The surface power OHPn in the horizontal direction of the near portion 12 is constant to 5.0 (D).

The surface power OVPf in the vertical direction of the distance portion 11 on the object-side surface 19A is constant to 4.0 (D). The surface power OVPm in the vertical direction of the intermediate portion 13 progressively decreases and becomes 2.0 (D) in the near portion 12. The surface power OVPn in the vertical direction of the near portion 12 is constant to 2.0 (D).

On the object-side surface 19A of the progressive power lens 131, a toric surface in which the surface powers OHPf, OHPm, and OHPn in the horizontal direction are respectively shifted in a direction to be greater than the surface powers OVPf, OVPm, and OVPn in the vertical direction by 3.0 (D) is formed along the principal meridian 14. In regard to the surface power in the vertical direction, the surface power OVPf of the distance portion 11 is greater than the surface power OVPn of the near portion 12 and includes regressive elements. In regard to the surface power in the horizontal direction, the surface power OHPf of the distance portion 11 is greater than the surface power OHPn of the near portion 12 and includes regressive elements.

On the eyeball-side surface 19B shown in FIG. 53, the surface power IHPf in the horizontal direction of the distance portion 11 is constant to 7.0 (D). The surface power IHPm in the horizontal direction of the intermediate portion 13 progressively decreases and becomes 3.0 (D) in the near portion 12. The surface power IHPn in the horizontal direction of the near portion 12 is constant to 3.0 (D).

The surface power IVPf in the vertical direction of the distance portion 11 on the eyeball-side surface 19B is constant to 4.0 (D). The surface power IVPm in the vertical direction of the intermediate portion 13 progressively decreases and becomes 0.0 (D) in the near portion 12. The surface power IVPn in the vertical direction of the near portion 12 is constant to 0.0 (D).

On the eyeball-side surface 19B of the progressive power lens 131, a toric surface in which the surface powers IHPf, IHPm, and IHPn in the horizontal direction are respectively shifted in a direction to be greater than the surface powers IVPf, IVPm, and IVPn in the vertical direction by 3.0 (D) is formed along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 131 includes the conditions of Expressions (0), (1), and (4).

2.2.3.2 Specification Including Second Condition

Figure 54:
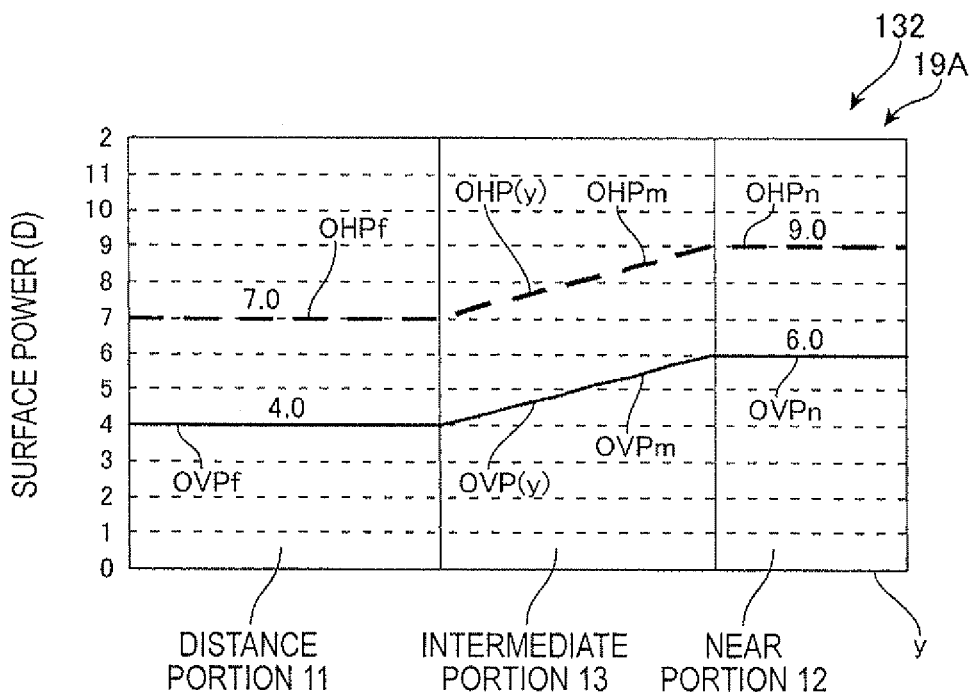
FIG. 54 is a diagram showing a surface power on a principal meridian on the object-side surface of a progressive power lens designed using a spectacle specification including a second condition of Example 3.
Figure 55:
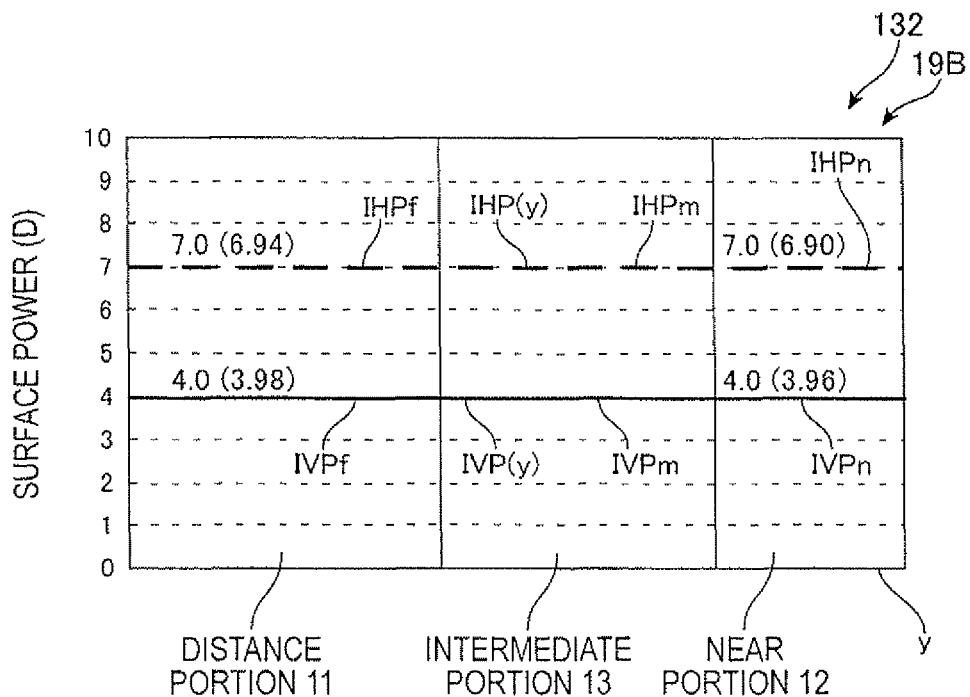
FIG. 55 is a diagram showing a surface power on a principal meridian on the eyeball-side surface of a progressive power lens designed using a spectacle specification including a second condition of Example 3.

FIG. 54 shows a surface power OHP(y) in the horizontal direction and a surface power OVP(y) in the vertical direction along the principal meridian 14 on the object-side surface 19A of a progressive power lens 132 designed using the spectacle specification including the elements of the toric surface expressed by Expression (0) and the second condition expressed by Expression (2) based on the basic specification in terms of dioptre (D). FIG. 55 shows a surface power IHP(y) in the horizontal direction and a surface power IVP(y) in the vertical direction along the principal meridian 14 on the eyeball-side surface 19B of the progressive power lens 132 in terms of dioptre (D). Unless particularly described, the spectacle specification is the same as the spectacle specification of (2.2.3.1). The same is also applied to the following description.

In the progressive power lens 132, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is a surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 54, the surface power OHPf in the horizontal direction of the distance portion 11 on the object-side surface 19A is constant to 7.0 (D). The surface power OHPm in the horizontal direction of the intermediate portion 13 progressively increases and becomes 9.0 (D) in the near portion 12. The surface power OHPn in the horizontal direction of the near portion 12 is constant to 9.0 (D).

The surface power OVPf in the vertical direction of the distance portion 11 on the object-side surface 19A is constant to 4.0 (D). The surface power OVPm in the vertical direction of the intermediate portion 13 progressively increases and becomes 6.0 (D) in the near portion 12. The surface power OVPn in the vertical direction of the near portion 12 is constant to 6.0 (D).

On the object-side surface 19A of the progressive power lens 132, a toric surface in which the surface powers OHPf, OHPm, and OHPn in the horizontal direction are respectively shifted in a direction to be greater than the surface powers OVPf, OVPm, and OVPn in the vertical direction of the distance portion 11 by 3.0 (D) is formed along the principal meridian 14. In regard to the surface powers in the vertical direction and the horizontal direction, the surface powers OVPn and OHPn of the near portion 12 are greater than the surface powers OVPf and OHPf of the distance portion 11, and the intermediate portion 13 on the object-side surface 19A includes elements of a progressive surface.

On the eyeball-side surface 19B shown in FIG. 55, the surface power IHPf in the horizontal direction of the distance portion 11, the surface power IHPm in the horizontal direction of the intermediate portion 13, and the surface power IHPn in the horizontal direction of the near portion 12 are constant to 7.0 (D).

The surface power IVPf in the vertical direction of the distance portion 11, the surface power IVPm in the vertical direction of the intermediate portion 13, and the surface power IVPn in the vertical direction of the near portion 12 on the eyeball-side surface 19B are constant to 4.0 (D). Accordingly, on the eyeball-side surface 19B of the progressive power lens 132, a toric surface in which the surface power IHP in the horizontal direction is shifted in a direction to be greater than the surface power IVP in the vertical direction of each of the distance portion 11, the intermediate portion 13, and the near portion 12 by 3.0 (D) is formed along the principal meridian 14, and shifts in the surface power by the elements of the toric surface on the object-side surface 19A are cancelled.

The surface power in the vertical direction and the surface power in the horizontal direction on the eyeball-side surface 19B are constant in the distance portion 11, the intermediate portion 13, and the near portion 12, and the progressive power lens 132 is an object-side progressive lens as a whole, not an eyeball-side progressive lens.

Accordingly, the progressive power lens 132 includes the conditions of Expressions (0) and (2).

2.2.3.3 Specification Including Third Condition

Figure 56:
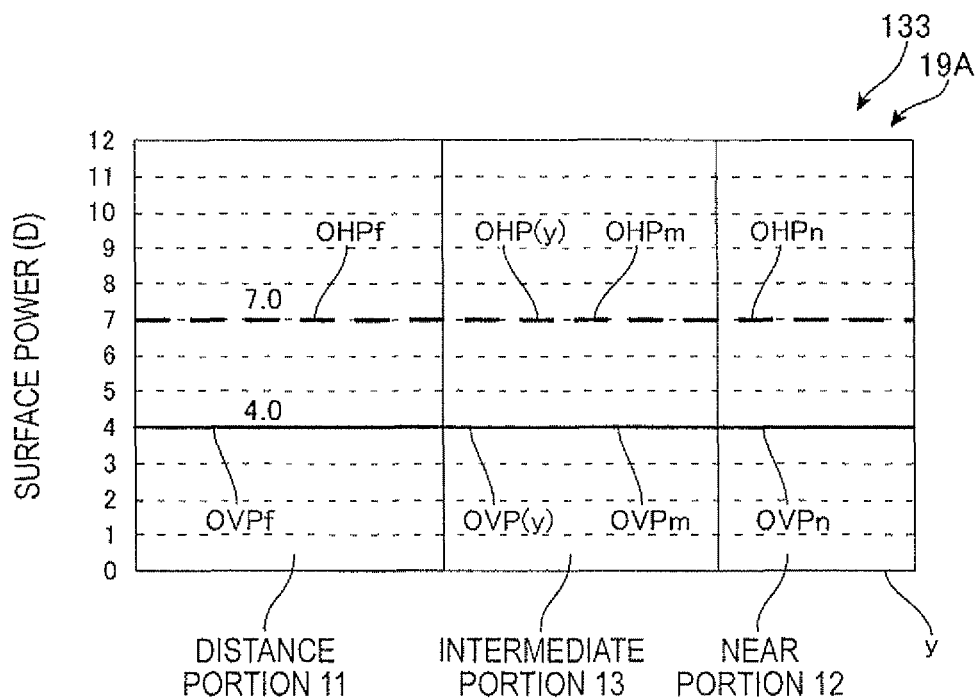
FIG. 56 is a diagram showing a surface power on a principal meridian on the object-side surface of a progressive power lens designed using a spectacle specification including a third condition of Example 3.
Figure 57:
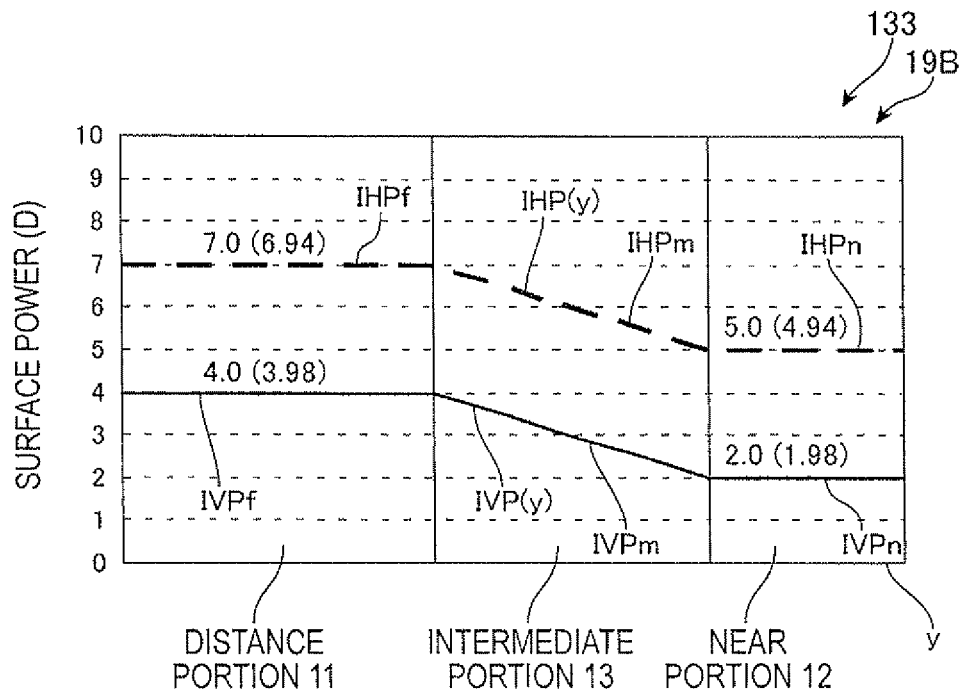
FIG. 57 is a diagram showing a surface power on a principal meridian on the eyeball-side surface of a progressive power lens designed using a spectacle specification including a third condition of Example 3.

FIG. 56 shows a surface power OHP(y) in the horizontal direction and a surface power OVP(y) in the vertical direction along the principal meridian 14 on the object-side surface 19A of a progressive power lens 133 designed using the spectacle specification including the elements of the toric surface expressed by Expression (0) and the third condition expressed by Expression (3) based on the basic specification in terms of dioptre (D). FIG. 57 shows a surface power IHP(y) in the horizontal direction and a surface power IVP(y) in the vertical direction along the principal meridian 14 on the eyeball-side surface 19B of the progressive power lens 133 in terms of dioptre (D).

In the progressive power lens 133, as a whole, the object-side surface 19A is a progressive surface (object-side progressive surface) which includes elements of a toric surface (toroidal surface) with the surface power OHP in the horizontal direction greater than the surface power OVP in the vertical direction, and the eyeball-side surface 19B is an eyeball-side progressive surface which includes elements of a toric surface with the surface power IHP in the horizontal direction greater than the surface power IVP in the vertical direction so as to cancel shifts in the surface power by the elements of the toric surface on the object-side surface 19A.

Specifically, on the object-side surface 19A shown in FIG. 56, the surface power OHPf in the horizontal direction of the distance portion 11, the surface power OHPm in the horizontal direction of the intermediate portion 13, and the surface power OHPn in the horizontal direction of the near portion 12 on the object-side surface 19A are constant to 7.0 (D).

Similarly, the surface power OVPf in the vertical direction of the distance portion 11, the surface power OVPm in the vertical direction of the intermediate portion 13, and the surface power OVPn in the vertical direction of the near portion 12 on the object-side surface 19A are constant to 4.0 (D).

On the object-side surface 19A of the progressive power lens 133, a toric surface in which the surface powers OHPf, OHPm, and OHPn in the horizontal direction are respectively shifted in a direction to be greater than the surface powers OVPf, OVPm, and OVPn in the vertical direction by 3.0 (D) is formed along the principal meridian 14. The surface powers OVPf, OVPm, and OVPn in the vertical direction are equal, and the surface powers OHPf, OHPm, and OHPn in the horizontal direction are equal, such that a simple toric surface (toroidal surface) is formed along the principal meridian 14.

On the eyeball-side surface 19B shown in FIG. 57, the surface power IHPf in the horizontal direction of the distance portion 11 is constant to 7.0 (D). The surface power IHPm in the horizontal direction of the intermediate portion 13 progressively decreases and becomes 5.0 (D) in the near portion 12. The surface power IHPn in the horizontal direction of the near portion 12 is constant to 5.0 (D).

The surface power IVPf in the vertical direction of the distance portion 11 on the eyeball-side surface 19B is constant to 4.0 (D). The surface power IVPm in the vertical direction of the intermediate portion 13 progressively decreases and becomes 2.0 (D) in the near portion 12. The surface power IVPn in the vertical direction of the near portion 12 is constant to 2.0 (D).

On the eyeball-side surface 19B of the progressive power lens 133, a toric surface in which the surface powers IHPf, IHPm, and IHPn in the horizontal direction are respectively shifted in a direction to be greater than the surface powers IVPf, IVPm, and IVPn in the vertical direction by 3.0 (D) is formed along the principal meridian 14, and shifts in the surface power by the elements of the toric surface on the object-side surface 19A are cancelled. The surface power in the vertical direction includes elements of a progressive surface with the surface power IVPf of the distance portion 11 greater than the surface power IVPn of the near portion 12, and a predetermined addition power is obtained in relation to the surface power on the object-side surface 19A. The surface power in the horizontal direction includes elements of a progressive surface with the surface power IHPf of the distance portion 11 greater than the surface power IHPn of the near portion 12, and a predetermined addition power is obtained in relation to the surface power on the object-side surface 19A.

Accordingly, the progressive power lens 133 is an eyeball-side progressive lens in which the eyeball-side surface and the object-side surface include the elements of the toric surface, and includes the conditions of Expressions (0), (3), and (4).

2.2.3.4 Comparative Example 3

Figure 58:
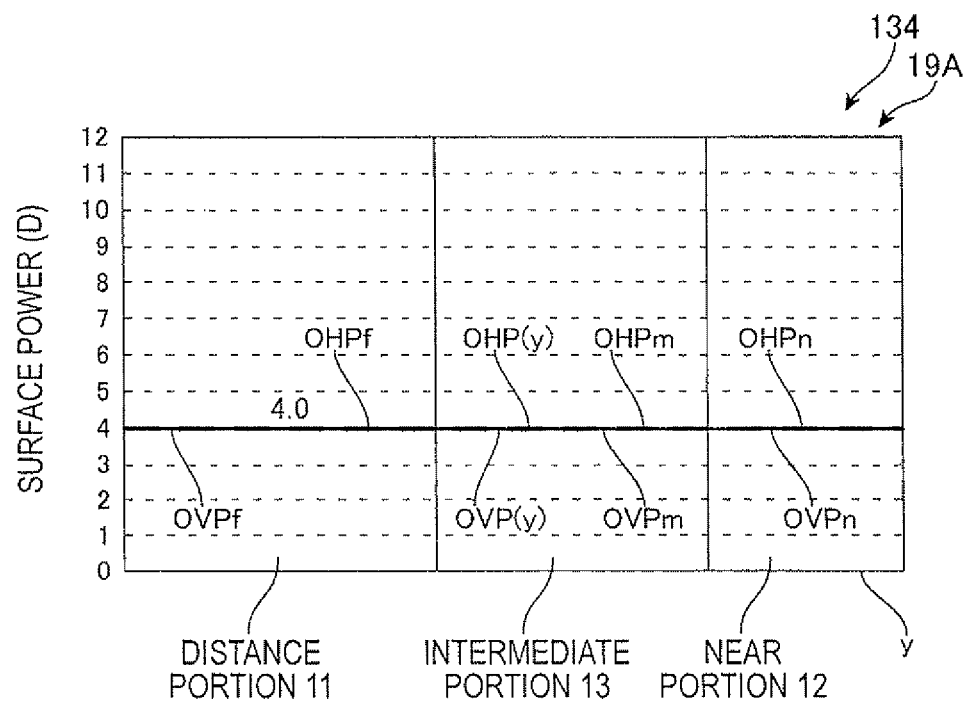
FIG. 58 is a diagram showing a surface power on a principal meridian on the object-side surface of a progressive power lens of Comparative Example 3.
Figure 59:
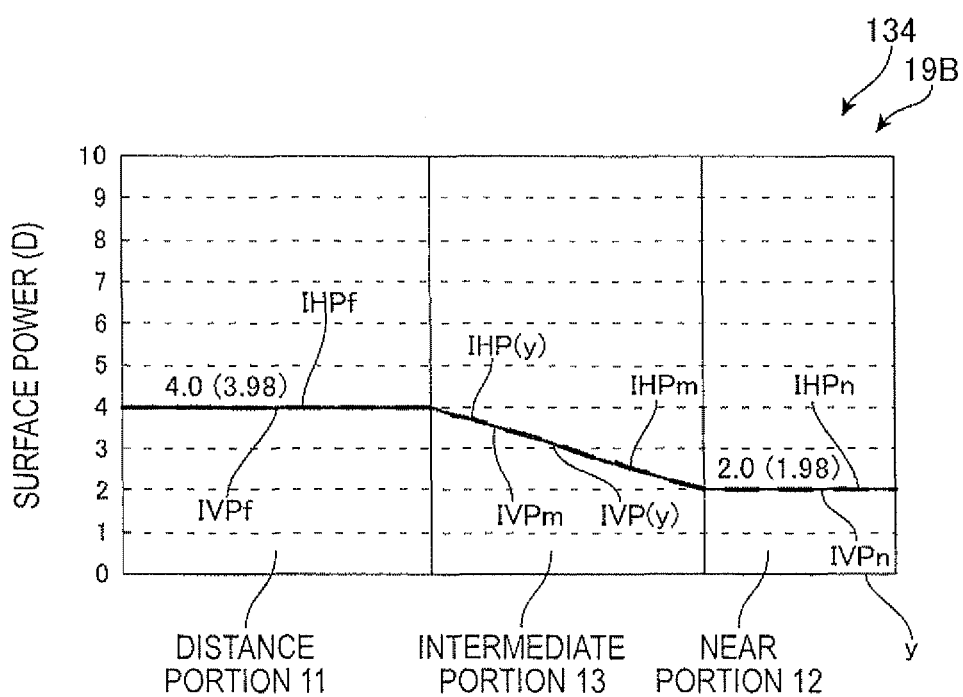
FIG. 59 is a diagram showing a surface power on a principal meridian on the eyeball-side surface of a progressive power lens of Comparative Example 3.
Figure 60A:
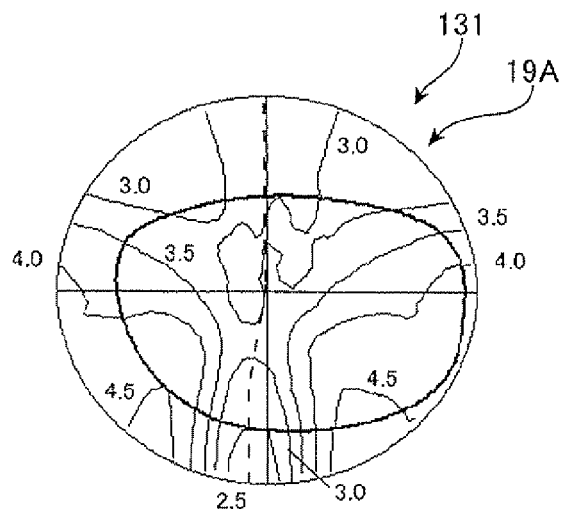
FIG. 60A is a diagram showing a surface astigmatism distribution on the object-side surface of a progressive power lens based on a first condition of Example 3.
Figure 60B:
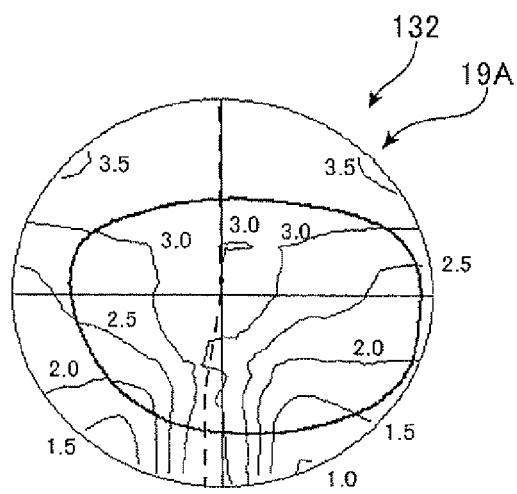
FIG. 60B is a diagram showing a surface astigmatism distribution on the object-side surface of a progressive power lens based on a second condition.
Figure 60C:
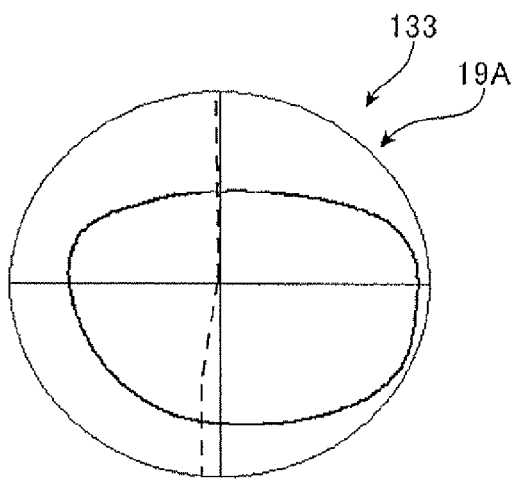
FIG. 60C is a diagram showing a surface astigmatism distribution on the object-side surface of a progressive power lens based on a third condition.
Figure 60D:
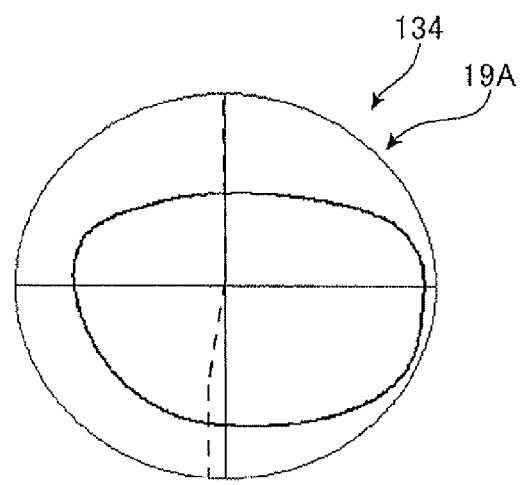
FIG. 60D is a diagram showing a surface astigmatism distribution on the object-side surface of a progressive power lens of Comparative Example 3.
Figure 61A:
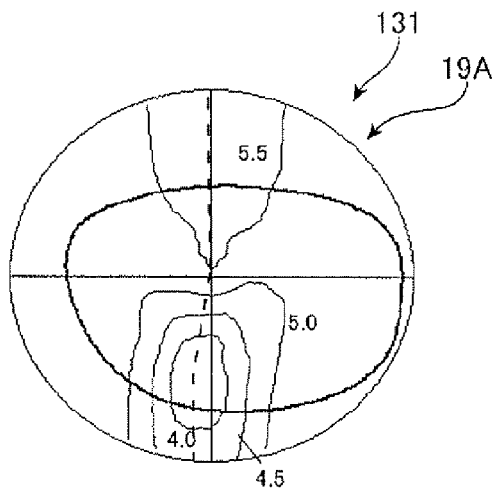
FIG. 61A is a diagram showing an equivalent spherical surface power distribution on the object-side surface of a progressive power lens based on a first condition of Example 3.
Figure 61B:
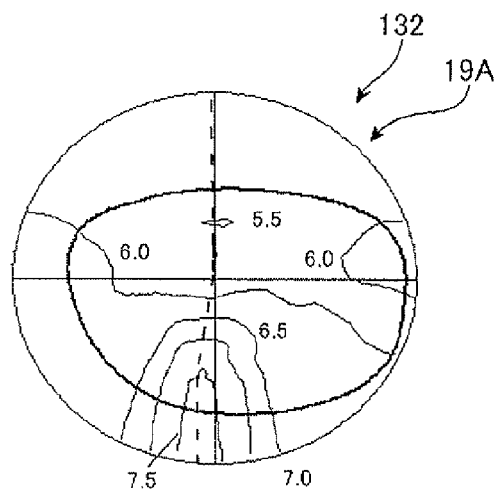
FIG. 61B is a diagram showing an equivalent spherical surface power distribution on the object-side surface of a progressive power lens based on a second condition.
Figure 61C:
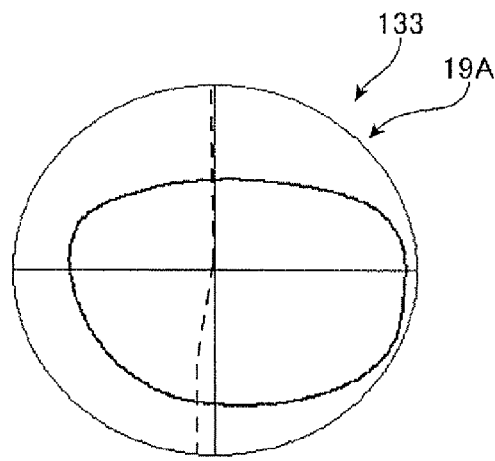
FIG. 61C is a diagram showing an equivalent spherical surface power distribution on the object-side surface of a progressive power lens based on a third condition.
Figure 61D:
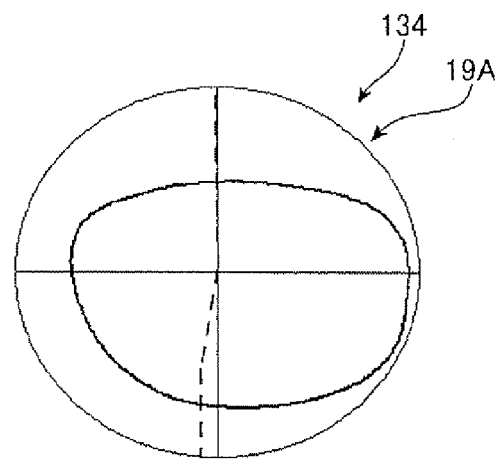
FIG. 61D is a diagram showing an equivalent spherical surface power distribution on the object-side surface of a progressive power lens of Comparative Example 3.
Figure 62A:
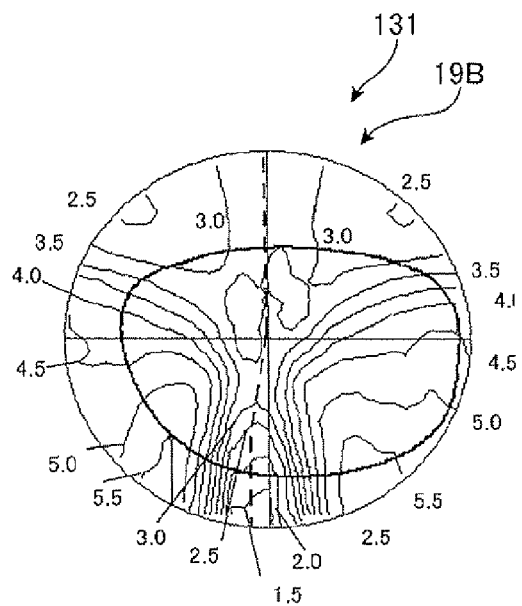
FIG. 62A is a diagram showing a surface astigmatism distribution on the eyeball-side surface of a progressive power lens based on a first condition of Example 3.
Figure 62B:
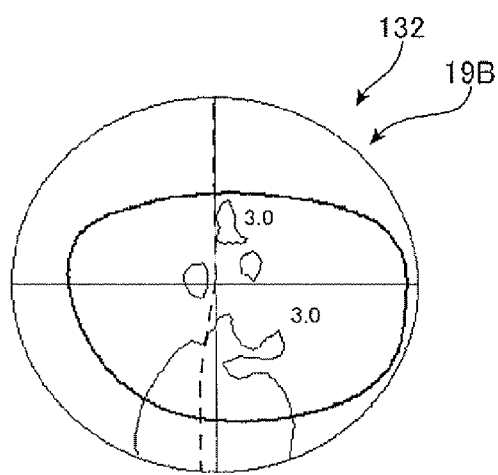
FIG. 62B is a diagram showing a surface astigmatism distribution on the eyeball-side surface of a progressive power lens based on a second condition.
Figure 62C:
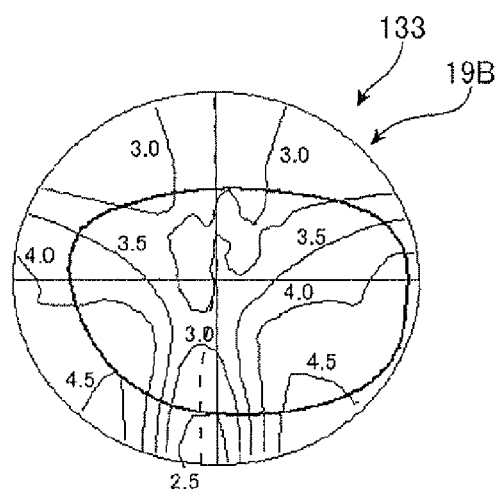
FIG. 62C is a diagram showing a surface astigmatism distribution on the eyeball-side surface of a progressive power lens based on a third condition.
Figure 62D:
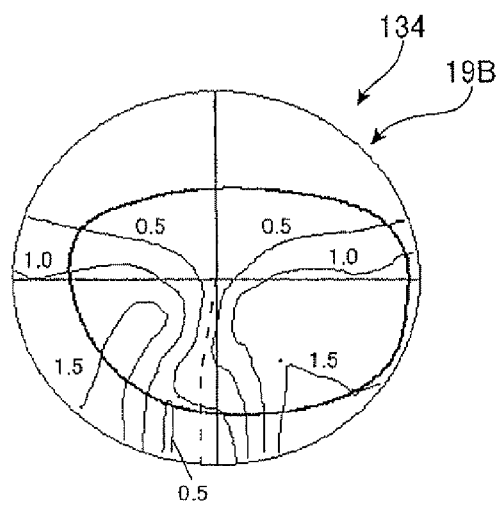
FIG. 62D is a diagram showing a surface astigmatism distribution on the eyeball-side surface of a progressive power lens of Comparative Example 3.
Figure 63A:
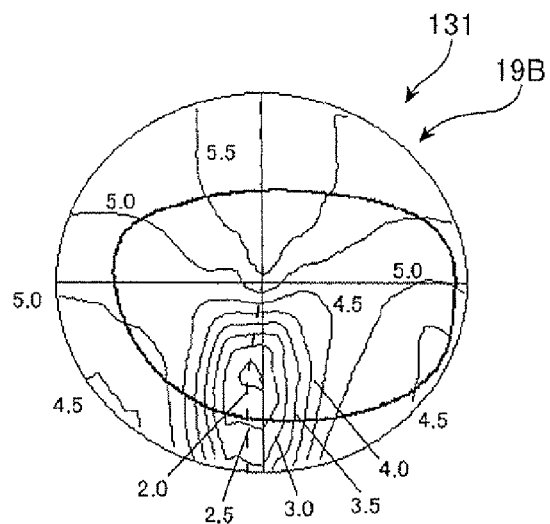
FIG. 63A is a diagram showing an equivalent spherical surface power distribution on the eyeball-side surface of a progressive power lens based on a first condition of Example 3.
Figure 63B:
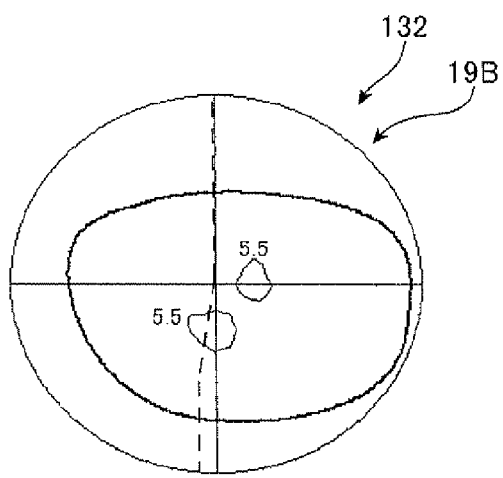
FIG. 63B is a diagram showing an equivalent spherical surface power distribution on the eyeball-side surface of a progressive power lens based on a second condition.
Figure 63C:
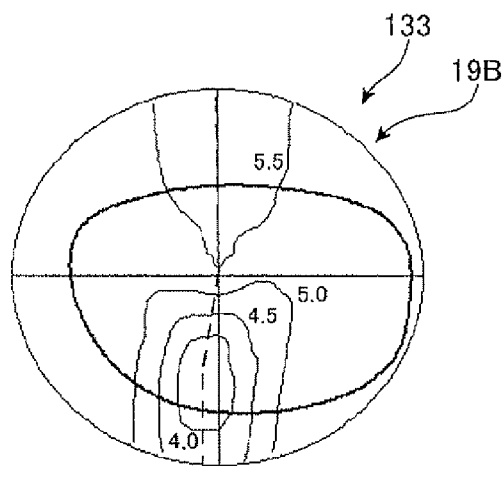
FIG. 63C is a diagram showing an equivalent spherical surface power distribution on the eyeball-side surface of a progressive power lens based on a third condition.
Figure 63D:
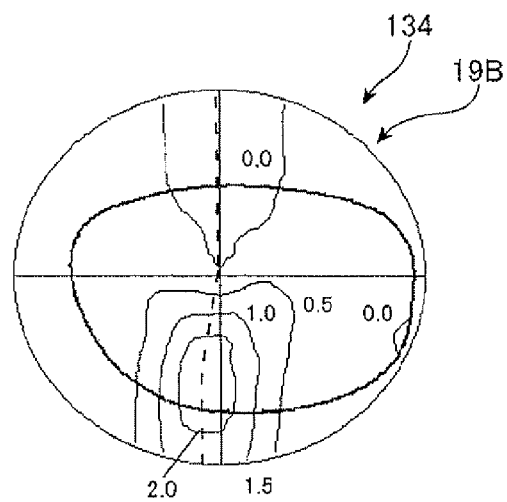
FIG. 63D is a diagram showing an equivalent spherical surface power distribution on the eyeball-side surface of a progressive power lens of Comparative Example 3.
Figure 64A:
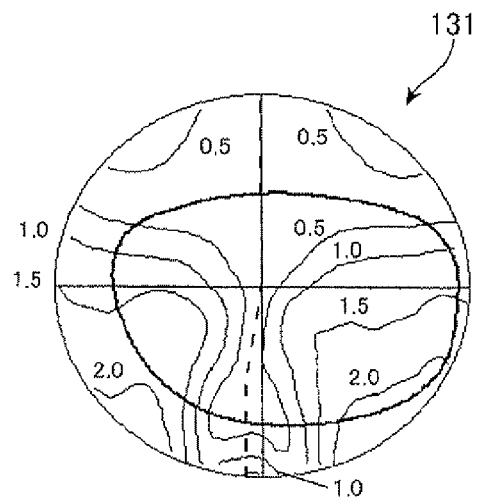
FIG. 64A is a diagram showing an astigmatism distribution of a progressive power lens based on a first condition of Example 3.
Figure 64B:
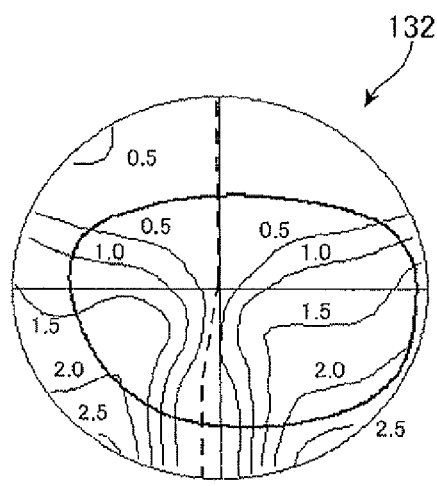
FIG. 64B is a diagram showing an astigmatism distribution of a progressive power lens based on a second condition.
Figure 64C:
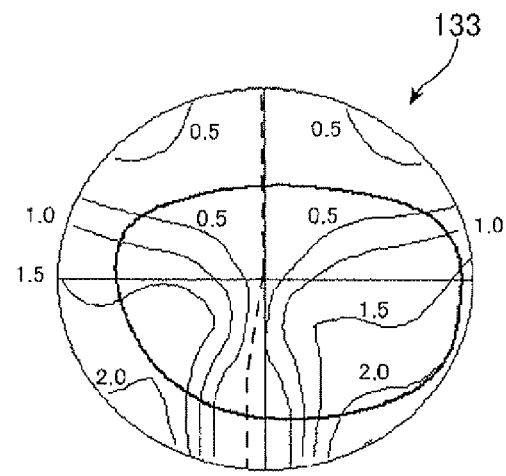
FIG. 64C is a diagram showing an astigmatism distribution of a progressive power lens based on a third condition.
Figure 64D:
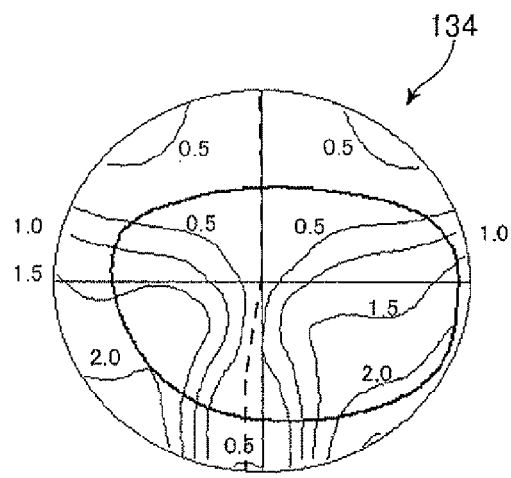
FIG. 64D is a diagram showing an astigmatism distribution of a progressive power lens of Comparative Example 3.
Figure 65A:
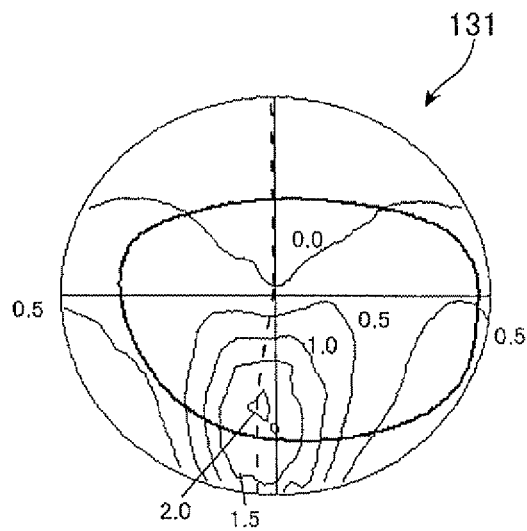
FIG. 65A is a diagram showing an equivalent spherical power distribution of a progressive power lens based on a first condition of Example 3.
Figure 65B:
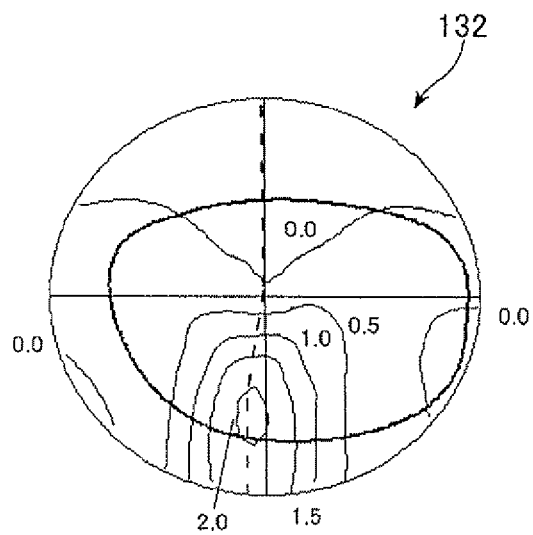
FIG. 65B is a diagram showing an equivalent spherical power distribution of a progressive power lens based on a second condition.
Figure 65C:
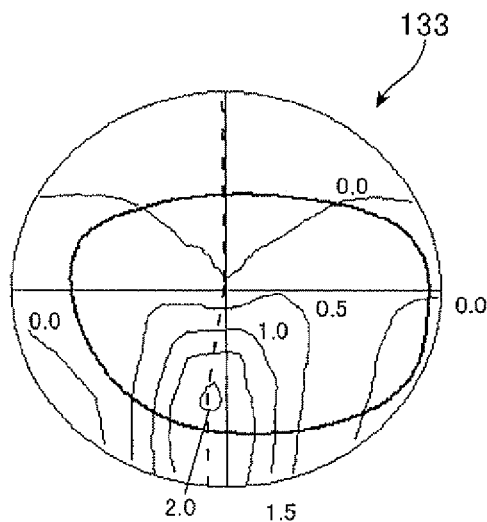
FIG. 65C is a diagram showing an equivalent spherical power distribution of a progressive power lens based on a third condition.
Figure 65D:
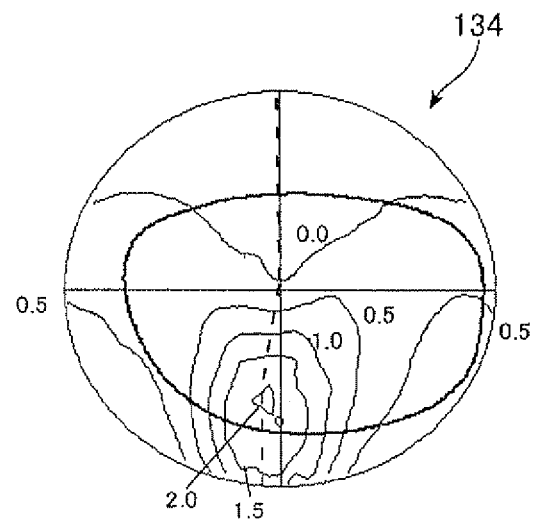
FIG. 65D is a diagram showing an equivalent spherical power distribution of a progressive power lens of Comparative Example 2.

FIG. 58 shows a surface power OHP(y) in the horizontal direction and a surface power OVP(y) in the vertical direction along the principal meridian 14 on the object-side surface 19A of a progressive power lens 134 of Comparative Example 3 designed using an eyeball-side progressive specification, in which the object-side surface 19A is a spherical surface, based on the basic specification in terms of dioptre (D). FIG. 59 shows a surface power IHP(y) in the horizontal direction and a surface power IVP(y) in the vertical direction along the principal meridian 14 on the eyeball-side surface 19B of the progressive power lens 134 in terms of dioptre (D).

As shown in FIG. 58, on the object-side surface 19A of the progressive power lens 124, the surface power OHPf in the horizontal direction of the distance portion 11, the surface power OHPm in the horizontal direction of the intermediate portion 13, the surface power OHPn in the horizontal direction of the near portion 12, the surface power OVPf in the vertical direction of the distance portion 11, the surface power OVPm in the vertical direction of the intermediate portion 13, and the surface power OVPn in the vertical direction of the near portion 12 are constant to 4.0 (D).

On the eyeball-side surface 19B of the progressive power lens 124 shown in FIG. 59, the surface power IHPf in the horizontal direction and the surface power IVPf in the vertical direction of the distance portion 11 are constant to 4.0 (D). The surface power IHPm in the horizontal direction and the surface power IVPm in the vertical direction of the intermediate portion 13 progressively decrease and become 2.0 (D) in the near portion 12. The surface power IHPn in the horizontal direction and the surface power IVPn in the vertical direction of the near portion 12 are constant to 2.0 (D).

Accordingly, the progressive power lens 124 is an eyeball-side progressive lens for a spherical prescription, and does not include elements of a toric surface other than astigmatism correction.

2.2.3.5 Comparison

FIGS. 60A to 60D show surface astigmatism distributions on the object-side surface 19A of the progressive power lenses 131 to 134 of Example 3 and Comparative Example 3. FIGS. 61A to 61D show equivalent spherical surface power distributions on the object-side surface 19A of the progressive power lenses 131 to 134 of Example 3 and Comparative Example 3.

FIGS. 62A to 62D show surface astigmatism distributions on the eyeball-side surface 19B of the progressive power lenses 131 to 134 of Example 3 and Comparative Example 3. FIGS. 63A to 63D show equivalent spherical surface power distributions on the eyeball-side surface 19B of the progressive power lenses 131 to 134 of Example 3 and Comparative Example 3.

FIGS. 64A to 64D show astigmatism distributions when observation is done through each position on the lens in the progressive power lenses 131 to 134 of Example 3 and Comparative Example 3. FIGS. 65A to 65D show equivalent spherical power distributions when observation is done through each position on the lens in the progressive power lenses 131 to 134 of Example 3 and Comparative Example 3. As shown in these drawings, the progressive power lenses 131 to 133 of Example 3 are designed such that the astigmatism distribution and the equivalent spherical power distribution are substantially the same as those in the progressive power lens 134 of Comparative Example 3. That is, the eyeball-side surface 19B of each of the progressive power lenses 131 to 133 is corrected to substantially have the same optical characteristics (astigmatism and equivalent spherical power) within at least a range of the shape when the lens is fitted into the frame to correspond to the progressive power lens 134 of Comparative Example 3.

Figure 66A:
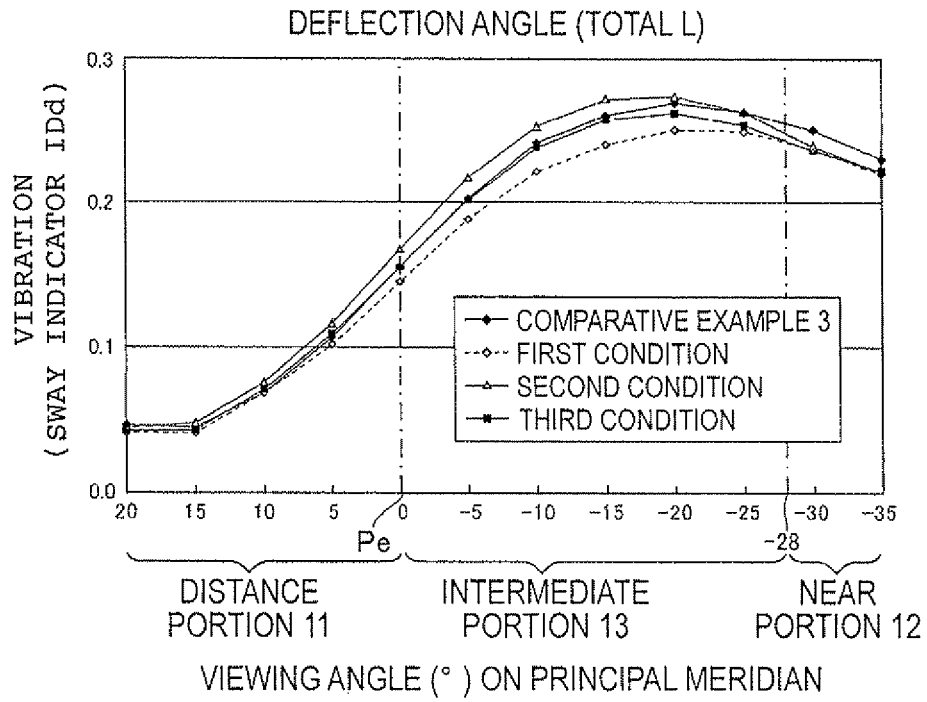
FIG. 66A is a diagram showing vibration (sway indicator IDd) of a progressive power lens of Example 3 and Comparative Example 3.
Figure 66B:
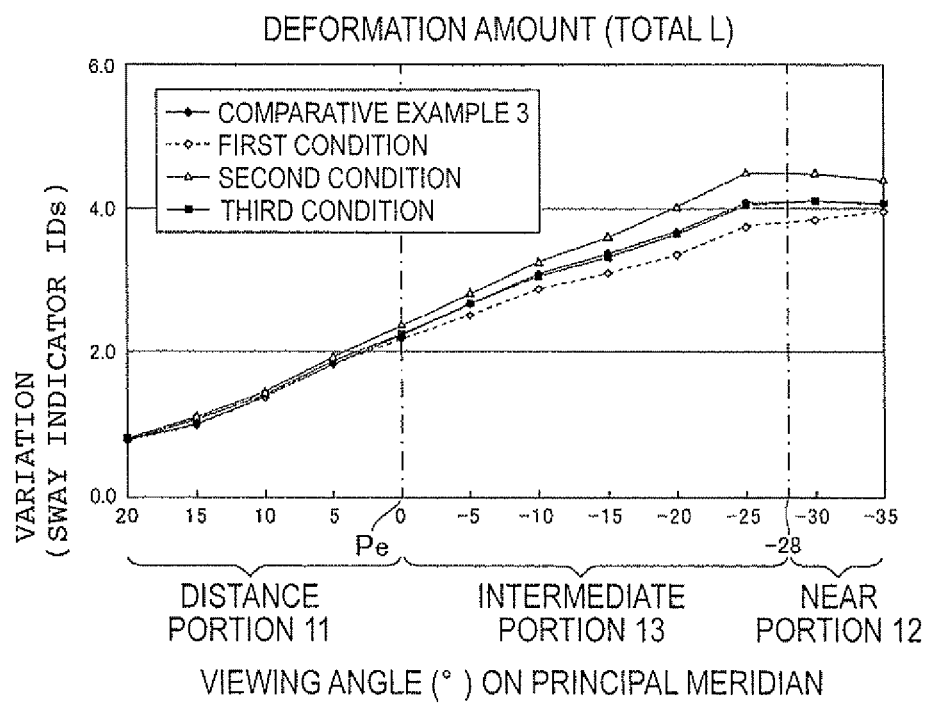
FIG. 66B is a diagram showing a deformation amount (sway indicator IDs).

FIG. 66A shows an indicator IDd relating to vibration in the progressive power lenses 131 to 134 of Example 3 and Comparative Example 3, and FIG. 66B shows an indicator IDs relating to a deformation amount. FIG. 66A shows "total L" which represents the sum or average of vibration of grid lines in each of the lenses 131 to 134, and FIG. 66B shows "total L" which represents the sum or average of the variation areas of grid lines in each of the lenses 131 to 134.

Figure 67:
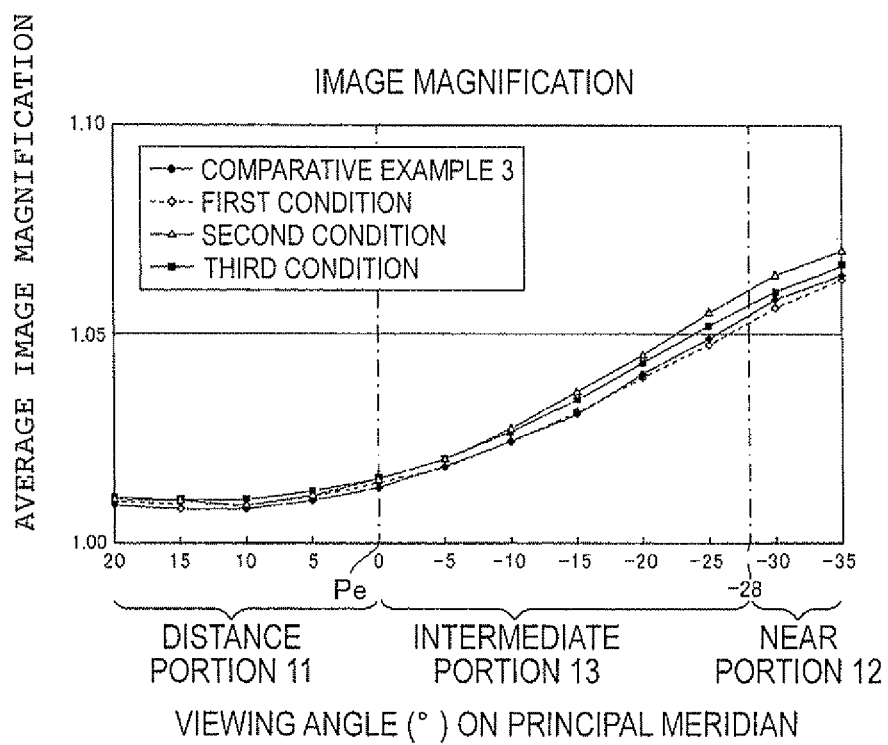
FIG. 67 is a diagram showing average image magnification on a principal meridian of a progressive power lens of Example 3 and Comparative Example 3.

FIG. 67 shows average image magnification on the principal meridian 14 obtained by a ray trace method in each of the progressive power lenses 131 to 134 of Example 3 and Comparative Example 3.

From sway evaluation shown in these drawings, in Example 3 and Comparative Example 3 where the prescription power of the distance portion 11 is close to emmetropia, it is understood that the progressive power lens 132 of Example 3 applied with the second condition has high image magnification and tends to increase in sway compared to the progressive power lens 134 of Comparative Example 3. Meanwhile, it is understood that the progressive power lens 131 of Example 3 applied with the first condition has the same image magnification as the progressive power lens 134 of Comparative Example 3 but has less image sway. It is understood that the progressive power lens 133 of Example 3 applied with the third condition has high image magnification compared to the progressive power lens 134 of Comparative Example 3 and has the same or less image sway.

Accordingly, in a case where the prescription power of the distance portion 11 is close to emmetropia, for a user who is sensitive to image sway, it may be preferable to design a progressive power lens by the spectacle specification including the first condition. In general, however, it is preferable to design a progressive power lens by the spectacle specification including the third condition where image sway is small, image magnification is high, and the image enlargement effect and the vision improvement effect are improved in a balanced manner, thereby providing a progressive power lens suitable for many users.

For this reason, in the spectacle specification where the prescription power of the distance portion 11 is close to emmetropia near 0 (D), it is effective to preferentially select the third condition that the object-side surface 19A is a simple toric surface, that is, the object-side surface 19A does not include elements of a progressive surface.

2.3 Evaluation of Embodiment 1

As described above, with the use of the object-side surface 19A which is different in the specification depending on whether the prescription power of the distance portion 11 is a far-sight system or a near-sight system, it becomes possible to provide a progressive power lens which has less sway and high image magnification, and is suitable for vision improvement, based on the prescription power of each of the far-sight system and the near-sight system.

In a case where the prescription power of the distance portion 11 is close to emmetropia, that is, when prescription power of the distance portion 11 is equal to or smaller than +1.0 (D), that is, a weak plus power (average prescription power is plus) or when the prescription power of the distance portion 11 is equal to or greater than −2.0 (D), that is, a weak minus power (average prescription power is minus), as described in Example 3, from the viewpoint of both sensitivity to sway of the individual user and the vision improvement effect by image magnification, it is possible to select any one of three types of a first specification, a second specification, and a third specification in accordance with the visual characteristics of the user. For image sway evaluation, an evaluation method using a rectangular pattern described herein is suitably used.

On the other hand, in a case where the prescription power of the distance portion 11 is close to emmetropia, unless the user is sensitive to image sway or sufficient vision is not obtained by the spectacle lens and vision improvement will be given preference, it is preferable to design a progressive power lens by the spectacle specification including the third condition where the object-side surface 19A is a simple toric surface (toroidal surface).

As described above, in the far-sight system, in particular, in an example where the prescription power (Sph) of the distance portion 11 is +3.0 (D) (average prescription power is 3.0 (D)), it is effective to apply the first condition. In the near-sight system, in particular, in an example where the prescription power (Sph) of the distance portion 11 is −3.0 (D) (average prescription power is minus and the absolute value thereof is 3.0 (D)), it is effective to apply the second condition. In a stronger distance vision and a stronger near vision than in these examples, the problems of image sway and image magnification due to the distance power grow worse. For this reason, in the far-sight system, when the prescription power (Sph) of the distance portion 11 is equal to or greater than +3.0 (D), that is, the average prescription power of the distance portion is plus and the value thereof is at least 3.0 (D), it is effective to apply the first condition. In the near-sight system, when the prescription power (Sph) of the distance portion 11 is equal to or smaller than (D), that is, the average prescription power of the distance portion is minus and the absolute value thereof is at least 3.0 (D), it is effective to apply the second condition.

As the common effects of a progressive power lens in which a toric surface with the surface power in the horizontal direction greater than the surface power of the vertical direction is used in the object-side surface 19A and the eyeball-side surface 19B, improvement in image sway, ease of viewing with an increase in magnification, and ease of addressing a wraparound frame can be achieved.

3. Embodiment 2

3.1 Second Design and Manufacturing Method

Figure 68:
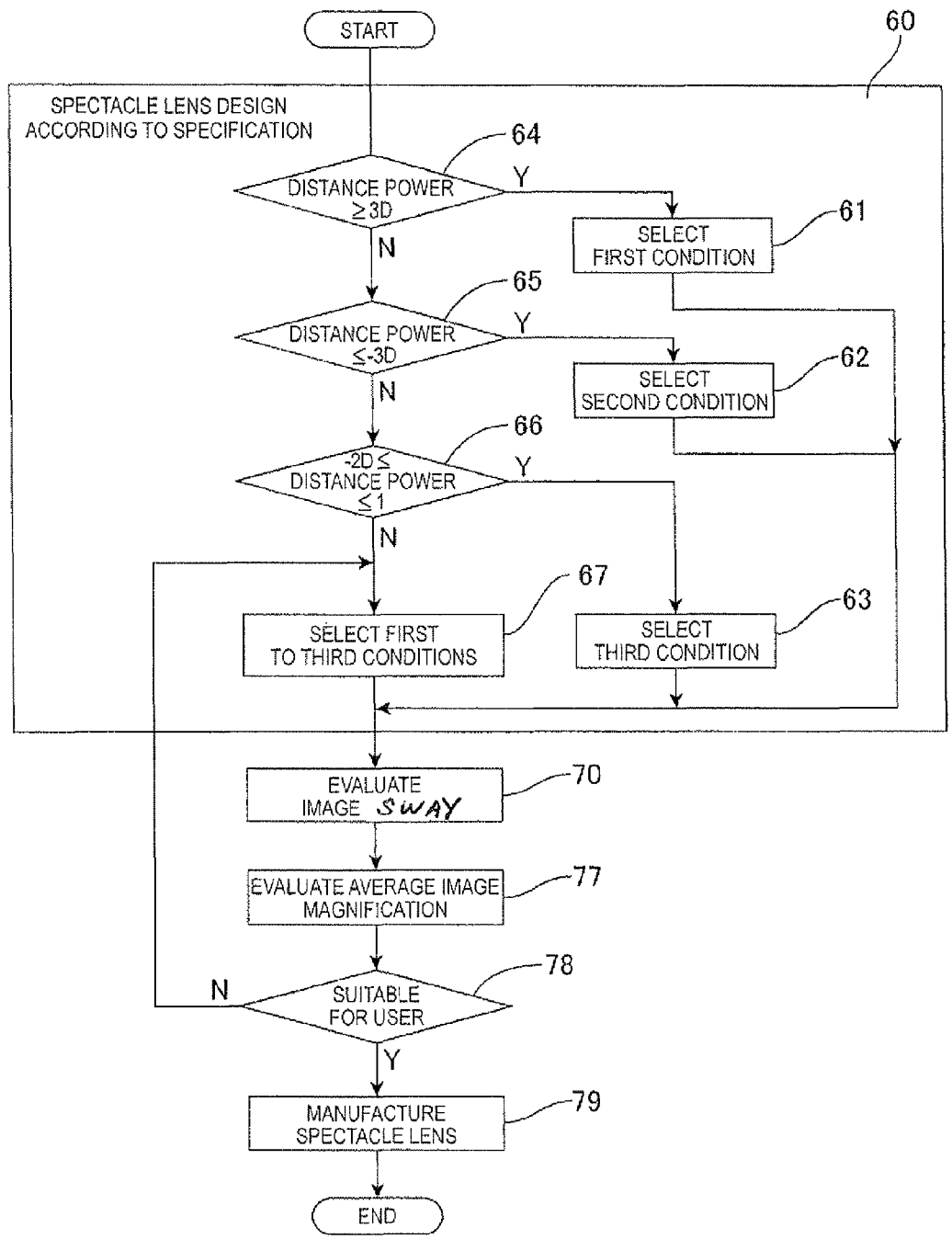
FIG. 68 is a flowchart showing a process for designing and manufacturing a progressive power lens according to a second embodiment.

FIG. 68 shows a second method of designing and manufacturing a progressive power lens for spectacles. This method includes Step 60 in which the progressive power lens 10 having the distance portion 11 and the near portion 12 is designed on the basis of the spectacle specification, Step 70 in which image sway of the designed progressive power lens 10 is evaluated, and Step 79 in which the progressive power lens 10 selected by evaluation is manufactured as a spectacle lens. Step 70 in which image sway of the designed progressive power lens 10 is common to the method described with reference to FIG. 11, thus description thereof will not be repeated.

Step 60 in which the progressive power lens 10 is designed includes Step 64 in which it is determined whether or not the prescription power of the distance portion 11 is equal to or greater than 3.0 D, Step 65 in which the prescription power of the distance portion 11 is equal to or smaller than −3.0 D, and Step 66 in which it is determined whether or not the prescription power of the distance portion 11 is equal to or greater than −2.0 D and equal to or smaller than 1.0 D. If the prescription power of the distance portion 11 is equal to or greater than 3.0 D, in Step 61, the progressive power lens is designed on the basis of the spectacle specification which includes the first condition satisfying Expression (1) along with the elements of the toric surface (toroidal, surface) satisfying Expression (0). If the prescription power of the distance portion 11 is equal to or smaller than in Step 62, the progressive power lens is designed on the basis of the spectacle specification which includes the second condition satisfying Expression (2) along with the elements of the toric surface (toroidal surface) satisfying Expression (0). If the prescription power of the distance portion 11 is equal to or greater than −2.0 D and equal to or smaller than 1.0 D, in Step 63, the progressive power lens is designed on the basis of the spectacle specification which includes the third condition satisfying Expression (3) along with the elements of the toric surface (toroidal surface) satisfying Expression (0).

Step 60 in which the progressive power lens 10 is designed includes Step 67 in which, between the above-described conditions, that is, when the prescription power of the distance portion 11 exceeds −3.0 D and is smaller than −2.0 D and when the prescription power exceeds 1.0 D and is smaller than 3.0 D, the progressive power lens is designed on the basis of the spectacle specification which includes each of the first to third conditions along with the elements of the toric surface.

The design method shown in FIG. 68 includes Step 70 in which image sway of the progressive power lens designed in Step 60 is evaluated, Step 77 in which the average image magnification on the principal meridian 14 of the progressive power lens designed in Step 60 is obtained by a ray trace method or the like and evaluated, and Step 78 in which it is determined whether or not the value (indicator) evaluated in Steps 70 and 77 is suitable for the user. When the progressive power lens suitable for the user is not included in the progressive power lenses designed in Step 60, the process returns to Step 67, and the progressive power lens is designed using the spectacle specification including each of the first to third conditions, and reevaluation is done in Steps 70 and 78.

The design method shown in FIG. 68 includes Step 79 in which the progressive power lens determined to be suitable for the user is manufactured.

Figure 69:
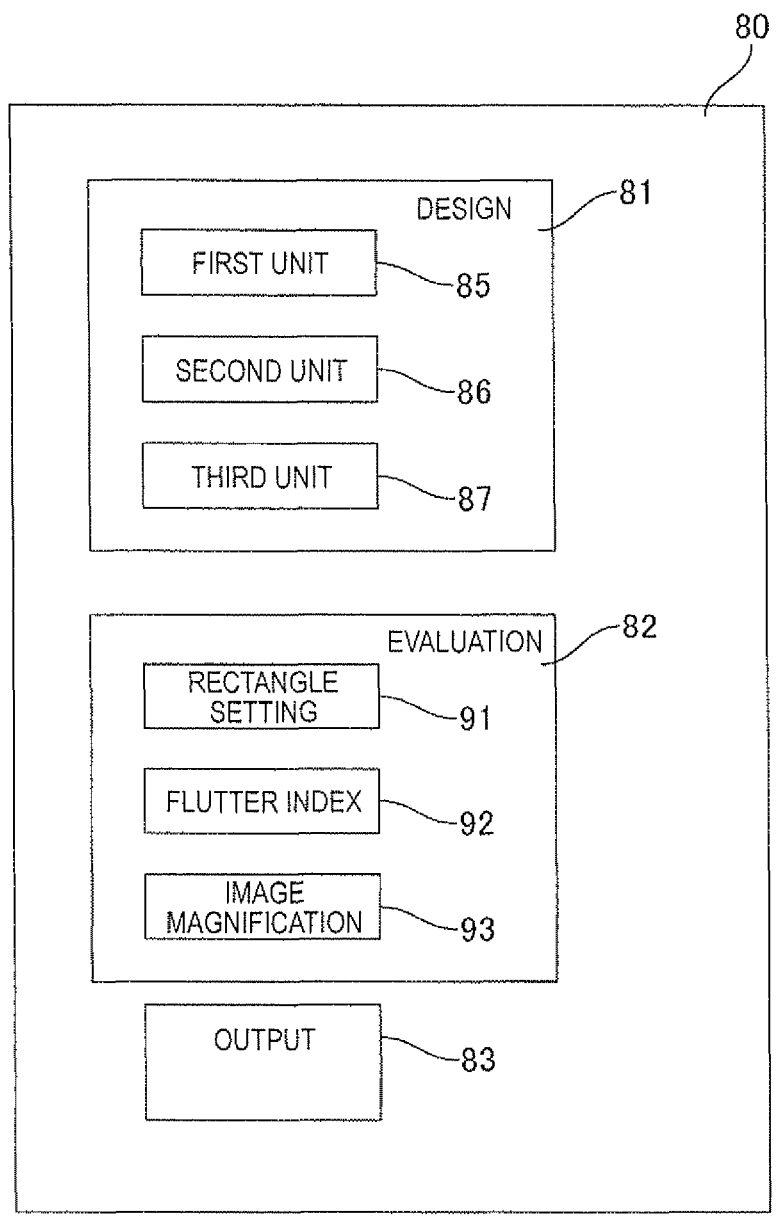
FIG. 69 is a block diagram showing the outline of a design apparatus.

FIG. 69 shows the schematic configuration of an example of an apparatus 80 for designing a spectacle lens. The design apparatus 80 includes a design unit 81 which designs the progressive power lens 10 on the basis of the spectacle specification, an evaluation unit 82 which obtains the sway indicators IDd and IDs of the designed progressive power lens 10 by the above-described method and evaluates the sway indicators IDd and IDs, and an output unit 83 which outputs the sway indicators IDd and IDs obtained by the evaluation unit 82 in a state where the user easily views, for example, with graphs. With the output unit 83, it becomes possible for the user to select the progressive power lens 10 having less sway by his/her determination.

When designing the progressive power lens 10 which includes the elements of the toric surface (toroidal surface) with the power in the horizontal direction on the object-side surface greater than the power in the vertical direction, the design unit 81 includes a first unit 85 which specifies the first condition including Expression (1) in the spectacle specification, a second unit 86 which specifies the second condition including Expression (2) in the spectacle specification, and a third unit 87 which specifies the third condition including Expression (3) in the spectacle specification. The first unit 85 may include a function of preferentially selecting the spectacle specification including the first condition if the average prescription power of the distance portion 11 is plus and the value thereof is at least 3.0 D. The second unit 86 may include a function of preferentially selecting the spectacle specification including the second condition if the average prescription power of the distance portion 11 is minus and the absolute value thereof is at least 3.0 D. The third unit 87 may include a function of preferentially selecting the spectacle specification including the third condition if the average prescription power of the distance portion 11 is in a range of −2.0 D to 1.0 D.

The evaluation unit 82 includes a unit 91 which sets the virtual plane 59 including the rectangular pattern 50 in the above-described manner, a unit 92 which obtains, as a sway indicator, geometric misalignment when images of the rectangular patterns 50 which appear when the line of sight moves left and right or up and down are superimposed such that the geometric centers 55 are aligned with each other, and a unit 93 which obtains the average image magnification on the principal meridian 14 in the progressive power lens 10 by a ray trace method or the like and evaluates the average image magnification.

With the design apparatus 80, in regard to the progressive power lens 10 having the toric surface (toroidal surface), it is possible to provide the progressive power lens 10 which has less image sway and easily improves vision.

Although in the above description, the rectangular pattern 50 of a square grid is used as the pattern of an observation indicator for evaluation, evaluation precision or density in each direction may be changed by changing the grid pitch in the horizontal direction and the vertical direction, or evaluation precision or density may be changed by increasing the number of grids.

In the progressive power lens 10 for spectacles, the object-side surface 19A includes elements of a toric surface with the surface power OHP in the horizontal direction greater than the surface power OVP in the vertical direction, and the eyeball-side surface 19B also includes elements of a toric surface the same as the object-side surface 19A. Accordingly, the progressive power lens 10 may be a lens in which the entire lens is curved in a toroidal shape along the face, and the horizontal direction on the object-side surface of the lens is deeper than in the related art. For this reason, the progressive power lens 10 is suitable for designing spectacles, called a wraparound type, which is recently attracting attention and in which the lens wraps around the temple in accordance with the curve of the face.

Although in the above description, a case where there is no prescription for astigmatism in a prescription for a distance portion has been described, when there is a prescription for astigmatism, a prescription for astigmatism can be made by combining a component of a toric surface (toroidal surface) for astigmatism correction on the eyeball-side surface. While the combination result of the toric surface may not satisfy Expression (4), in this case, the effects of the invention can be obtained. When the thickness of the lens is large, correction is applied on the eyeball-side surface taking into consideration a shape factor, thereby providing a spectacle lens with higher precision.

What is claimed is:

1. A method of designing a progressive power lens for spectacles that has a distance portion and a near portion of different average prescription powers,
   wherein the progressive power lens includes
   a surface power OHPf in a horizontal direction and a surface power OVPf in a vertical direction of the distance portion on an object-side surface along a principal meridian or a vertical reference line passing through a fitting point; and
   a surface power OHPn in a horizontal direction and a surface power OVPn in a vertical direction of the near portion on the object-side surface along the principal meridian or the vertical reference line,
   the object-side surface includes at least one of a toric surface with the surface power OHPf greater than the surface power OVPf and a toric surface with the surface power OHPn greater than the surface power OVPn, and
   the eyeball-side surface along the principal meridian or the vertical reference line includes a surface having a power such that it provides cancel shifts in the surface power provided by the toric surface on the object-side surface,
   the method comprises:
   selecting a spectacle specification including a first condition, wherein the average prescription power of the distance portion is plus and the value thereof is at least 3.0 D; or
   selecting a spectacle specification including a second condition, wherein the average prescription power of the distance portion is minus and the absolute value thereof is at least 3.0 D, wherein
   the first condition includes a condition that the surface power OVPf is greater than the surface power OVPn,
   the second condition includes a condition that the surface power OVPf is smaller than the surface power OVPn, and
   D is dioptre.

2. A method of designing a progressive power lens for spectacles that has a distance portion and a near portion of different average prescription powers,
   wherein the progressive power lens includes
   a surface power OHPf in a horizontal direction and a surface power OVPf in a vertical direction of the distance portion on an object-side surface along a principal meridian or a vertical reference line passing through a fitting point; and a surface power OHPn in a horizontal direction and a surface power OVPn in a vertical direction of the near portion on the object-side surface along the principal meridian or the vertical reference line, the object-side surface includes at least one of a toric surface with the surface power OHPf greater than the surface power OVPf and a toric surface with the surface power OHPn greater than the surface power OVPn, and the eyeball-side surface along the principal meridian or the vertical reference line includes a surface having a power such that it provides cancel shifts in the surface power provided by the toric surface on the object-side surface, the method comprises:

selecting a spectacle specification including a first condition, wherein the average prescription power of the distance portion is plus and the value thereof is at least 3.0 D; or selecting a spectacle specification including a second condition, wherein the average prescription power of the distance portion is minus and the absolute value thereof is at least 3.0 D; or selecting a spectacle specification including a third condition, wherein the average prescription power of the distance portion is in a range of −2.0 D to 1.0 D, wherein the first condition includes a condition that the surface power OVPf is greater than the surface power OVPn, the second condition includes a condition that the surface power OVPf is smaller than the surface power OVPn, the third condition includes a condition that the surface power OVPf is equal to the surface power OVPn, and the surface power OHPf is equal to the surface power OHPn, and D is dioptre.

3. The method according to claim 1, wherein the progressive power lens includes a surface power IHPf in the horizontal direction and a surface power IVPf in the vertical direction of the distance portion on the eyeball-side surface along the principal meridian or the vertical reference line, and a surface power IHPn in the horizontal direction and a surface power IVPn in the vertical direction of the near portion on the eyeball-side surface along the principal meridian or the vertical reference line, and the first condition and the second condition include the following conditions:

IHPf>IVPf

IHPn>IVPn

IHPf>IHPn wherein IHPf, IVPf, IHPn, and IVPn represent absolute values.

4. The method according to claim 1, wherein the spectacle specification satisfies the first condition or the second condition in a range of at least ±10 mm in the horizontal direction with the principal meridian as a center.

5. The method according to claim 1, further comprising:

evaluating image sway of a progressive power lens designed on the basis of the selected spectacle specification, wherein, in regard to the evaluation of the image sway, a virtual plane having a rectangular pattern with a central vertical grid line passing through the geometric center of the rectangular pattern, left and right vertical grid lines horizontally symmetrical to the central vertical grid line, a central horizontal grid line passing through the geometric center of the rectangular pattern, and upper and lower horizontal grid lines vertically symmetrical to the central horizontal grid line is set through the progressive power lens such that the geometric center is aligned with a point of fixation, and geometric misalignment when the images of the rectangular patterns which appear when the progressive power lens moves left and right by a first horizontal angle along with a head within a range in which the line of sight does not move from the geometric center or when the progressive power lens moves up and down by a first vertical angle along with the head within a range in which the line of sight does not move from the geometric center are superimposed such that the geometric centers are aligned with each other is obtained as a sway indicator.

6. A method of designing a progressive power lens for spectacles that has a distance portion and a near portion of different average prescription powers, wherein the progressive power lens includes a surface power OHPf in a horizontal direction and a surface power OVPf in a vertical direction of the distance portion on an object-side surface along a principal meridian or a vertical reference line passing through a fitting point, and a surface power OHPn in a horizontal direction and a surface power OVPn in a vertical direction of the near portion on the object-side surface along the principal meridian or the vertical reference line, the object-side surface includes at least one of a toric surface with the surface power OHPf greater than the surface power OVPf and a toric surface with the surface power OHPn greater than the surface power OVPn, and the eyeball-side surface along the principal meridian or the vertical reference line includes a surface having a power that it provides cancel shifts in the surface power provided by the toric surface on the object-side surface, the method comprises:

selecting a spectacle specification including a first condition, wherein the average prescription power of the distance portion is plus and the value thereof is at least 3.0 D; or selecting a spectacle specification including a second condition, wherein the average prescription power of the distance portion is minus and the absolute value thereof is at least 3.0;

selecting a spectacle specification including a third condition, wherein the average prescription power of the distance portion is in a range of −2.0 D to 1.0 D; and evaluating image sway of a progressive power lens designed on the basis of the selected spectacle specification, wherein the first condition includes a condition that the surface power OVPf is greater than the surface power OVPn, the second condition includes a condition that the surface power OVPf is smaller than the surface power OVPn, the third condition includes a condition that the surface power OVPf is equal to the surface power OVPn and the surface power OHPf is, equal to the surface power OHPn, in regard to the evaluation of the image sway, a virtual plane having a rectangular pattern with a central vertical grid line passing through the geometric center of the rectangular pattern, left and right vertical grid lines horizontally symmetrical to the central vertical grid line, a central horizontal grid line passing through the geometric center of the rectangular pattern, and upper and lower horizontal grid lines vertically symmetrical to the central horizontal grid line is set through the progressive power lens such that the geometric center is aligned with a point of fixation, and geometric misalignment when the images of the rectangular patterns which appear when the progressive power lens moves left and right by a first horizontal angle along with a head within a range in which the line of sight does not move from the geometric center or when the progressive power lens moves up and down by a first vertical angle along with the head within a range in which the line of sight does not move from the geometric center are superimposed such that the geometric centers are aligned with each other is obtained as a sway indicator, and D is dioptre.

7. An apparatus for designing a progressive power lens for spectacles that has a distance portion and a near portion of different average prescription powers, wherein the progressive power lens includes a surface power OHPf in a horizontal direction and a surface power OVPf in a vertical direction of the distance portion on an object-side surface along a principal meridian or a vertical reference line passing through a fitting point, and a surface power OHPn in a horizontal direction and a surface power OVPn in a vertical direction of the near portion on the object-side surface along the principal meridian or the vertical reference line, the object-side surface includes at least one of a toric surface with the surface power OHPf greater than the surface power OVPf and a toric surface with the surface power OHPn greater than the surface power OVPn, and the eyeball-side surface along the principal meridian or the vertical reference line includes a surface having a power such that it provides cancel shifts in the surface power provided by the toric surface on the object-side surface, the apparatus comprises:

a first unit wherein the average prescription power of the distance portion is plus and the value thereof is at least 3.0 D, selects a spectacle specification including a first condition; and a second unit wherein the average prescription power of the distance portion is minus and the absolute value thereof is at least 3.0 D, selects a spectacle specification including a second condition, the first condition includes a condition that the surface power OVPf is greater than the surface power OVPn, the second condition includes a condition that the surface power OVPf is smaller than the surface power OVPn, and D is dioptre.

8. An apparatus for designing a progressive power lens for spectacles that has a distance portion and a near portion of different average prescription powers, wherein the progressive power lens includes a surface power OHPf in a horizontal direction and a surface power OVPf in a vertical direction of the distance portion on an object-side surface along a principal meridian or a vertical reference line passing through a fitting point, and a surface power OHPn in a horizontal direction and a surface power OVPn in a vertical direction of the near portion on the object-side surface along the principal meridian or the vertical reference line, the object-side surface includes at least one of a toric surface with the surface power OHPf greater than the surface power OVPf and a toric surface with the surface power OHPn greater than the surface power OVPn, and the eyeball-side surface along the principal meridian or the vertical reference line includes a surface having a power such that it provides cancel shifts in the surface power provided by the toric surface on the object-side surface, the apparatus comprises:

a first unit wherein the average prescription power of the distance portion is plus and the value thereof is at least 3.0 D, selects a spectacle specification including a first condition;

a second unit wherein the average prescription power of the distance portion is minus and the absolute value thereof is at least 3.0 D, selects a spectacle specification including a second condition; and a third unit wherein the average prescription power of the distance portion is in a range of −2.0 D to 1.0 D, selects a spectacle specification including a third condition, wherein the first condition includes a condition that the surface power OVPf is greater than the surface power OVPn, the second condition includes a condition that the surface power OVPf is smaller than the surface power OVPn, the third condition includes a condition that the surface power OVPf is equal to the surface power OVPn, and the surface power OHPf is equal to the surface power OHPn, and D is dioptre.

9. An apparatus for designing a progressive power lens that has a distance portion and a near portion of different average prescription powers, wherein the progressive lens includes a surface power OHPf in a horizontal direction and a surface power OVPf in a vertical direction of the distance portion on an object-side surface along a principal meridian or a vertical reference line passing through a fitting point, and a surface power OHPn in a horizontal direction and a surface power OVPn in a vertical direction of the near portion on an object-side surface along the principal meridian or the vertical reference line, the apparatus comprising:

a unit which assumes an object-side surface and an eyeball-side surface of the progressive power lens having the distance portion and the near portion on the basis of a spectacle specification; and an evaluation unit which evaluates sway of the progressive power lens having the assumed object-side surface and eyeball-side surface designed on the basis of the selected spectacle specification, wherein the unit which assumes the surfaces includes a first unit which selects a spectacle specification including a first condition, wherein the average prescription power of the distance portion is plus and the value thereof is at least 3.0 D, a second unit which selects a spectacle specification including a second condition, wherein the average prescription power of the distance portion is minus and the absolute value thereof is at least 3.0, and a third unit which selects a spectacle specification including a third condition, wherein the average prescription power of the distance portion is in a range of −2.0 D to 1.0 D, the evaluation unit includes a unit which sets a virtual plane having a rectangular pattern with a central vertical grid line passing through the geometric center of the rectangular pattern, left and right vertical grid lines horizontally symmetrical to the central vertical grid line, a central horizontal grid line passing through the geometric center of the rectangular pattern, and upper and lower horizontal grid lines vertically symmetrical to the central horizontal grid line through the progressive power lens having the assumed object-side surface and eyeball-side surface such that the geometric center is aligned with a point of fixation, and a unit which obtains, as a sway indicator, geometric misalignment when the images of the rectangular patterns which appear when the progressive power lens moves left and right by a first horizontal angle along with a head within a range in which the line of sight does not move from the geometric center or when the progressive power lens moves up and down by a first vertical angle along with the head within a range in which the line of sight does not move from the geometric center are superimposed such that the geometric centers are aligned with each other, the first condition includes a condition that the surface power OVPf is greater than the surface power OVPn, the second condition includes a condition that the surface power OVPf is smaller than the surface power OVPn, and the third condition includes a condition that the surface power OVPf is equal to the surface power OVPn, and a surface power OHPf is equal to a surface power OHPn.

10. The apparatus according to claim 9, further comprising:

a unit which temporarily designs the progressive power lens by the unit assuming the surfaces by the first unit wherein the average prescription power of the distance portion is plus and the value thereof is at least 3.0 D, by the second unit wherein the average prescription power of the distance portion is minus and the absolute value thereof is at least 3.0 D, or by the third unit wherein the average prescription power of the distance portion is in a range of −2.0 D to 1.0 D, and performs evaluation by the evaluation unit.

* * * * *